US008311572B2

(12) United States Patent
Wakabayashi

(10) Patent No.: US 8,311,572 B2
(45) Date of Patent: *Nov. 13, 2012

(54) COMMUNICATION MODE CONTROLLING METHOD, MOBILE COMMUNICATION SYSTEM, RADIO NETWORK CONTROLLER, BASE STATION, AND MOBILE COMMUNICATION TERMINAL

(75) Inventor: Hideji Wakabayashi, Tokyo (JP)

(73) Assignee: Research In Motion Limited, Waterloo, Ontario (CA)

( * ) Notice: Subject to any disclaimer, the term of this patent is extended or adjusted under 35 U.S.C. 154(b) by 2 days.

This patent is subject to a terminal disclaimer.

(21) Appl. No.: 13/287,870

(22) Filed: Nov. 2, 2011

(65) Prior Publication Data
US 2012/0046061 A1 Feb. 23, 2012

Related U.S. Application Data

(60) Continuation of application No. 11/408,173, filed on Apr. 21, 2006, now Pat. No. 8,072,986, which is a division of application No. 10/572,599, filed on Mar. 20, 2006, now Pat. No. 7,684,408.

(51) Int. Cl.
H04B 7/00 (2006.01)
H04L 12/28 (2006.01)
(52) U.S. Cl. ..................... 455/522; 370/395.4
(58) Field of Classification Search .................. 455/453, 455/525, 524, 519, 414.1, 562.1, 522; 370/385.4, 370/35, 412, 395.43
See application file for complete search history.

(56) References Cited

U.S. PATENT DOCUMENTS

| 5,619,524 | A | 4/1997 | Ling et al. |
| 5,933,782 | A | 8/1999 | Nakano et al. |
| 6,490,271 | B1 | 12/2002 | Erjanne |
| 6,987,738 | B2 * | 1/2006 | Subramanian et al. ....... 370/252 |
| 2002/0172217 | A1 | 11/2002 | Kadaba et al. |
| 2003/0087641 | A1 | 5/2003 | Gustafsson |
| 2004/0014482 | A1 | 1/2004 | Kwak et al. |
| 2004/0062206 | A1 | 4/2004 | Soong et al. |
| 2004/0147276 | A1 | 7/2004 | Gholmich et al. |
| 2004/0203829 | A1 | 10/2004 | Miyoshi et al. |
| 2004/0224677 | A1 * | 11/2004 | Kuchibhotla et al. ...... 455/422.1 |
| 2005/0003824 | A1 | 1/2005 | Siris |
| 2005/0025077 | A1 | 2/2005 | Balasubramanian et al. |

(Continued)

FOREIGN PATENT DOCUMENTS

CN 1435013 8/2003

(Continued)

OTHER PUBLICATIONS

3GPP TSG RAN Meeting #31, RP-060102, Sanya, China Mar. 8-10, 2006.
"Changes to E-TFC restriction requirements", R4-060275, 3GPP TSG RAN WG4 (Radio) Meeting #38, Denver, Colorado, Feb. 13-17, 2006.

(Continued)

Primary Examiner — Melody Mehrpour
(74) Attorney, Agent, or Firm — Finnegan, Henderson, Farabow, Garrett & Dunner, LLP

(57) ABSTRACT

A communication mode which should be set to a mobile communication terminal having a function of switching between an autonomous mode and a scheduling mode is determined based on an amount of interference in each of the communication modes in the cell of a base station, and/or communication characteristics of each of the communication modes, and a signal indicating an amount of communication data notified from the mobile communication terminal. The base station then notifies the determined communication mode to the mobile communication terminal.

30 Claims, 25 Drawing Sheets

U.S. PATENT DOCUMENTS

| | | | |
|---|---|---|---|
| 2005/0181832 | A1 | 8/2005 | Ishii et al. |
| 2006/0057978 | A1 | 3/2006 | Love et al. |
| 2006/0189334 | A1 | 8/2006 | Wakabayashi et al. |
| 2006/0217074 | A1 | 9/2006 | Wakabayashi |
| 2006/0280145 | A1 | 12/2006 | Revel et al. |
| 2008/0254819 | A1 | 10/2008 | Niwano et al. |
| 2009/0017836 | A1 | 1/2009 | Lee |

FOREIGN PATENT DOCUMENTS

| | | |
|---|---|---|
| CN | 1521956 | 8/2004 |
| EP | 1437912 A1 | 7/2004 |
| EP | 1503545 A2 | 2/2005 |
| JP | 8-167872 | 6/1996 |
| JP | 10-112683 | 4/1998 |
| JP | 11-239152 | 8/1999 |
| JP | 2001-016215 | 1/2001 |
| JP | 2001-313656 | 11/2001 |
| JP | 2002-118576 | 4/2002 |
| JP | 2002-118585 | 4/2002 |
| JP | 2002-369261 | 12/2002 |
| JP | 2003-513534 | 4/2003 |
| JP | 2003-518812 | 6/2003 |
| JP | 2004-215276 | 7/2004 |
| WO | 01/47146 | 6/2001 |
| WO | 2005/078967 A1 | 8/2005 |

OTHER PUBLICATIONS

"Changes to E-TFC restriction requirements", R4-060276, 3GPP TSG RAN WG4 (Radio) Meeting #38, Denver, Colorado, Feb. 13-17, 2006.

"UPH Measurement requirements", R4-060358, 3GPP TSG RAN WG4 (Radio) Meeting #38, Denver, Colorado, Feb. 13-17, 2006.

"UPH Measurement requirements", R4-060359, 3GPP TSG RAN WG4 (Radio) Meeting #38, Denver, Colorado, Feb. 13-17, 2006.

3GPP TS 25.133 v 6.10.0, "3rd Generation Partnership Project; Technical Specification Group Access Network; Requirements for Support of Radio Resource Management (FDD) (Release 6)", Technical Specification, pp. 1 to 164, 2005.

3GPP TS 25.133 v 6.11.0, "3rd Generation Partnership Project; Technical Specification Group Access Network; Requirements for Support of Radio Resource Management (FDD) (Release 6)", Technical Specification, pp. 1 to 166, 2005.

3GPP TS 25.309 v 6.3.0, "3rd Generation Partnership Project; Technical Specification Group Access Network; FDD Enhanced Uplink; Overall Description; Stage 2 (Release 6)", Technical Specification, pp. 1 to 33, 2005.

3GPP TS 25.309 v 6.4.0, "3rd Generation Partnership Project; Technical Specification Group Access Network; FDD Enhanced Uplink; Overall Description; Stage 2 (Release 6)", Technical Specification, pp. 1 to 34, 2005.

3GPP TS 25.321 v 6.5.0, "3rd Generation Partnership Project; Technical Specification Group Access Network; Medium Access Control (MAC) protocol specification (Release 6)", Technical Specification, pp. 1 to 82, 2005.

3GPP TS 25.321 v 6.6.0, "3rd Generation Partnership Project; Technical Specification Group Access Network; Medium Access Control (MAC) protocol specification (Release 6)", Technical Specification, pp. 1 to 86, 2005.

Chinese First Office Action dated Dec. 28, 2007, for Chinese Application No. 03827084.6, along with English translation (7 pages).

Chinese Office Action dated Jan. 8, 2010, for Chinese Application No. 200610075551.X, along with English translation (9 pages).

Chinese Office Action dated Jun. 19, 2009, for Chinese Application No. 200610075552.4, along with English translation (8 pages).

Chinese Office Action dated Nov. 2, 2010, in Chinese Application No. 200580051659.9 along with English translation (7 pages).

Chinese Second Office Action dated May 23, 2008, for Chinese Application No. 03827084.6, along with English translation (6 pages).

Ericsson, "Requirements for UE Power Headroom", R4-051125, 3GPP TSG RAN WG4 (Radio) Meeting #37, Seoul, Korea, Nov. 7-11, 2005.

Ericsson, "UE TX Power Headroom Requirements", R4-050645, 3GPP TSG RAN WG4 (Radio) Meeting #36, London, United Kingdom, Aug. 29-Sep. 2, 2005.

European Communication dated Jun. 15, 2007, for European Application No. 03818820.7 (5 pages).

European Communication dated Jun. 17, 2009, for European Application No. 05785516.5 (6 pages).

European Communication dated May 10, 2011, for European Application No. 05785516.5 (6 pages).

European Communication dated Nov. 16, 2007, for European Application No. 03818820.7 (6 pages).

European Communication dated Nov. 16, 2007, for European Application No. 06006783.2 (7 pages).

European Search Report dated Jan. 26, 2007, for European Application No. 03818820.7 (3 pages).

Extended European Search Report dated Oct. 22, 2008, for European Application No. 05785516.5 (9 pages).

International Search Report dated Oct. 25, 2005, for International Application No. PCT/JP2005/017479 (2 pages).

Japanese Office Action dated May 11, 2010, for Japanese Application No. 2007-536373 along with English Translation (5 pages).

Korean Office Action dated Aug. 29, 2011, for Korean Application No. 10-2010-7009013, along with English translation (4 pages).

Nokia, "Discussion of UPH measurement requirements", R4-060161, 3GPP TSG RAN Working Group 4 (Radio) Meeting #38, Denver, Colorado, Feb. 13-17, 2006.

Nokia, Ericsson,"UPH Measurement requirements", R4-060359, 3GPP TSG RAN4 WG4 (Radio) Meeting #38, Denver, Colorado, Feb. 13-17, 2006.

Russian Office Action dated Aug. 18, 2011, for Russian Application No. 2009145076/07, along with English translation (5 pages).

U.S. Notice of Allowance mailed Jan. 6, 2012, in related U.S. Appl. No. 12/839,030 (5 pages).

U.S. Notice of Allowance mailed Jul. 28, 2011, in related U.S. Appl. No. 11/408,173 (2 pages).

U.S. Notice of Allowance mailed Jun. 17, 2011, in corresponding U.S. Appl. No. 12/067,187 (8 pages).

U.S. Notice of Allowance mailed Oct. 28, 2009, in related U.S. Appl. No. 10/572,599 (4 pages).

U.S. Office Action mailed Dec. 8, 2010, in corresponding U.S. Appl. No. 12/067,187 (8 pages).

U.S. Office Action mailed Feb. 22, 2010, in related U.S. Appl. No. 11/408,173 (6 pages).

U.S. Office Action mailed Feb. 28, 2011, in related U.S. Appl. No. 12/839,030 (7 pages).

U.S. Office Action mailed Jul. 23, 2010, in related U.S. Appl. No. 11/408,173 (6 pages).

U.S. Office Action mailed Jun. 10, 2011, in related U.S. Appl. No. 12/839,030 (7 pages).

U.S. Office Action mailed Mar. 18, 2009, in related U.S. Appl. No. 10/572,599 (6 pages).

U.S. Office Action mailed Mar. 18, 2011, in related U.S. Appl. No. 11/408,173 (7 pages).

U.S. Office Action mailed Mar. 23, 2009, in related U.S. Appl. No. 11/408,173 (7 pages).

U.S. Office Action mailed Oct. 2, 2008, in related U.S. Appl. No. 11/408,189 (10 pages).

U.S. Office Action mailed Sep. 12, 2008, in related U.S. Appl. No. 11/408,173 (8 pages).

U.S. Office Action mailed Sep. 15, 2008, in related U.S. Appl. No. 10/572,599 (6 pages).

ESSR for EP Application 06006783.2 dated Jan. 26, 2007.

Lucent, "Scheduled and Autonomous Mode Operation for the Enhanced Upling," 3GPP TSG RAN WG1#31, XP-002298746, Tokyo, Japan, Feb. 17-20, 2003 (7 pages).

Motorola, "Management of Enhanced Uplink Scheduling Modes," 3GPPRAN 1#32, Paris, France, May 19-23, 2003 (5 pages).

Motorola, Lucent, "Node B Controlled Time and Rate Scheduling," TSG-RAN WG1 #32 meeting, XP-002414187, Paris, France, May 19-23, 2003 (3 pages).

Office Action for U.S. Appl. No. 13/302,525 dated Feb. 8, 2012 (17 pages).

* cited by examiner

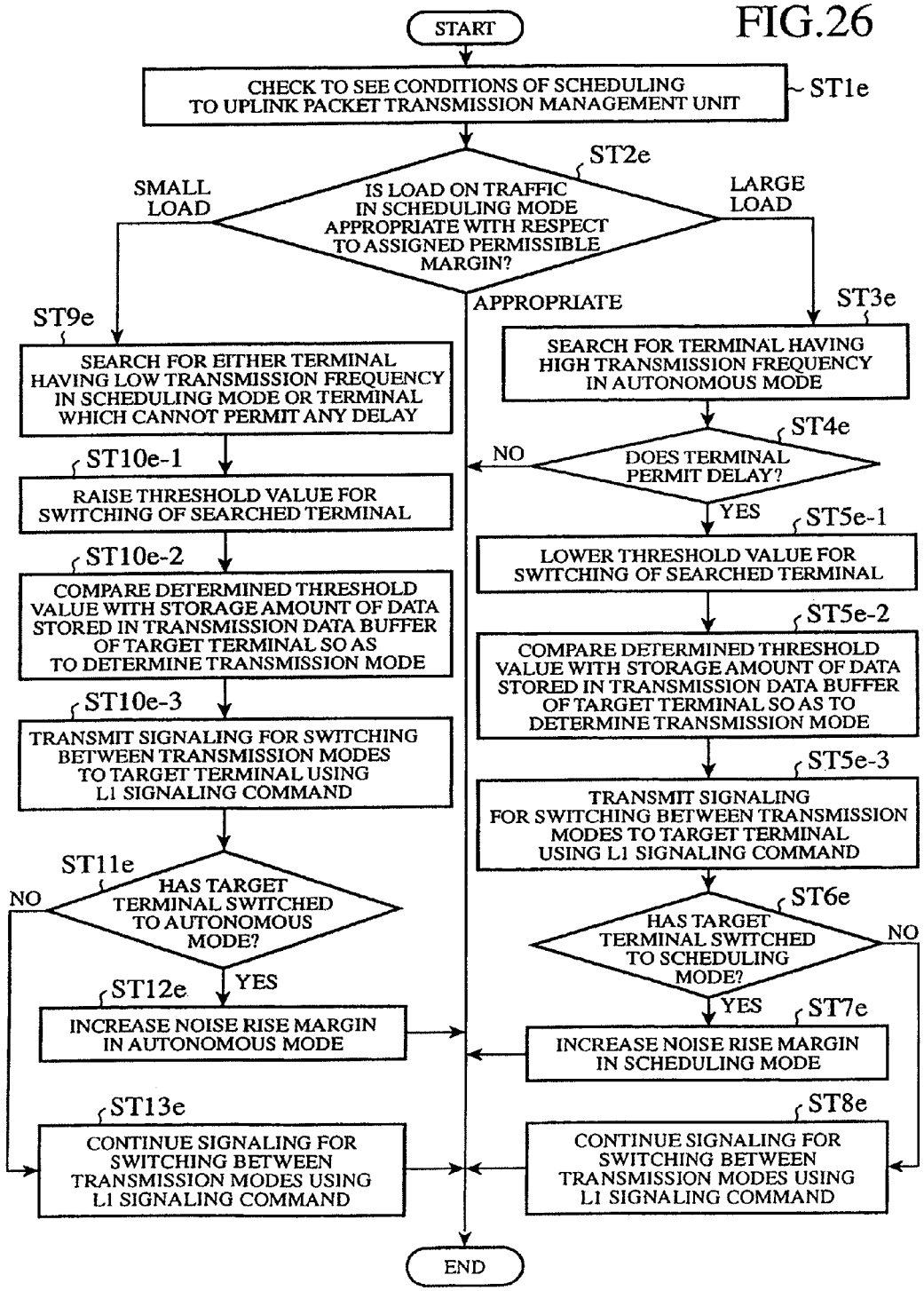

COMMUNICATION MODE CONTROLLING METHOD, MOBILE COMMUNICATION SYSTEM, RADIO NETWORK CONTROLLER, BASE STATION, AND MOBILE COMMUNICATION TERMINAL

RELATED APPLICATIONS

The present application is a continuation application which claims the benefit under 35 U.S.C. §120 of application Ser. No. 11/408,173, filed Apr. 21, 2006, which is a divisional application of application Ser. No. 10/572,599, filed Mar. 20, 2006, (now U.S. Pat. No. 7,684,408, issued Mar. 23, 2010), and PCT/JP03/12552, filed Sep. 30, 2003, the disclosure of each is herein incorporated by reference.

FIELD OF THE INVENTION

The present invention relates to a mobile communication system with CDMA (Code Division Multiple Access). More particularly, it relates to a communication mode controlling method of, a mobile communication system for, and an RNC (Radio Network Controller) for controlling a switching between communication modes according to the status of communications between a base station and a mobile communication terminal, the base station, and the mobile communication terminal.

BACKGROUND OF THE INVENTION

Related art wireless multi-mode data communication methods include a method (for example, refer to JP, 2002-369261,A) of switching between an autonomous mode in which data are transmitted and received autonomously, and a so-called scheduling mode in which data are transmitted and received according to requirements (i.e., scheduling) set for data transmission and reception, such as a communication timing permitted by a base station, according to a data rate and so on.

According to this communication method, when packet data is transmitted at a low data rate of about 9.6 kbps between a base station and a wireless device, for example, the transmission of the packet data is carried out with the transmission mode being switched to the autonomous mode. On the contrary, when packet data is transmitted at a high data rate between a base station and a wireless device, the transmission of the packet data is carried out with the transmission mode being switched to the scheduling mode.

In the scheduling mode, the base station transmits a signaling for notifying scheduling frequently to the wireless device. For this reason, if there is not a certain or more amount of data for each transmission, the efficiency of data transmission is reduced with respect to the number of times that the signaling is performed.

In the above-mentioned related art data communication method, the above-mentioned malfunction is removed by switching to the scheduling mode in the case of a high data rate at which the amount of data per unit time is large.

However, although the above-mentioned related art reference discloses application of a switching to either the autonomous mode or the scheduling mode based on the amount of data to the above-mentioned related art data communication method, it does not disclose any process of switching between the autonomous mode and the scheduling mode under other communication conditions.

As the communication conditions which should be used as the reference for switching between the communication modes, an amount of interference (referred to as a noise rise from here on), a delay time, or the like in the base station can be provided, for example, by taking into consideration a process of demodulating an encoded signal, and a process of handling data of which real-time nature is required.

According to the invention disclosed by the above-mentioned related art reference, no due consideration is given to flexible communication mode switching operations according to communication conditions, such as a communication mode switching operation of making a wireless device which carries out data communications in which any delay time cannot be permitted operate in the autonomous mode if possible, and making a device which carries out communications in which a delay time can be permitted operate in the schedule mode.

In uplink packet communications using a CDMA method, when interference caused by a transmission signal from a wireless device exceeds the limit of a noise rise in a base station, the base station cannot demodulate the transmission signal.

This noise rise varies dependently upon interference by other cells, transmission from other wireless devices in the same cell, etc. For this reason, it is necessary to sufficiently pay attention to the management of the noise rise in the packet communications using a CDMA method.

When a margin for the noise rise is sufficiently secured as noise rise management, it is possible to use the autonomous mode even if the amount of data to be transmitted is large. In this case, the number of times that the signaling is performed can be reduced compared with the case of the schedule mode, and there is an advantage of being able to reduce the delay time.

Thus, by appropriately dividing the margin for the noise rise resulting from various factors which vary according to the conditions of the communications traffic with respect to the noise rise margin of the base station, efficient communications dependent upon changes in the noise rise can be carried out.

The present invention is made in order to solve the above-mentioned problems, and it is therefore an object of the present invention to provide a communication mode controlling method of making it possible to carry out efficient data communications dependent upon changes in a noise rise caused by changes in the load of communications between a base station and a mobile communication terminal by switching between communication modes appropriately in consideration of factors other than the amount of data.

It is another object of the present invention to provide a communication mode controlling method of being able to divide a noise rise margin between an autonomous mode and a schedule mode according to QoS (Quality of Service) by independently setting a threshold for switching between transmission modes to each terminal in consideration of QoS parameters, such as a delay time.

It is a further object of the present invention to provide a mobile communication system, an RNC, a base station, and a mobile communication terminal, which carry out efficient data communications dependent upon changes in a noise rise caused by a change in the load on communications using the above-mentioned method.

DISCLOSURE OF THE INVENTION

In accordance with a communication mode controlling method of the present invention, in order for a mobile communication terminal to switch between an autonomous mode in which the mobile communication terminal autonomously carries out data communications with a base station, and a scheduling mode in which the mobile communication terminal carries out data communications with the base station at a permitted communication timing, a communication mode which should be set to the mobile communication terminal is determined based on an amount of interference in each of the communication modes in the cell of the base station, and/or communication characteristics thereof, and a signal indicating the amount of communication data notified from the mobile communication terminal, and the base station notifies the determined communication mode to the mobile communication terminal.

Therefore, the present invention offers an advantage of making it possible to carry out efficient data communications according to a change in the noise rise which is caused by a change in the load of communications between the base station and the mobile communication terminal.

BRIEF DESCRIPTION OF THE FIGURES

FIG. 26 is a flow chart showing the operation of the mobile communication system in a case where the third method is applied to the structure in which the mobile communication terminal switches between the transmission modes according to a command from a base station.

PREFERRED EMBODIMENTS OF THE INVENTION

In order to explain the invention in greater detail, the preferred embodiments of the invention will be explained below with reference to the accompanying figures.

Embodiment 1

Figure 1:
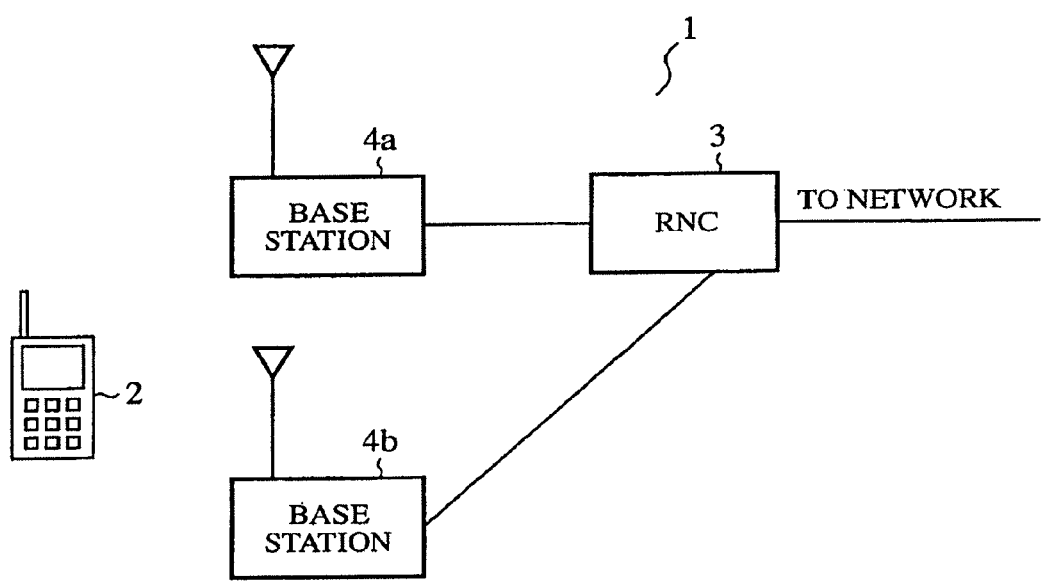
FIG. 1 is a diagram schematically showing the structure of a mobile communication system in accordance with embodiment 1 of the present invention.

FIG. 1 is a diagram schematically showing the structure of a mobile communication system in accordance with embodiment 1 of the present invention. The mobile communication system 1 is provided with a mobile communication terminal 2 which the user uses, an RNC (Radio Network Controller) 3, and base stations 4$a$ and 4$b$. The RNC 3 is disposed between a construction disposed on a side of a network, such as a public network, and the base stations 4a and 4b, and relays packet communications between them.

Thus, the system 1 is so constructed that the RNC 3 controls the two or more base stations 4a and 4b for the side of the network. As a result, in the system 1, a radio link which is called a soft handover can be established among the two or more base stations 4a and 4b for one terminal 2.

When the mobile communication system 1 is implemented using a W-CDMA (Wideband-Code Division Multiple Access) method, the mobile communication terminal 2 can be called UE (User Equipment), the RNC 3 can be called RNC (Radio Network Controller), and each of the base stations 4a and 4b can be called Node-B.

Especially, in high-speed uplink packet communications, a specific base station may take on the task of performing scheduling about data communications with a certain terminal. In this case, the specific base station may be called a serving cell for the sake of a distinction from other base stations. A base station is also called, as a whole, a cell including a specific area in which it carries out communications processing. In the later explanation, these terms will be used as deemed appropriate.

Figure 2:
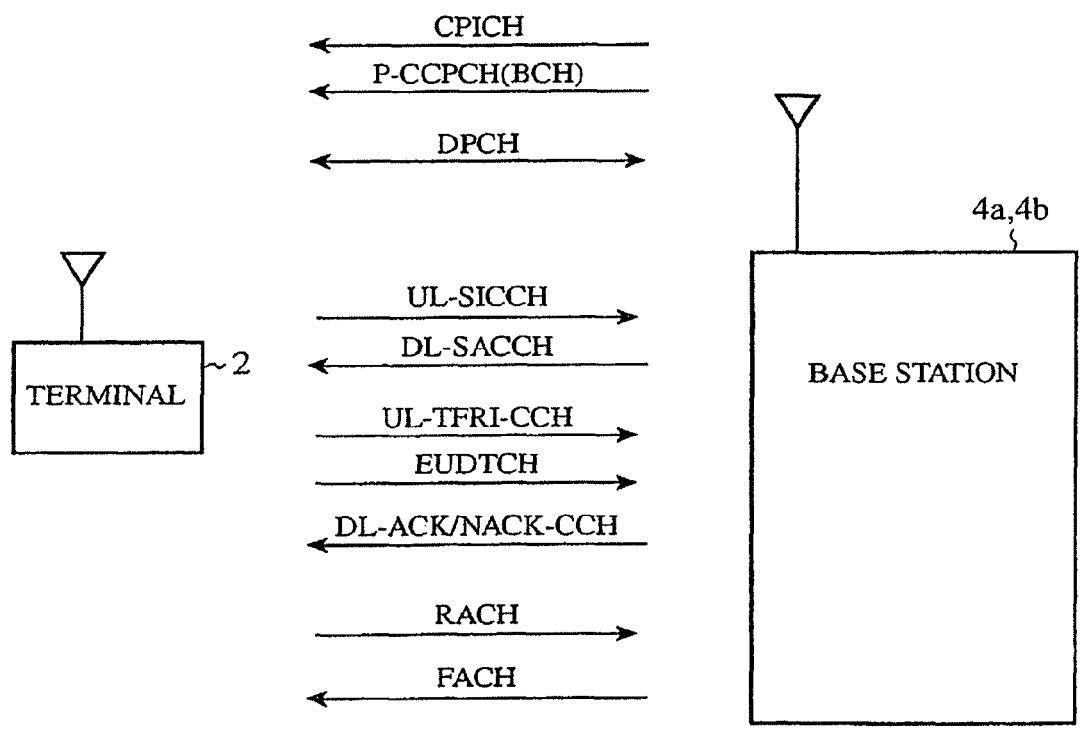
FIG. 2 is a diagram showing the configuration of channels for use in the mobile communication system in accordance with embodiment 1.

FIG. 2 is a diagram showing, as an example, the configuration of channels for use in the mobile communication system in accordance with embodiment 1, and shows the configuration of channels in a wireless section between each of the base stations 4a and 4b and the terminal 2 of the W-CDMA system.

The channels of this figure are shown as an example, and the channels for use in the mobile communication system are not limited to the shown channels. Actually, two or more control channels can be used so that they can share a single channel.

First, downlink channels from each of the base stations 4a and 4b to the terminal 2 will be explained. The downlink channels include a CPICH (Common Pilot Channel) via which each of the base stations notifies a reference for all timings to formation parts disposed in the cell, and a P-CCPCH (Primary-Common Control Physical Channel) which is a physical channel for BCH (Broadcast channel), and via which each of the base stations notifies broadcast information other than the reference to the terminal 2.

The downlink channels include, as channels for use in uplink packet communications, a DL-SACCH (Downlink Scheduling Assignment Control Channel) via which each of the base stations notifies an assignment position provided by a scheduler for transmission of control information, and a DL-ACK/NACK-CCH (Downlink AckINack Control Channel) via which each of the base stations 4a and 4b notifies the success or failure of reception of packets. Furthermore, there is an FACH (Forward Access Channel) as a downlink common channel.

Next, uplink channels from the terminal 2 to each of the base stations 4a and 4b will be explained. The uplink channels include, as channels for use in uplink packet communications, a UL-SICCH (Uplink Scheduling Information Control Channel) via which the terminal 2 notifies existence of transmission data to each of the base stations, a UL-TFRI-CCH (Uplink TFRI Control Channel) via which the terminal 2 notifies a modulation method, an encoding rate, and so on which are selected thereby to each of the base stations 4a and 4b, and an EUDTCH (Enhanced Uplink Dedicated Transport Channel) via which the terminal 2 transmits user data in uplink packet communications. Furthermore, there is an RACH (Random Access Channel) as an uplink common channel.

In addition, as a channel set for both the uplink and downlink communications, there is a DPCH (Dedicated Physical channel) which is set up separately for communications with a specific terminal, and which is used for communications of audio data, data, etc., or signaling by an upper layer. The DPCH can be separately referred to as a DPDCH (Dedicated Physical Data channel) for transmitting data and a DPCCH (Dedicated Physical Control channel) for transmitting a bit associated with control.

Figure 3A:
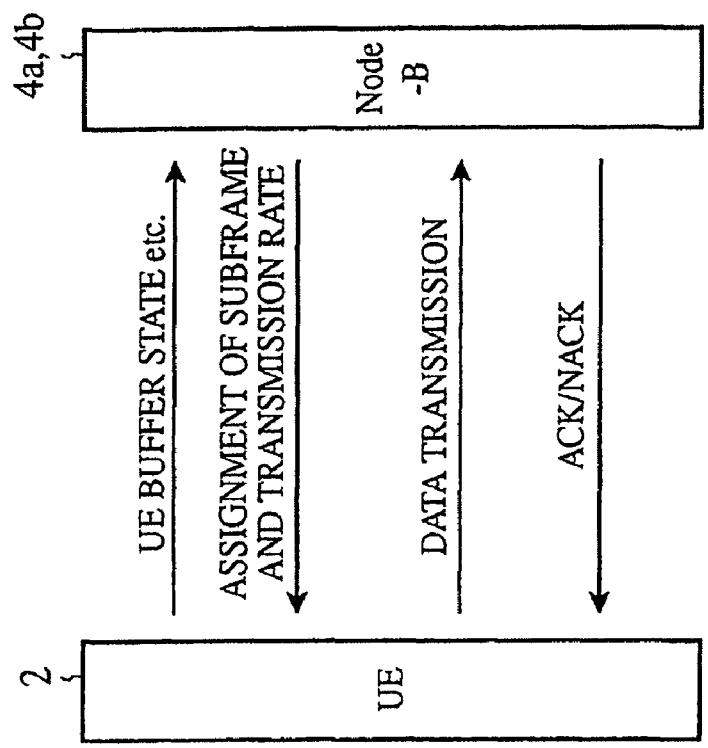
FIGS. 3A and 3B are diagrams for explaining a communications mode in wireless multiplex data mode communications between a terminal and each base station in the mobile communication system in accordance with embodiment 1.
Figure 3B:
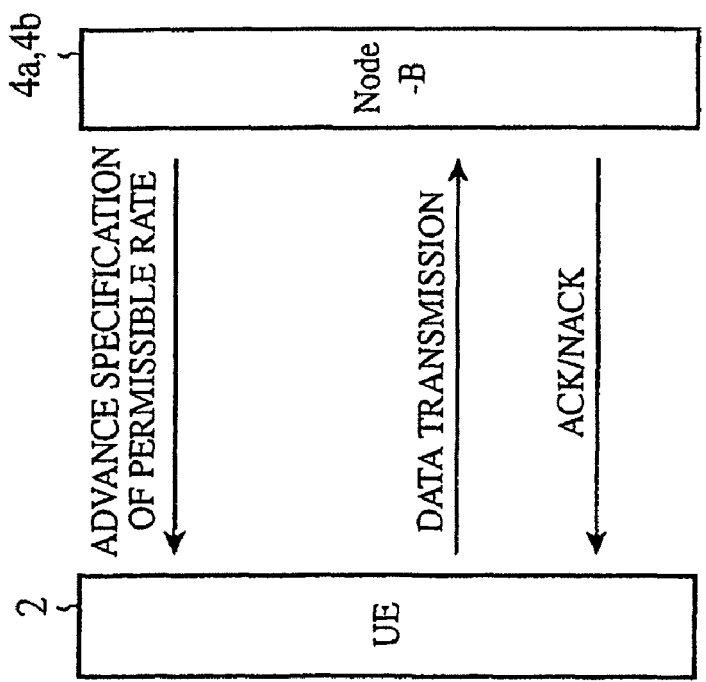

FIGS. 3A and 3B are diagrams for explaining a communications mode in wireless multi-data mode communications between the terminal and each base station in the mobile communication system in accordance with embodiment 1. As shown in FIG. 3A, when data transmission processing is carried out in an autonomous mode, each of the base stations (Node-B) 4a and 4b specifies a range of permissible rates first for the terminal (UE) 2 in advance. At this time, the UE transmits data to each Node-B at an arbitrary time and at a rate which falls within the range of permissible rates. When receiving data from the UE, each Node-B transmits a response signal (ACK/NACK) to the UE.

In the autonomous mode, it is not necessary to necessarily specify the range of permissible rates for every packet transmission, and to-and-fro communications processing including transmission of data and a response to the data transmission only have to be carried out basically.

For this reason, the autonomous mode has an advantage of having small wastes in signaling and a short delay time because the UE can carry out transmission of data freely when desiring to transmit the data.

On the contrary, a disadvantage of the autonomous mode is that a noise rise margin required for the amount of interference which will occur when transmission of data is carried out must be always secured so that the UE can transmit the data at an arbitrary time.

On the other hand, in the data transmission processing in the scheduling mode, the UE transmits information, such as information indicating the status of a UE buffer, to each Node-B, as shown in FIG. 3B. When receiving the information, each Node-B carries out scheduling for transmission of uplink packets to two or more UEs, and also assigns a time period (or a subframe) during which a UE is permitted to carry out transmission of data and a transmission rate to the UE which is permitted to transmit data by the Node-B. The UE transmits packets to each Node-B according to the assigned time period and transmission rate, and receives a response signal from each Node-B.

The scheduling mode has an advantage that it is not necessary to set up an excessive noise rise margin since any UE to which a time period and a transmission rate are not assigned by the scheduler does not carry out transmission of data.

On the other hand, the scheduling mode has a disadvantage that it is necessary to carry out two-time to-and-fro communications processing including at least communications processing required for the scheduling, and processing for transmitting data body, and therefore a delay time occurs inevitably.

In addition, since a signaling for notifying the existence of transmission data in the UE to each Node-B must be performed in advance, the efficiency will be worsened when the amount of transmission data is small with respect to the number of times that the signaling is carried out.

In the autonomous mode, each base station does not specify the transmission timing and the terminal itself determines the transmission timing autonomously. On the other hand, in the scheduling mode, each base station specifies and notifies the transmission timing to the terminal, and the terminal transmits data to each base station according to the transmission timing.

Furthermore, even in the scheduling mode, each base station may specify the data rate. For example, in the autonomous mode each base station specifies and notifies the transmission data rate for data transmission to the terminal, whereas even in the scheduling mode each base station may specify and notify the transmission timing and transmission data rate to the terminal so as to control data transmission by the terminal.

Figure 4:
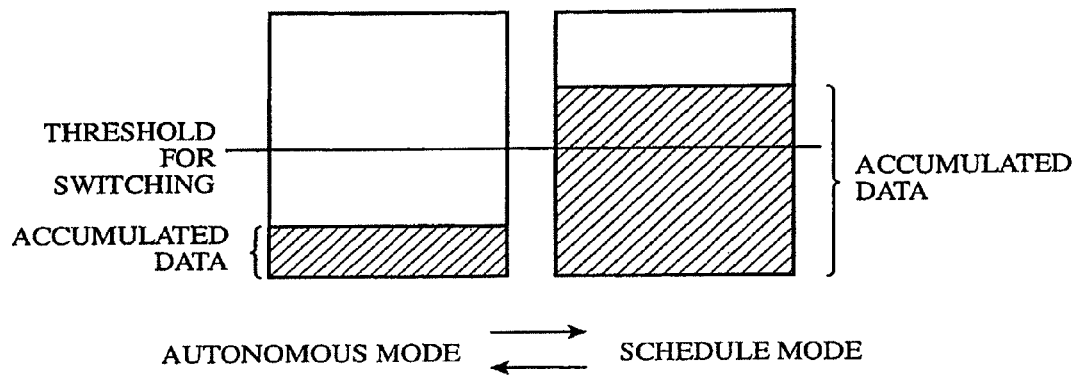
FIG. 4 is a diagram explaining the threshold of a transmission data buffer which is used as a reference for switching between communication modes of the mobile communication terminal according to embodiment 1.

FIG. 4 is a diagram explaining a threshold (threshold) of the transmission data buffer, which is used as a reference to make the mobile communication terminal in accordance with embodiment 1 switch between the communication modes. The mobile communication terminal 2 operates in the autonomous mode when it is placed in a state where transmission data having an amount equal to or smaller than the threshold of the transmission data buffer remains therein. On the other hand, when transmission data having an amount exceeding the above-mentioned threshold remains in the transmission data buffer, the mobile communication terminal 2 switches to the scheduling mode and then operates.

Thus, the terminal 2 switches between the autonomous mode and the scheduling mode based on the threshold associated with the storage amount of transmission data in the transmission data buffer. The determination of this threshold will be mentioned later.

Figure 5:
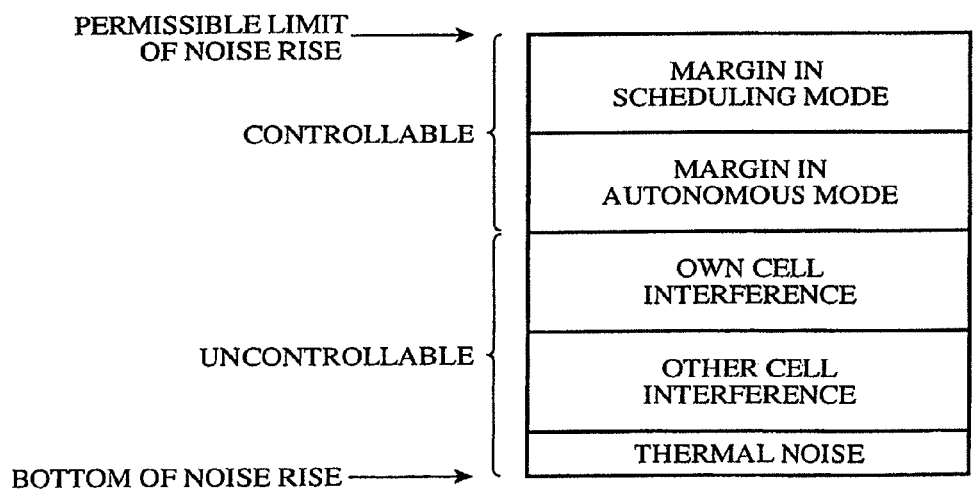
FIG. 5 is a diagram showing a permissible margin for an amount of interference resulting from factors playing into uplink signals transmitted to each base station in accordance with embodiment 1.

FIG. 5 is a diagram showing a permissible margin for an amount of interference (referred to as a noise rise from here on) resulting from factors playing in uplink signals transmitted to each base station in accordance with embodiment 1. In general, in a CDMA system, although a certain amount of interference is permitted for a received encoded signal, if the amount of interference exceeds the permissible limit of the noise rise, the amount of interference becomes larger than the magnitude of the signal and it is therefore impossible to decode the above-mentioned signal correctly even if back spreading is performed on the signal.

For this reason, it is important how the noise rise is controlled so that the ideal amount of interference falls within a range from a zero state (i.e., the bottom of the noise rise) to the permissible limit of interference at which any received signal can be decoded in order to secure the capacity of each base station (i.e., the number of terminals which can be accommodated by each base station).

As shown in the figure, a noise rise which results from transmission in the scheduling mode or transmission in the autonomous mode and which is included in noise rises which occur at each base station's end can be controlled so that it falls within a margin in the scheduling mode and a margin in the autonomous mode by switching between these transmission modes properly in the uplink packet communications.

On the other hand, a noise rise which results from factors other than the scheduling mode and autonomous mode cannot be controlled so that it falls within the margin in the scheduling mode and the margin in the autonomous mode.

Factors responsible for such interference in each base station are, for example, own cell interference which is approximated by the total power of desired signals from terminals staying in the own cell, other-cell interference which is caused by needless reception of signals from terminals which are staying in the cover areas of other base stations, and thermal noise which is caused by a receiver disposed in each base station.

Therefore, whether to efficiently use the radio resources for the uplink packet communications depends upon how the range of the noise rise is adjusted by controlling the margin in the scheduling mode and the margin in the autonomous mode.

Figure 6:
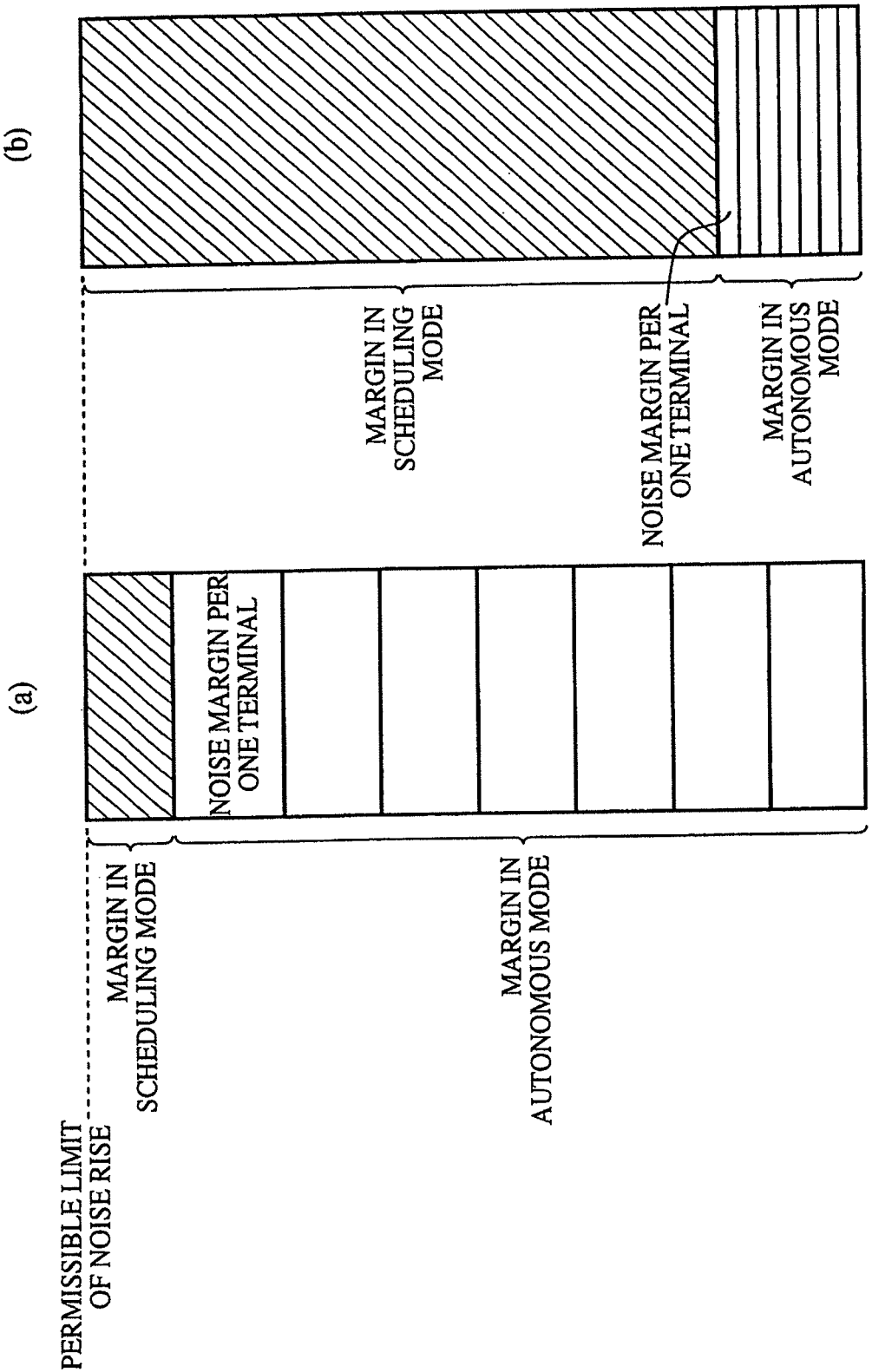
FIG. 6 is a diagram showing an example of a division of a noise rise margin between an autonomous mode and a scheduling mode when a plurality of terminals use uplink packet communications in the cell of each base station.

FIG. 6 is a diagram showing an example of a division of the noise rise margin (i.e., the permissible amount of interference) of each base station between the autonomous mode and the scheduling mode when a plurality of terminals use the uplink packet communications in the cell of each base station. The illustrated example shows a case where a larger number of terminals are accommodated in the cell of each base station as compared with a below-mentioned case of FIG. 8.

As will be mentioned later in detail, a margin of a fixed range which is determined by the RNC 3 in consideration of the QoS parameters, such as a delay time, is set, as a controllable noise rise margin as shown in FIG. 5, to each base station in accordance with embodiment 1. When the permissible margin for the noise rise which results from the autonomous mode is acquired from this noise rise margin, a larger noise rise margin only has to be set per terminal in the cell.

At this time, since the whole noise rise margin is set to have a fixed range, a permissible margin (i.e., a diagonally shaded area) for the noise rise resulting from the scheduling mode must be reduced by only the increase in the noise rise margin per terminal, as shown in FIG. 6($a$).

Therefore, in the case shown in FIG. 6($a$), when the number of terminals in the cell which communicate with each base station in the scheduling mode increases, there is a possibility that the noise rise resulting from this increase cannot be controlled so that it falls within the permissible margin.

On the contrary, when the noise rise margin per terminal in the cell for the uplink packet communications is set to be smaller, a larger permissible margin (i.e., a diagonally shaded area) for the noise rise resulting from the scheduling mode can be secured in each base station, as shown in FIG. 6($b$).

In other words, when a large number of terminals which communicate with each base station in the scheduling mode exist within the cell, it is necessary to reduce the permissible margin per terminal for the noise rise resulting from the autonomous mode as much as possible.

In the uplink packet communications, as the amount of data which a terminal transmits to each base station at a time becomes less, the transmission rate decreases. At this time, since the terminal lowers the transmission power required for the data transmission, the noise rise in the signal received by each base station also decreases.

Therefore, as shown in FIG. 6($b$), in order to reduce the permissible margin per terminal for the noise rise resulting from the autonomous mode as much as possible, what is necessary is just to reduce the noise rise itself resulting from the autonomous mode, that is, to cause the terminal to carry out communications at a low data rate in the autonomous mode.

Figure 7:
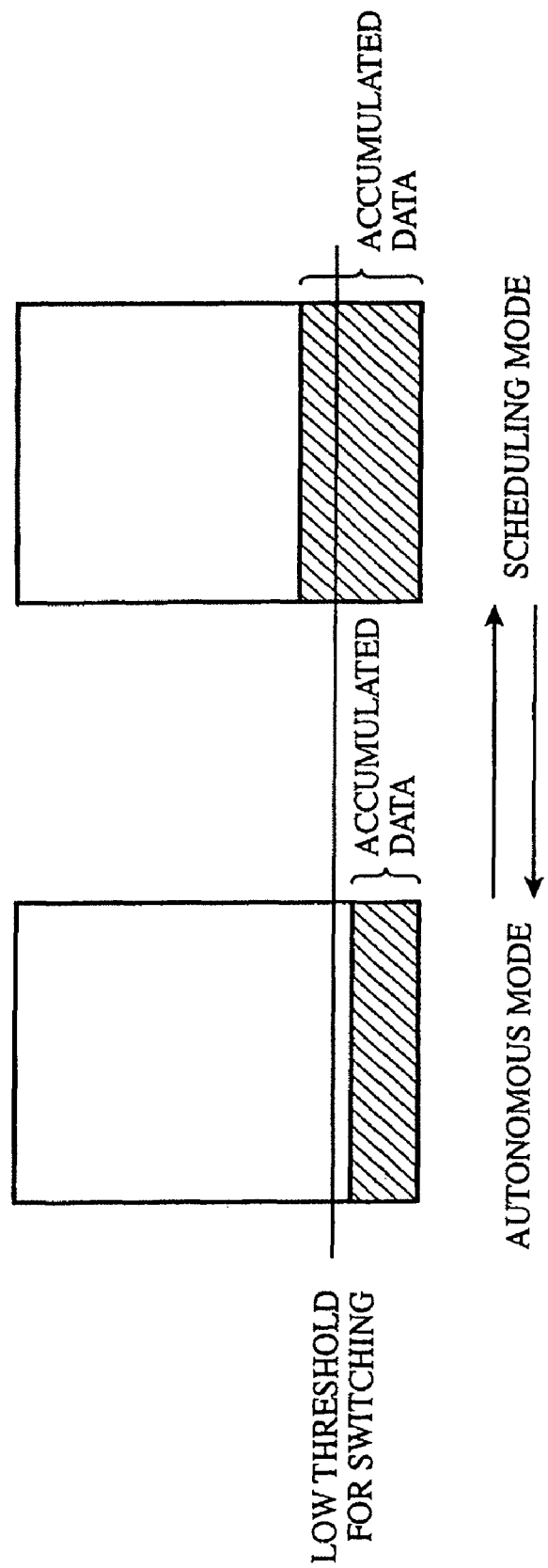
FIG. 7 is a diagram showing a case where the threshold for determining whether to switch between the communication modes of the transmission data buffer is set to be low in the example of FIG. 6.

To be more specific, it is desirable to, when there are many terminals accommodated in the cell, set the threshold used for determining whether to switch between the communication modes of the transmission data buffer of each terminal to be lower, and to, when the amount of transmission data exceeds a small-amount range at low data rates, switch from the autonomous mode to the scheduling mode, as shown in FIG. 7.

Figure 8:
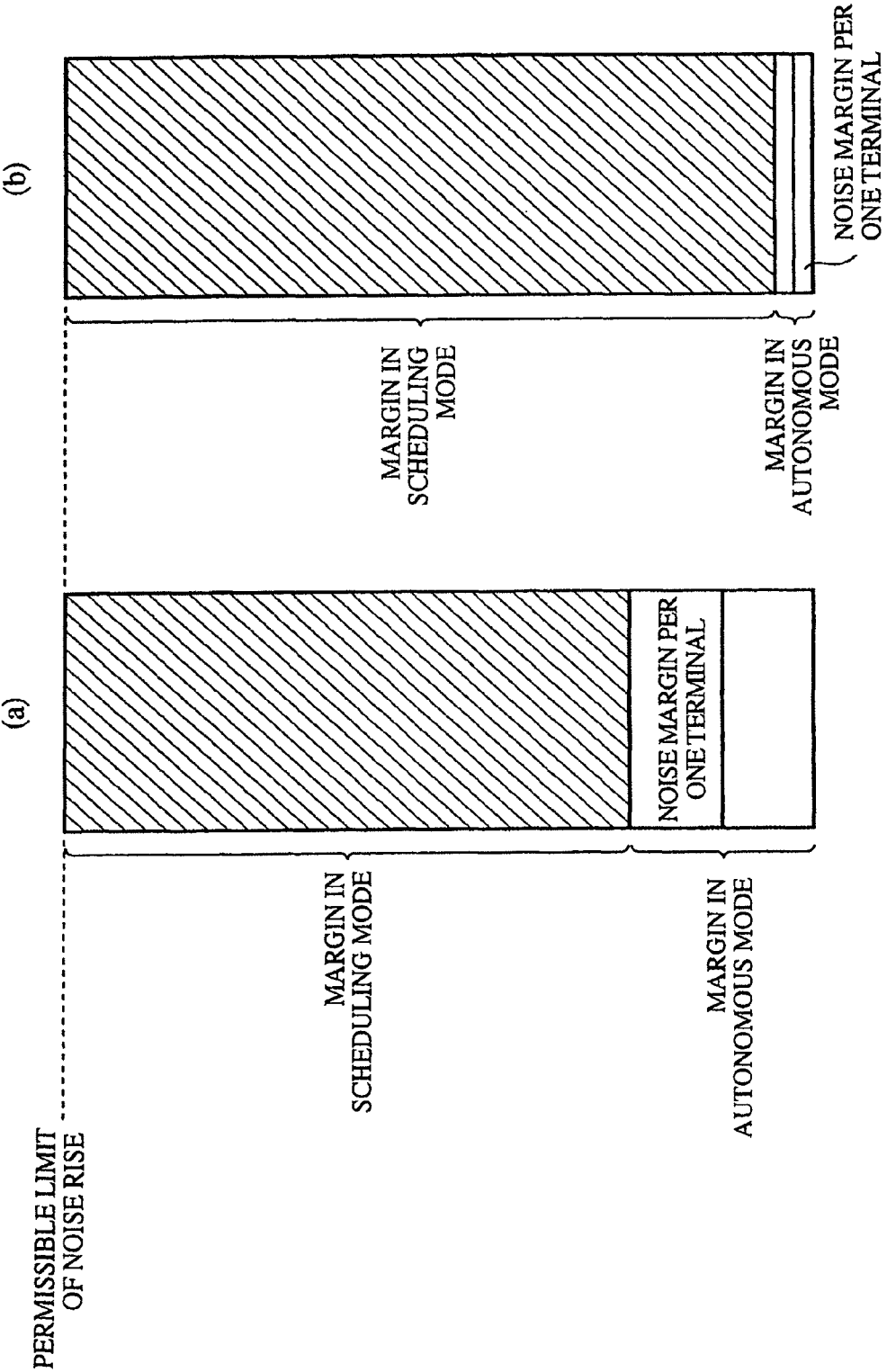
FIG. 8 is a diagram showing an example of a division of the noise rise margin between the autonomous mode and the scheduling mode when there are few terminals which use packet communications in the cell of each base station.

Then, as shown in FIG. 8, a case where a small number of terminals using uplink packet communications exist in the cell (in the example of FIG. 8, two terminals exist in the cell as compared with the case of FIG. 6 where seven terminals exist in the cell) will be described as an example. In this case, even if a large noise rise margin per terminal is set in each base station, as shown in FIG. 8($a$), a sufficient permissible margin (i.e., a diagonally shaded area) for the noise rise resulting from the scheduling mode can be secured in each base station.

As shown in FIG. 8(b), even if a smaller noise rise margin per terminal is set in each base station, there is not much difference between the permissible margin for the noise rise resulting from the scheduling mode and that in the case of FIG. 8(a).

In other words, when the number of terminals accommodated in the cell of a base station is small, each of the terminals can carry out communications with the base station at a higher data rate even in the autonomous mode as compared with the case of FIG. 6.

Figure 9:
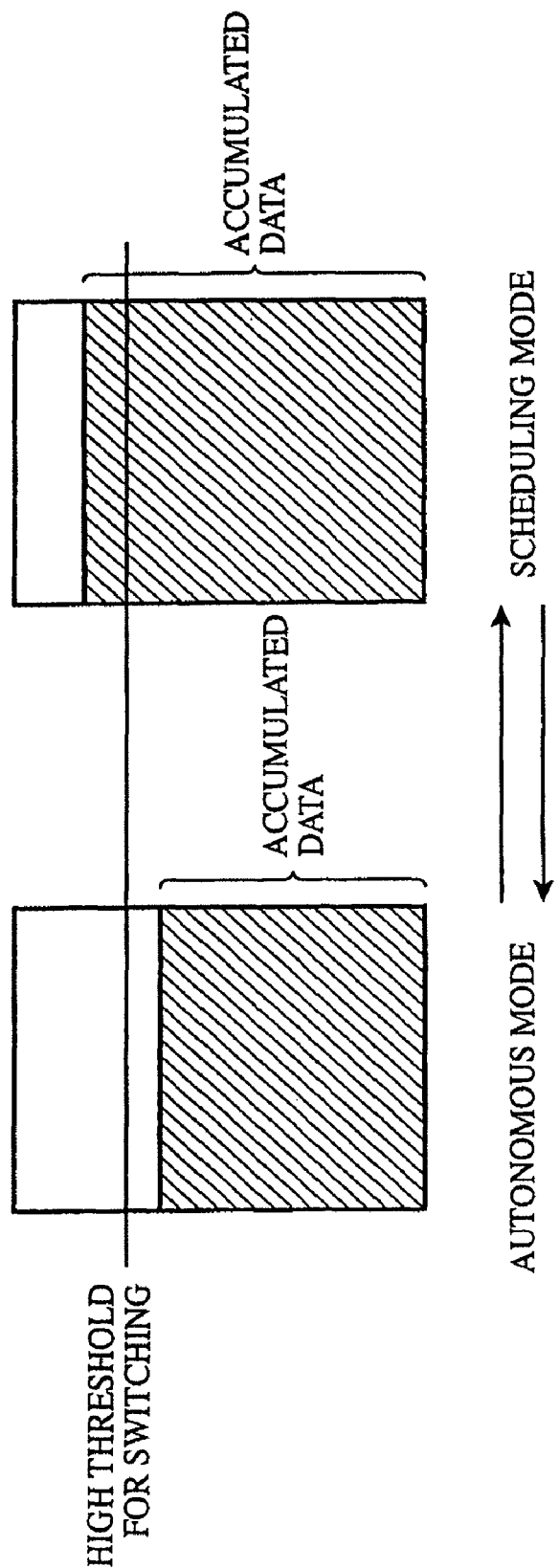
FIG. 9 is a diagram showing a case where the threshold for determining whether to switch between the communication modes of the transmission data buffer is set to be high in the example of FIG. 8.

To be more specific, when the number of terminals accommodated in the cell is small, the threshold used for determining whether to switch between the communication modes of the transmission data buffer of each terminal is set to be large so that a higher data rate can be permitted and therefore a larger amount of data can be handled even in the autonomous mode, as shown in FIG. 9.

As can be seen from the above description, it is clear that in order to implement reduced-interference high-quality communications it is desirable to properly change the above-mentioned threshold of the transmission data buffer of each terminal according to the traffic situation in the communications between each terminal and each base station, for example, the number of the terminals which operate in the scheduling mode within the cell and the operating states of the terminals, and schedules according to which the terminals operation in the autonomous mode and the operating states of the terminals.

Taking into consideration that the system has a communication characteristic of having a small transmission delay time in the autonomous mode, it is desirable to, when the permissible margin for division of the noise rise is enough, cause a terminal which makes a severe request about delay times to communicate with each base station in the autonomous mode if possible.

Figure 10:
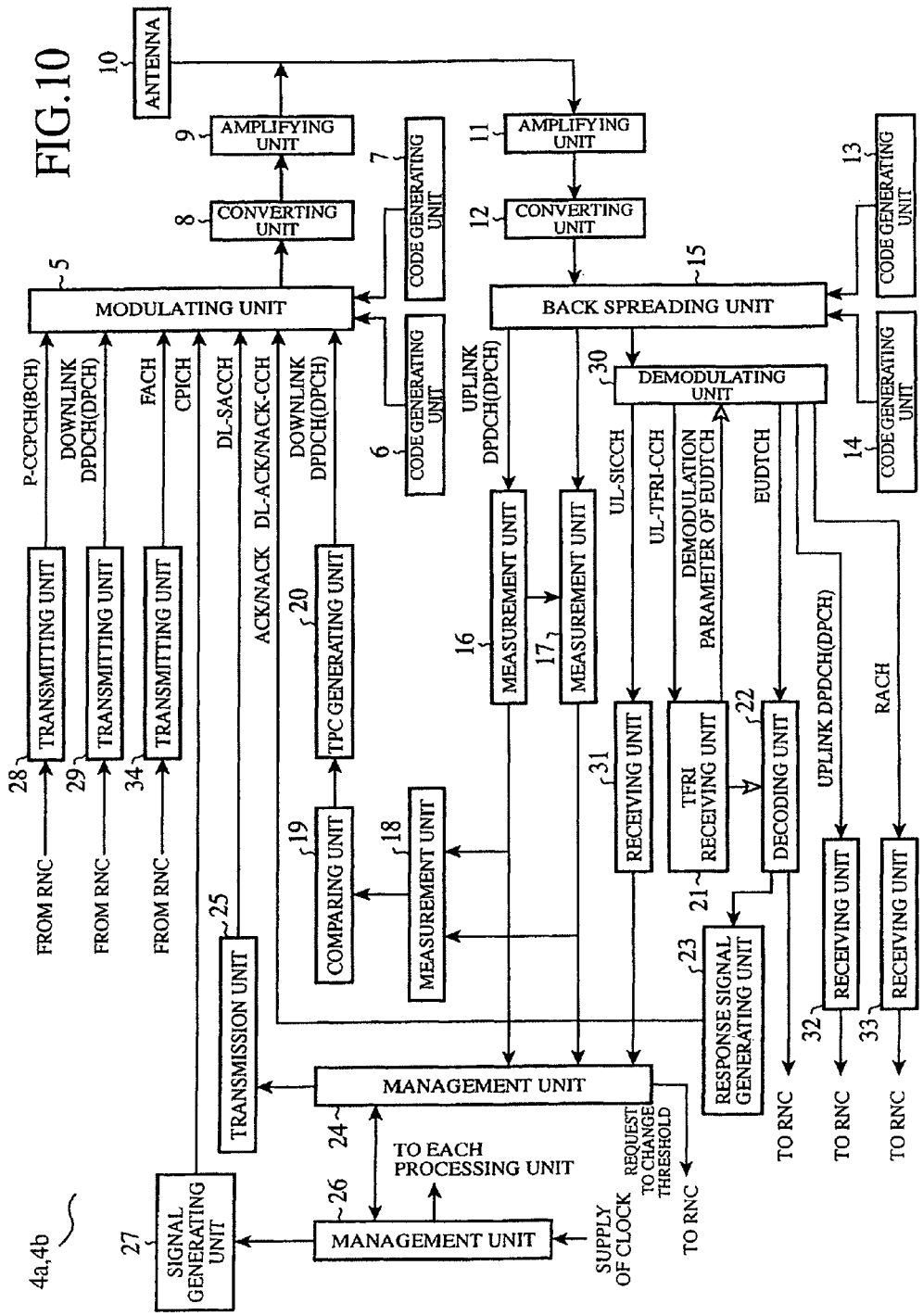
FIG. 10 is a block diagram showing the internal structure of each base station shown in FIG. 1.

FIG. 10 is a block diagram showing the internal structure of each base station shown in FIG. 1. Hereafter, the fundamental operation of each base station will be explained with reference to this diagram. In FIG. 10, in order to prevent redundant description, simplified names are given to formation parts which will be mentioned later, and the same formation parts as previously mentioned are designated by the same reference numerals.

First, processing common to both general CDMA modulation and demodulation will be explained.

A transmitting operation will be explained first. A modulating unit 5 disposed in each of the base stations 4a and 4b multiplies signals received via channels (P-CCPCH, downlink DPDCH, FACH, CPICH, DL-SACCH, DL-ACK/NACK-CCH, downlink DPCCH, etc.) by a channelization code generated by a downlink channelization code generator 6, and then multiplexes these signals into a signal.

The modulating unit 5 then multiplies the signal into which those signals associated with the channels are multiplexed by a scrambling code generated by a downlink scrambling code generator 7, and performs spectrum spread processing on the signal which is multiplied by the scrambling code.

A baseband signal which is a signal associated with each of the channels multiplexed by the modulating unit 5 is outputted to a frequency converting unit 8. The frequency converting unit 8 increases the frequency of the above-mentioned baseband signal to a carrier frequency, and outputs it to a power amplifying unit 9. The power amplifying unit 9 amplifies the signal furnished thereto from the frequency converting unit 8 using an internal power amplifier so that the signal has desired power. The signal amplified by the power amplifying unit 9 is transmitted to the terminal 2 via an antenna 10.

When receiving a clock signal which serves as a reference from a timing management unit 26, a pilot signal generating unit 27 assigns a pilot signal which the terminal 2 uses as a reference for demodulation processing to CPICH, and sends out it to the whole of the cell.

Next, a receiving operation will be explained. A weak signal received via the antenna 10 is furnished to a low noise amplifier unit 11. After amplifying this signal, this low noise amplifier unit 11 outputs the amplified signal to a frequency converting unit 12. The frequency converting unit 12 reduces the frequency of the signal furnished thereto from the low noise amplifier unit 11 to the frequency of the above-mentioned baseband signal.

A back spreading unit 15 multiplies the baseband signal whose frequency is frequency-converted by the frequency converting unit 12 by a scrambling code generated by an uplink scrambling code generator 13 and performs back spreading processing on the multiplication result so as to extract a signal component associated with each terminal. A demodulating unit 30 demultiplexes the signal on which the back spreading processing is performed and which is furnished thereto from the back spreading unit 15 into signals respectively associated with channels using a channelization code generated by an uplink channelization code generator 14.

Then, a process of acquiring the power of a signal and the power of interference will be explained.

First, a desired wave power measurement unit 16 acquires the power of a desired wave from a pilot signal associated with DPCCH from the back spreading unit 15. On the other hand, the low noise amplifier unit 11 acquires the total reception power of the received signal in which the desired wave and a noise coexist via the antenna 10.

An interference wave power measurement unit 17 acquires the power of an interference wave which is a noise component by subtracting the power of the desired wave acquired by the desired wave power measurement unit 16 from the above-mentioned total reception power furnished thereto via the low noise amplifier unit 11, frequency converting unit 12, and back spreading unit 15.

Then, the power of the desired wave and that of the interference wave are sent from the measurement units 16 and 17 to an uplink packet transmission management unit 24, respectively. Thus, the uplink packet transmission management unit 24 acquires the power of the desired signal from each terminal staying in the own cell.

The uplink packet transmission management unit (i.e., a communication management unit) 24 also acquires interference components (i.e., noise rises) which are caused by own cell interference in the uplink packet communications, other-cell interference, and thermal noise from the RNC 3.

Since a code for interference (other-cell interference and thermal noise) other than the own cell interference is unknown, no signal can be separated from any noise. For this reason, the uplink packet transmission management unit 24 acquires an interference component other than the own cell interference component from the RNC 3 as the power of the interference in which the other-cell interference and the noise caused by thermal noise coexist. Although the other-cell interference and the thermal noise coexist in the above-mentioned interference component and cannot be distinguished from each other, it is not necessary to distinguish especially between them in the process of controlling the amount of interference.

Then, the uplink packet transmission management unit 24 subtracts the permissible margin associated with the own cell interference and the permissible margin associated with the interference in which the other-cell interference and the noise caused by thermal noise coexist from a permissible margin of a fixed range which is based on a jamming margin so as to acquire the noise rise margin which is controllable in the uplink packet communications.

The jamming margin is an index indicating a maximum permissible accommodation capacity (i.e., the number of terminals which can be accommodated in the cell), and is defined as the ratio J/S of the signal power S to the power J of interference components. The accommodation capacity of the cell (i.e., the number of terminals which can be accommodated in the cell) can be acquired from the above-mentioned jamming margin.

The above-mentioned accommodation capacity shows the number of terminals which can be accommodated in the cell of the base station in question except for terminals which are a target for communications of a certain base station at the current time.

The above-mentioned jamming margin is computed by a below-mentioned radio resources management unit disposed in the RNC 3 according to, for example, the following relational equation.

First, when the power of a signal received by the base station is S (W) and the transfer rate at which communication data is transmitted is R (bit/second), the power Eb per 1 bit of the signal is expressed by the following equation (1):

$$Eb = S/R \quad (1)$$

where S is the power of the signal from the mobile communication terminal 2 which is received by the base station. It is further assumed that the base station receives the signal at a uniform level using a high-speed power control function (i.e., an inner loop) which is based on a TPC command of CDMA. In the W-CDMA, S can be acquired from the intensity of the pilot signal, and R can be acquired using a command such as TFCI.

Next, the power $I_0$ (W) of the interference components from other terminals staying in the cell of the base station can be expressed by, for example, the following equation (2):

$$I_0 = \sum_{i=1}^{N-1} \frac{Si}{Ri} = \frac{(N-1)S}{R} \quad (2)$$

where N (number) is a maximum number of terminals which can be accommodated in the cell, assuming that the local terminal is excluded from the terminals. Si is the power of a signal which the base station receives from a terminal 2 which is one of the first to (N−1)-th terminals, and the suffix i is a positive integer ranging from 1 to (N−1), and Ri is the transfer rate (bit/second) at which the base station receives communication data from a terminal 2 which is one of the first to (N−1)-th terminals.

As a result, $I_0$ is expressed by the sum of the signal powers of the other terminals, the number of these terminals being equal to (the maximum number N−1), In the above-mentioned equation (2), it is assumed that the signal power and transfer rate of each terminal 2 are equal and are given by S and R, respectively.

Since it is inconvenient to distinguish noise for every band width, the interference components caused by the other-cell interference and the thermal noise are processed as an average noise power spectral density No (W) which is converted into noise energy per Hz without distinguishing noise for every band width as mentioned above.

When the spectrum band of a spread spectrum signal is W (Hz) and the power of narrowband disturbance noise is J (W), (No+Io) which is the noise rises (i.e., the amount of interference) caused by the own cell interference, the other-cell interference, and the thermal noise can be expressed by the following equation:

$$No + Io = J/W \quad (3)$$

where SIR (Signal-to-Interference Ratio) can be acquired from Eb/(No+Io) which is the ratio of the energy Eb per 1 bit of the signal, and the sum of the noise rises caused by the thermal noise, the other-cell interference, and the own cell interference.

Using the above-mentioned equations (1) and (3), SIR can be expressed by the following equation (4):

$$Eb/(No+Io) = S \cdot W/(J-R) \quad (4)$$

Transformation of the above-mentioned equation (4) to obtain the limit of the jamming margin (jamming margin) J/S at which demodulation can be performed in CDMA yields the following equation (5):

$$J/S = (W/R)/\{Eb/(No+Io)\} \quad (5)$$

The RNC 3 determines the permissible margin having a fixed range in which a margin associated with the interference which is determined in consideration of the QoS parameters, such as the operating states of other cells other than target base stations which the RNC itself manages, the traffic conditions of the cells of the target base stations, and delay times, is incorporated into the above-mentioned jamming margin (i.e., acquires a margin by subtracting the margin associated with the interference which is determined in consideration of the QoS parameters, such as the operating states of other cells other than the target base stations, the traffic conditions of the cells of the target base stations, and delay times from the jamming margin) and notifies the determined permissible margin to the target base stations.

Each target base station performs noise rise control by performing a switching between the communication modes so that the noise rises are controlled to within the limit of the above-mentioned permissible margin notified from the RNC 3.

By doing in this way, each target base station can prevent the amount of interference in the received signal from exceeding the jamming margin which is the limit within which the signal can be demodulated under the influence of the operating states of other cells other than the local station upon the communications by the local station even if each target base station performs the above-mentioned control. The details of this processing will be explained later.

The uplink packet transmission management unit 24 disposed in each target base station uses a remaining margin which is obtained by subtracting the permissible margin (i.e., the uncontrollable margin shown in FIG. 5) for the noise rises caused by the thermal noise, the other-cell interference, and the own cell interference from the above-mentioned permissible margin of a fixed range as the controllable noise rise margin shown in FIG. 5.

Assuming that the power of a signal from any of all the terminals staying in the own cell is a constant value S, and the interference power J (W) results from the interference from other terminals other than the target terminal, the interference power J can be expressed by the following equation (6):

$$J = (N-1)S \quad (6)$$

The following equation (7) can be driven from the above-mentioned equations (5) and (6).

$$(N-1)=(W/R)/\{Eb/(No+Io)\} \tag{7}$$

In the above-mentioned equation (7), (N−1) is a maximum number of terminals, excluding the target terminal, which can be accommodated in the own cell. It is clear that as the transfer rate R of communication data is made to increase, the jamming margin decreases from the value given by the above-mentioned equation (5), and the capacity of terminals in the own cell decreases from the value given by the above-mentioned equation (7).

It is further clear that in a case where SIR between the target terminal and each base station increases, the jamming margin decreases from the value given by the above-mentioned equation (5) even when each base station makes a request of the target terminal for larger transmission power in order to secure a predetermined BER (bit error rate), for example.

Returning to the explanation about the operation of each base station, a channel quality measurement unit 18 computes a signal-to-interference power ratio (SIR) using the power of the desired wave and that of the interference wave furnished from the desired wave power measurement unit 16 and interference wave power measurement unit 17, respectively, and the power of the interference components caused by the own cell interference, the other-cell interference, and the thermal noise, which is acquired from the RNC 3, and outputs the computed signal-to-interference power ratio to a quality target comparing unit 19.

In the W-CDMA system, control of the transmission power of each terminal is carried out based on a target SIR value which is called an outer loop. This target SIR value is preset to the quality target comparing unit 19.

A decoding unit 22 disposed in each base station counts a block error rate (BLER) from CRC (Cyclic Redundancy Check) errors in communications with a target terminal, and, if a required BLER is no longer filled, performs a change in settings, e.g., increases the target SIR value preset to the quality target comparing unit 19. This operation is called outer loop power control.

On the other hand, the quality target comparing unit 19 compares the signal-to-interference power ratio (SIR) computed by the channel quality measurement unit 18 with the target signal-to-interference ratio (i.e., the target SIR value), and notifies the result of the comparison to a TPC generating unit 20.

When determining from the above-mentioned comparison result that the power of the desired signal in the received signal is smaller than that of the target signal, the TPC generating unit 20 assigns a command to increase the transmission power, as a TPC (Transmission Power Command) which is called an inner loop, to the downlink DPCCH, and outputs the command to the modulating unit 5.

The signal transmitted, via the downlink DPCCH, from the TPC generating unit 20 is transmitted to the terminal 2 via the modulating unit 5, frequency converting unit 8, power amplifying unit 9, and antenna 10, as mentioned above.

On the contrary, when determining from the above-mentioned comparison result that the power of the desired signal in the received signal is larger than that of the target signal, the TPC generating unit 20 assigns a command to decrease the transmission power to the downlink DPCCH, and outputs the command to the modulating unit 5. The subsequent processings are performed in the same way. Such the power control is called inner loop power control.

In the CDMA system, strengthening the intensity of a certain signal is exactly causing interference to other signals.

For this reason, each base station controls the power of a signal which it transmits or receives by performing the above-mentioned processing so that the power falls within a required and sufficient range of signal power.

Next, a scheme required for the uplink packet communications will be explained.

First, the operation in the autonomous mode will be explained.

In the operation in the autonomous mode, each of the base stations 4a and 4b transmits information about a transmission permissible margin to the terminal 2 using DL-SACCH or a similar downlink signaling channel in advance. The transmission permissible margin is information for specifying communication conditions required for each base station to demodulate a signal which the terminal 2 has transmitted, via uplink packet communications, to each base station in the autonomous mode. For example, the transmission permissible margin is a maximum permissible data rate.

After that, when receiving a signal from the terminal 2, the demodulating unit 30 demultiplexes the received signal into signals associated with channels according to the above-mentioned operation of the receive side.

A TFRI receiving unit 21 receives a signal associated with UL-TFRI-CCH, in which TFRI (Transport Format Resource Indicator) including modulation parameters selected by the terminal 2 and a transport format are set, among the signals associated with channels into which the received signal is demultiplexed by the demodulating unit 30.

The TFRI receiving unit 21 then extracts demodulation parameters for EUDTCH from the signal associated with UL-TFRI-CCH, and sets them to the demodulating unit 30 and decoding unit 22. The demodulating unit 30 demodulates the received signal to generate the data body transmitted, via EUDTCH, from the terminal 2 using the demodulation parameters for EUDTCH, and outputs the data body to the decoding unit 22. The decoding unit 22 decodes the data body transmitted, via EUDTCH, from the terminal 2 using the demodulation parameters for EUDTCH.

A response signal generating unit 23 determines whether the packet data transmitted from the terminal 2 has been correctly received by each of the base stations 4a and 4b using the decoded result obtained by the decoding unit 22.

When determining that the packet data has been correctly received by each of the base stations 4a and 4b, the response signal generating unit 23 generates ACK for notifying that each of the base stations has succeeded in the reception of the packet data, assigns it to DL-ACK/NACK-CCH, and sends it to the terminal 2 according to the above-mentioned sending operation. On the contrary, when determining that the packet data from the terminal 2 has an error, the response signal generating unit 23 generates NACK for notifying that the reception of the packet data has failed, and similarly sends it to the terminal 2.

Next, the operation in the scheduling mode will be explained.

In the operation in the scheduling mode, a transmission buffer amount receiving unit 31 receives a signal associated with UL-SICH from the demodulating unit 30 so as to acquire information about the transmission data in the terminal 2 placed in the scheduling mode, and notifies it to the uplink packet transmission management unit 24.

The uplink packet transmission management unit 24 of each base station acquires a timing for subframes from the timing management unit 26, and synthetically determines the amount of data which remain in the transmission data buffer of each terminal staying in the own cell of each base station, the transmission power margin of each terminal, etc., so as to determine a transmission timing for packets.

The uplink packet transmission management unit 24 notifies the determined transmission timing for packets to a transmitting rate/timing specification information transmitting unit 25. The transmitting rate/timing specification information transmitting unit 25 assigns subframes for which transmission is permitted and the transmission rate to DL-SACCH, and transmits them to the above-mentioned terminal 2 according to the above-mentioned sending operation.

After that, when receiving a signal from the above-mentioned terminal 2, the demodulating unit 30 demultiplexes the received signal into signals associated with channels according to the above-mentioned operation of the receive side.

The TFRI receiving unit 21 receives a signal associated with UL-TFRI-CCH, in which TFRI for subframes for which a permission for transmission is provided by the above-mentioned terminal 2 is set, among the signals associated with channels into which the received signal is demultiplexed by the demodulating unit 30.

The TFRI receiving unit 21 then extracts demodulation parameters for EUDTCH from the signal associated with UL-TFRI-CCH, and sets them to the demodulating unit 30 and decoding unit 22. The demodulating unit 30 demodulates the received signal to generate the data body transmitted, via EUDTCH, from the terminal 2 using the demodulation parameters for EUDTCH, and outputs the data body to the decoding unit 22. The decoding unit 22 decodes the data body transmitted, via EUDTCH, from the terminal 2 using the demodulation parameters for EUDTCH.

When a packet transmitted from the above-mentioned terminal 2 has been correctly received by each base station, the response signal generating unit 23 of each base station generates ACK and assigns this to DL-ACK/NACK-CCH, and sends ACK to the terminal 2, whereas when determining that the packet has an error, the response signal generating unit generates NACK and assigns this to DL-ACK/NACK-CCH, and sends NACK to the terminal 2, as mentioned above.

Next, a scheme for performing a signaling to change the threshold used for switching between the communication modes of the transmission data buffer will be explained.

First, when notifying (or signaling) a change in the above-mentioned threshold to each terminal 2 staying in the own cell of a base station all at once, the uplink packet transmission management unit 24 of the base station determines the change in consideration of the traffic conditions of the own cell etc., and notifies the change to the RNC 3.

The RNC 3 takes into consideration the operating states, etc. of other base stations other than the base station which has provided the notification, generates information about the above-mentioned threshold (i.e., information indicating that the threshold should be changed to what value, etc.), inserts it into broadcast information, and then transmits the broadcast information to the base station in question.

A broadcast information transmitting unit 28 disposed in the base station receives the broadcast information into which the information about the above-mentioned threshold is inserted from the RNC 3, assigns the broadcast information to P-CCPCH (BCH), and transmits it to each terminal 2 according to the above-mentioned sending operation. The above-mentioned broadcast information can be assigned to another channel in some rare cases.

When setting the above-mentioned changed threshold to each individual terminal 2, the uplink packet transmission management unit 24 disposed in the base station which accommodates the terminal 2 in question in the cell thereof determines the change in the threshold in consideration of the traffic conditions etc. of the communications with the terminal 2 in question, and notifies the change to the RNC 3.

The RNC 3 takes into consideration the operating states, etc. of other base stations other than the base station which has provided the notification, generates information about the above-mentioned threshold (i.e., information indicating that the threshold should be changed to what value, etc.), assigns it, as a message, to the dedicated channel, and transmits it to the base station in question.

When receiving the message about the above-mentioned threshold via the dedicated channel, a downlink dedicated channel transmission unit 29 disposed in the base station assigns the message to downlink DPDCH (DPCH), and transmits it to the terminal 2 which should change the above-mentioned threshold according to the above-mentioned sending operation. When there is a response message to the above-mentioned message, an uplink dedicated channel receiving unit 32 receives it.

When the dedicated channel is released in the communications with the terminal 2, the RNC can assign the information about the above-mentioned threshold to the common channel.

When determining that the dedicated channel is released from the management information about the radio resources, the RNC 3 assigns, as a message, the information about the above-mentioned threshold to the common channel, and transmits it to the base station.

When receiving the message about the above-mentioned threshold via the common channel, the downlink common channel transmitting unit 34 disposed in the base station assigns the message to FACH, and transmits the message to the terminal 2 which should change the above-mentioned threshold according to the above-mentioned sending operation. When there is a response message to the above-mentioned message, an uplink common channel receiving unit 33 receives it.

In the above explanation, the scheme for determining a change in the above-mentioned threshold on the side of the base station is explained. As an alternative, the base station can be so constructed as to determine the transmission mode itself which should be set to the terminal 2.

In this case, in the above-mentioned signaling operation for changing the threshold, not the information about the threshold but information specifying the transmission mode which should be set to the terminal 2 is transmitted to the terminal 2. The details of this processing will be mentioned later.

Figure 11:
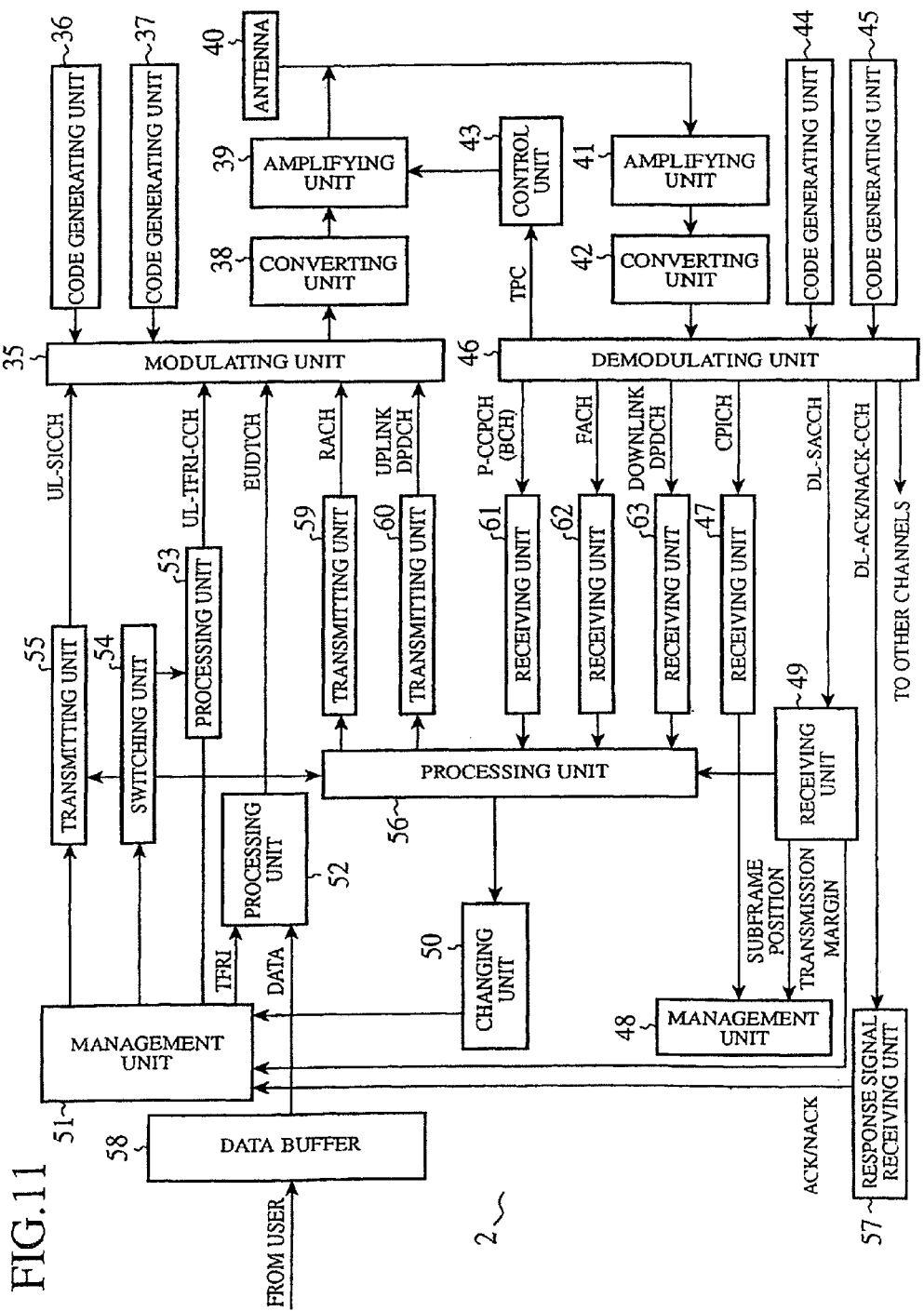
FIG. 11 is a block diagram showing the internal structure of the mobile communication terminal shown in FIG. 1.

FIG. 11 is a block diagram showing the internal structure of the mobile communication terminal shown in FIG. 1, and the fundamental operation of the mobile communication terminal will be explained with reference to this figure. In FIG. 11, in order to prevent redundant description, simplified names are given to formation parts which will be mentioned later, and the same formation parts as previously mentioned are designated by the same reference numerals.

First, processing common to both general CDMA modulation and demodulation will be explained.

A sending operation will be explained first. A modulating unit 35 multiplies signals associated with channels (UL-SICCH, UL-TFRI-CCH, EACH, uplink DPCH, etc.) by a channelization code generated by an uplink channelization code generator 36, and then multiplexes these signals into a signal. The modulating unit 35 then multiplies the signal into which those signals associated with the channels are multiplexed by a scrambling code generated by an uplink scrambling code generator 37, and performs spectrum spread processing on the signal multiplied by the scrambling code.

A baseband signal which is a signal associated with each of the channels multiplexed by the modulating unit 5 is outputted to a frequency converting unit 38. The frequency converting unit 38 increases the frequency of the above-mentioned baseband signal to a carrier frequency, and outputs it to a power amplifying unit 39.

The power amplifying unit 39 amplifies the signal furnished thereto from the frequency converting unit 38 using an internal power amplifier so that the signal has desired power. The signal amplified by the power amplifying unit 39 is transmitted to each of the base stations 4a and 4b via an antenna 40.

Next, a receiving operation will be explained. A weak signal received via the antenna 40 from a base station is furnished to a low noise amplifier unit 41. After amplifying this signal, this low noise amplifier unit 41 outputs the amplified signal to a frequency converting unit 42. The frequency converting unit 42 reduces the frequency of the signal furnished thereto from the low noise amplifier unit 41 to the frequency of the above-mentioned baseband signal.

A back spreading demodulating unit 46 multiplies the baseband signal whose frequency is frequency-converted by the frequency converting unit 42 by a scrambling code generated by the downlink scrambling code generator 45 and performs back spreading processing on the result of the multiplication so as to demultiplex the received signal into signals associated with channels using a channelization code generated by a downlink channelization code generator 44.

After that, the back spreading demodulating unit 46 outputs a TPC command included in the signal received from the base station to a power controller 43. The power controller 43 instructs the power amplifying unit 39 to increase or decrease the transmission power according to the above-mentioned TPC command, so that the power amplifying unit 39 determines the transmission power according to the command.

A signal associated with CPICH among the signals associated with channels into which the received signal is demultiplexed by the back spreading demodulating unit 46 is received by a common pilot signal receiving unit 47.

The common pilot signal receiving unit 47 makes the timing for demodulation coincide with the base station, and supplies a timing signal indicating the timing to a timing management unit 48. The timing management unit 48 distributes the timing signal supplied from the common pilot signal receiving unit 47 to each of the processing units disposed in the mobile communication terminal 2, and performs processing synchronized with the base station.

Next, a scheme required for the uplink packet communications will be explained.

First, the operation in the autonomous mode will be explained.

In the operation in the autonomous mode, a transmission permission information receiving unit 49 disposed in the mobile communication terminal 2 receives the transmission permissible margin from each base station using DL-SACCH or a similar downlink signaling channel. This transmission permissible margin is notified to an uplink packet transmission management unit 51 by the transmission permission information receiving unit 49. In the autonomous mode, the transmission timing is arbitrary.

After that, when the user sets data to be transmitted from the mobile communication terminal 2 to each base station, the mobile communication terminal 2 stores the transmission data in a transmission data buffer 58 for uplink packet communications.

In the autonomous mode, in order to start transmission immediately, the uplink packet transmission management unit (i.e., a communication management unit) 51 specifies a TFRI which is suited to the amount of the transmission data in consideration of the above-mentioned transmission permissible margin, and notifies the TFRI to a TFRI transmission processing unit 53.

The TFRI transmission processing unit 53 transmits the TFRI to each base station according to the above-mentioned sending operation after assigning the TFRI to UL-TFRI-CCH. As a result, the sending operation is controlled so that the noise rise is reduced to within the range of above-mentioned transmission permissible margin specified by each base station.

After converting the data stored in the transmission data buffer 58 for uplink packet communications into data having a transmission format specified by the above-mentioned TFRI, a EUDTCH transmission processing unit 52 assigns the data body to EUDTCH and transmits the data body to each base station according to the above-mentioned sending operation.

When receiving the above-mentioned packet data from the mobile communication terminal 2, each base station assigns a response signal indicating a response to this packet data to DL-ACK/NACK-CCH, and transmits it to the terminal 2. Then, a response signal receiving unit 57 of the mobile communication terminal 2 determines whether the response signal received via the above-mentioned DL-ACK/NACK-CCH indicates ACK or NACK according to the above-mentioned receiving operation.

When determining that the response signal indicates ACK, the response signal receiving unit 57 notifies the result of the determination to the uplink transmission packet management unit 51. After that, the uplink transmission packet management unit 51 shifts to a process of transmitting the next packet data to each base station.

On the other hand, when the response signal receiving unit 57 determines that the response signal indicates NACK, the uplink transmission packet management unit 51 shifts to a process of resending the packet data for which the response is determined as NACK to each base station. When resending the packet data, the EUDTCH transmission processing unit 52 causes the packet data have redundancy, such as incremental redundancy, as occasion demands.

Next, the operation in the scheduling mode will be explained.

In the operation in the scheduling mode, when the user sets data which is to be transmitted from the mobile communication terminal 2 to each base station, this transmission data is stored in the transmission data buffer 58 for uplink packet communications.

After that, a buffer state transmission unit 55 which has received a command from the uplink packet transmission management unit 51 assigns the amount of the data to be transmitted to each base station, a margin for the transmission power of the terminal 2, etc. to UL-SICCH, and transmits them to each base station according to the above-mentioned sending operation.

When receiving the signal associated with UL-SICCH, each base station determines a proper transmission timing at which signals from terminals 2 accommodated in the own cell interfere with one another the least in consideration of the state of the transmission data buffer 58 of each of the terminals 2. As a result, each base station assigns a command for giving permission to transmit packet data at the transmission timing to each terminal 2 to DL-SACCH and transmits it to each terminal 2, according to the above-mentioned sending operation.

The transmission permission information receiving unit 49 of the mobile communication terminal 2 receives information assigned to DL-SACCH, including the transmitting rate, subframe timing, etc., which are permitted by each base station. This information is then delivered from the transmission permission information receiving unit 49 to the timing management unit 48 and uplink packet transmission management unit 51.

The uplink packet transmission management unit 51 specifies TFRI which is suited to the amount of transmission data, and notifies the TFRI to the TFRI transmission processing unit 53. The TFRI transmission processing unit 53 assigns the TFRI to UL-TFRI-CCH, and transmits it to each base station according to the above-mentioned sending operation.

The EUDTCH transmission processing unit 52 reads the data stored In the transmission data buffer 58 for uplink packet communications, and, after converting the data into data having a transmit format specified by the above-mentioned TFRI which the TFRI transmission processing unit 53 has transmitted to each base station, assigns the data body to EUDTCH and transmits it to each base station according to the above-mentioned sending operation.

When receiving the above-mentioned packet data from the mobile communication terminal 2, each base station assigns a response signal indicating a response to this packet data to DL-ACK/NACK-CCH and transmits it to the terminal. The response signal receiving unit 57 of the mobile communication terminal 2 determines whether the response signal received via the above-mentioned DL-ACK/NACK-CCH indicates ACK or NACK according to the above-mentioned receiving operation.

When determining that the response signal indicates ACK, the response signal receiving unit 57 notifies the result of the determination to the uplink transmission packet management unit 51. After that, the uplink transmission packet management unit 51 shifts to a process of transmitting the next packet data to each base station.

On the other hand, when the response signal receiving unit determines that the response signal indicates NACK, the uplink transmission packet management unit 51 shifts to a process of resending the packet data for which the response is determined as NACK to each base station.

When resending the packet data, the EUDTCH transmission processing unit 52 causes the packet data to have redundancy, such as incremental redundancy, as occasion demands.

Then, a scheme required to switch between the transmission modes will be explained.

First, the uplink packet transmission management unit 51 compares the threshold provided from a threshold changing unit 50 with the amount of data which remain in the transmission data buffer 58 for uplink packet communications.

At this time, when the amount of data which remain in the transmission data buffer is larger than the threshold, the uplink packet transmission management unit 51 notifies a transmission mode switching unit 54 that the switching between the transmitting modes is completed.

When the switching between the transmission modes by the transmission mode switching unit 54 is completed, the buffer state transmission unit 55 assigns information indicating that the switching between the transmission modes is completed to UL-SICCH, and transmits it to each base station according to the above-mentioned sending operation.

The TFRI transmission processing unit 53 can alternatively assign the information indicating that the switching between the transmission modes is completed to UL-TFRU-CCH, and can transmit it to each base station. Furthermore, a protocol processing unit 56 which has received the information indicating that the switching between the transmission modes is completed from the transmission mode switching unit 54 notifies the information to an uplink dedicated channel transmission unit 60.

As a result, the uplink dedicated channel transmission unit 60 can assign, as a message, the information indicating that the switching between the transmission modes is completed to the uplink DPCH, and can transmit it to each base station. Thus, the mobile communication terminal 2 notifies each base station that the switching between the transmission modes is completed using a certain channel.

Next, a scheme required to change the threshold associated with switching between the transmission modes will be explained.

First, when notifying a change in the threshold to all terminals 2 in the own cell all at once, each base station inserts information about the threshold into the broadcast information (BCH) to be transmitted to each mobile communication terminal 2.

A broadcast information receiving unit 61 of each mobile communication terminal 2 receives the set of broadcast information from each base station according to the above-mentioned receiving operation, and notifies it to the protocol processing unit 56. The protocol processing unit 56 interprets the broadcast information.

At this time, when interpreting the above-mentioned broadcast information as a command for changing the above-mentioned threshold of the transmission data buffer 58 for uplink packet communications, the protocol processing unit 56 sets the threshold which is changed according to the command to the threshold changing unit 50.

After that, the threshold changing unit 50 notifies the uplink packet transmission management unit 51 of the changed threshold. As a result, in this mobile communication terminal 2, the transmission mode is changed on the basis of the changed threshold.

Next, a case where the above-mentioned threshold is changed according to a layer-3 message will be explained.

In this case, two channels: the dedicated channel and the common channel can be considered as channels to be used.

First, changing the threshold using the dedicated channel will be explained.

The dedicated channel is used to specify the threshold for each individual terminal, for example.

The dedicated channel (e.g., a downlink DPCH) to which a message about the above-mentioned threshold delivered from the downlink dedicated channel transmission unit 29 of each base station is assigned is received by a downlink dedicated channel receiving unit 63 of each terminal 2, and is notified to the protocol processing unit 56. The protocol processing unit 56 interprets the contents associated with the dedicated channel.

At this time, when interpreting the message assigned to the above-mentioned dedicated channel as a command for changing the above-mentioned threshold, the protocol processing unit 56 sets the threshold to be changed according to the message to the threshold changing unit 50. The threshold changing unit 50 then notifies the uplink packet transmission management unit 51 of the changed threshold.

The uplink dedicated channel transmitting unit 60 assigns, as a message, the information indicating that the transmission mode has been changed to the uplink DPCH, and transmits it to each base station.

A case where the above-mentioned threshold is changed using the common channel 30 will be explained.

The common channel is used when the dedicated channel is released and the above-mentioned threshold is specified for each individual terminal 2, for example. Especially, the dedicated channel may be released temporarily to address low power consumption etc. In such a case, the common channel is used.

A message assigned to the common channel (FACH) from each base station is received by a downlink common channel receiving unit 62 according to the above-mentioned receiving operation. Then, the message is sent from the downlink common channel receiving unit 62 to the protocol processing unit 56. The protocol processing unit 56 interprets the above-mentioned message.

At this time, when interpreting the message assigned to the above-mentioned common channel as a command for changing the above-mentioned threshold, the protocol processing unit 56 sets the threshold to be changed according to the message to the threshold changing unit 50. The threshold changing unit 50 then notifies the uplink packet transmission management unit 51 of the changed threshold.

Furthermore, an uplink common channel transmitting unit 59 assigns, as a message, information indicating that the transmission mode has been changed to RACH, and transmits it to each base station.

Next, a case where the above-mentioned threshold is changed using a physical-layer signaling will be explained. The physical-layer signaling is to assign information about the above-mentioned threshold to a certain bit of information about a physical layer, which is used for setting the conditions of communications via the physical layer between the mobile communication terminal 2 and each base station. This information about the physical layer is assigned to, for example, to DL-SACCH.

The physical-layer signaling is used when specifying the above-mentioned threshold for each individual terminal 2, for example, and makes it possible to specify the threshold for each individual terminal at a higher speed than in the above-mentioned cases.

The transmission permission information receiving unit 49 receives the information about the physical layer embedded into DL-SACCH from each base station, and notifies it to the protocol processing unit 56. The protocol processing unit 56 then interprets the information received by the transmission permission information receiving unit 49.

At this time, when interpreting the above-mentioned information as a command for changing the above-mentioned threshold, the protocol processing unit 56 sets the threshold to be changed according to the above-mentioned information to the threshold changing unit 50. The threshold changing unit 50 then notifies the uplink packet transmission management unit 51 of the changed threshold.

Figure 12:
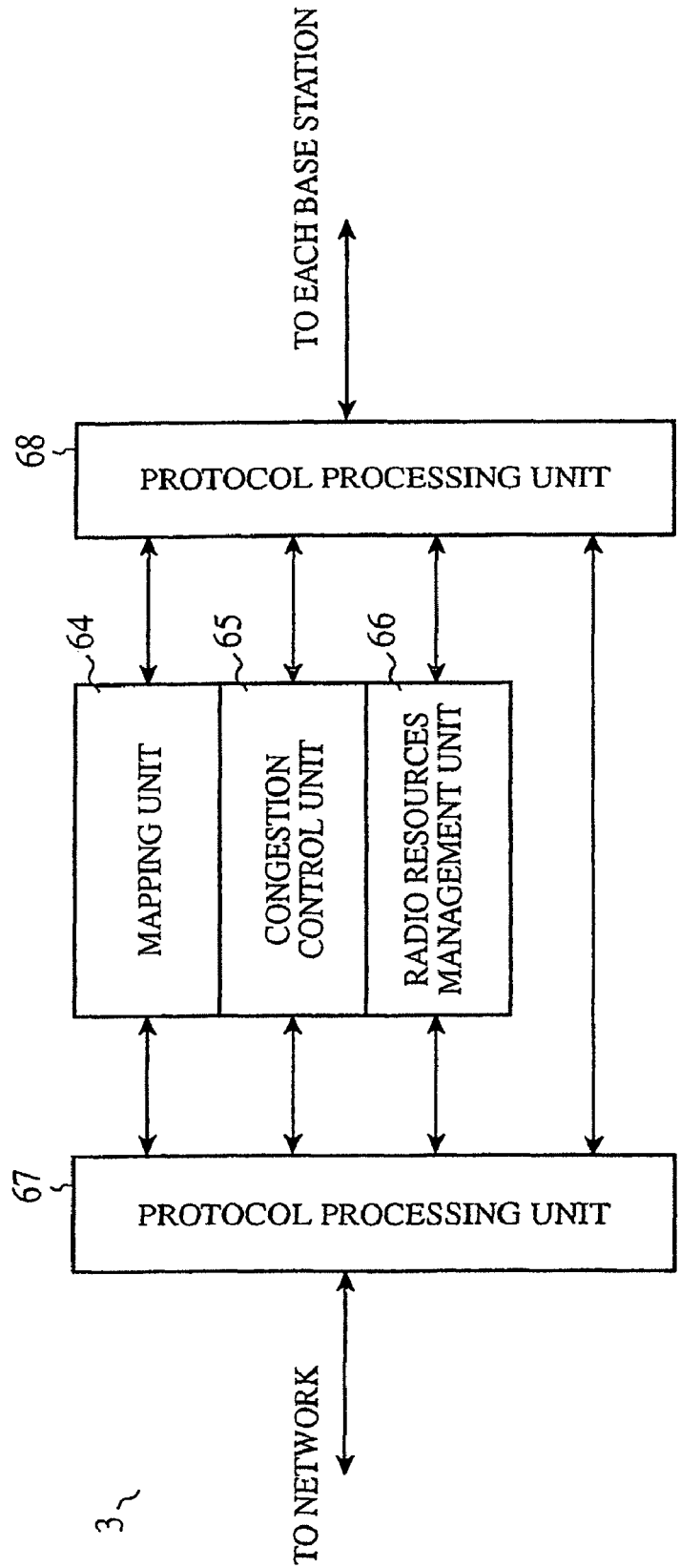
FIG. 12 is a block diagram showing the internal structure of an RNC shown in FIG. 1.

FIG. 12 is a block diagram showing the internal structure of the RNC shown in FIG. 1, and the fundamental operation of the RNC 3 will be explained with reference to this figure. In FIG. 12, in order to prevent redundant description, simplified names are given to formation parts which will be mentioned later, and the same formation parts as previously mentioned are designated by the same reference numerals.

A QoS parameter mapping unit 64 selects radio resources for satisfying QoS (Quality of Service) (e.g., permission for delay times, etc.) specified for communications between the mobile communication terminal 2 and each of the base stations 4a and 4b, and parameters related to the radio resources. These parameters related to the communications include a mode in an RLC (Radio Link Control) layer, the number of transport block sizes in the physical layer, the number of CRC (Cyclic Redundancy Check) bits, etc.

A congestion control unit 65 prevents congestions from occurring in communications between the mobile communication terminal 2 and each of the base stations, and imposes limitations on calls, for example. A radio resources management unit 66 manages information about radio resources (e.g., channels, power, codes, etc.), and measurement data, and notifies the management information to each base station if needed at the time of communications between the mobile communication terminal 2 and each of the base stations. The above-mentioned jamming margin is computed by this radio resources management unit 66.

The radio resources management unit (i.e., a communication resource management unit) 66 also sets the permissible margin in which a margin is incorporated into the above-mentioned jamming margin in consideration of the QoS parameters, such as a delay time, to each base station. Each base station executes a command for switching the communication modes for each terminal 2 accommodated in the own cell thereof, etc. so that the noise rise falls within the above-mentioned permissible margin.

In a related art mobile communication system, the conditions of communications between a base station and a terminal, under which the noise rise falls within the jamming margin, are determined by an RNC, and communications between the base station and the terminal are controlled according to the communication conditions notified from the RNC.

An inevitable problem with this related art structure is, however, that the quality of the communications between the base station and the terminal is restricted by a communication delay time which occurs between the RNC and the base station.

On the contrary, in the mobile communication system according to the present invention, the RNC sets the permissible margin in which a margin associated with interference which should be taken into consideration based on requirements defined by the QoS parameters, such as the operating states of other cells other than the target cell, and delay times, is incorporated into the jamming margin to each base station.

In other words, the range of amounts of interference of the above-mentioned permissible margin is narrower than the jamming margin by the amount of interference which should be taken into consideration based on requirements defined by the QoS parameters, such as the operating states of other cells other than the target cell, and delay times.

Then, each base station partially performs a process of determining the communication conditions under which the noise rise falls within the above-mentioned permissible margin. For example, each base station properly performs a division of the above-mentioned permissible margin among margins for the noise rise in all modes according to the communication conditions at the current time, and so on.

As a result, each base station can determine the communication conditions promptly according to the QoS of the communications with terminals completely-independently upon the communication conditions notified from the RNC, and makes it possible to carry out efficient data communications according to a change in the noise rise which is caused by a change in the communication load.

A core network protocol processing unit 67 processes protocols used in communications with the network. A radio network protocol processing unit 68 processes protocols used in communications with each of the base stations.

Next, the operation of the mobile communication system according to embodiment 1 will be explained.

As previously explained, when transmission data having an amount exceeding the threshold used for switching between the communication modes remains in the transmission data buffer of the mobile communication terminal 2, the mobile communication terminal 2 switches to the scheduling mode, whereas the amount of transmission data which remains in the transmission data buffer of the mobile communication terminal 2 becomes smaller than the threshold, the mobile communication terminal 2 switches to the autonomous mode. Hereinafter, three methods of performing a signaling for changing the threshold will be explained.

The first method is the one of setting change information about a change in the above-mentioned threshold to broadcast information, and notifying it to all terminals 2 staying in the cell all at once to change the threshold of each of the terminals. The second method is the one of assigning change information about a change in the above-mentioned threshold to the dedicated channel or common channel, and notifying it to each individual terminal 2 to change the threshold of the terminal. The third method is the one of notifying change information about a change in the above-mentioned threshold to each terminal 2 by physical-layer signaling to change the threshold of each terminal.

First, the first method will be explained.

According to this method, adjustment of a proper division of the noise rise in the own cell can be carried out by changing the threshold according to the number of terminals placed in the scheduling mode and currently staying in the own cell, the number of terminals placed in the autonomous mode and currently staying in the own cell, and the operation conditions of those terminals, and the operation conditions of the dedicated channel.

Figure 13:
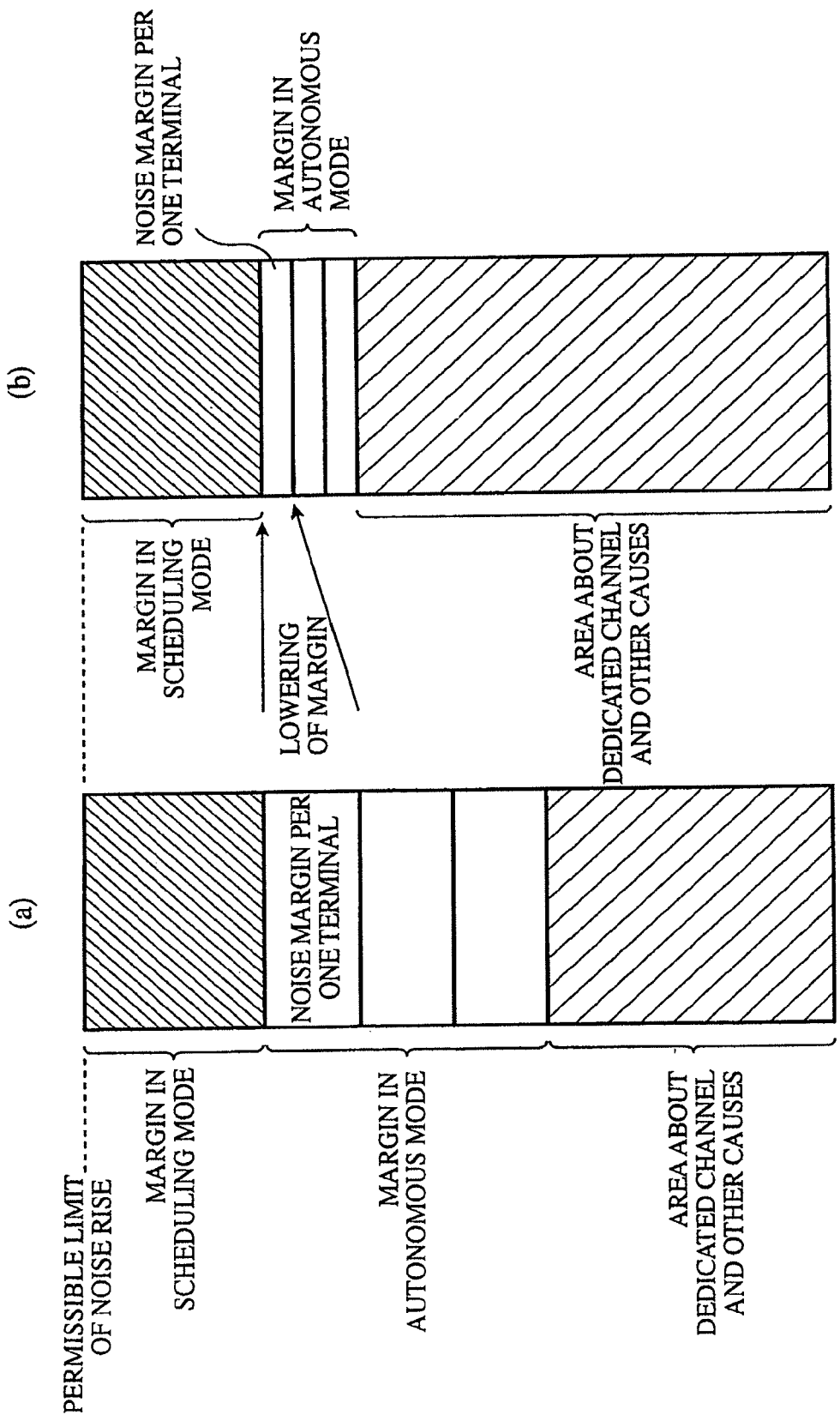
FIG. 13 is a diagram showing an example of a division of the noise rise margin of each base station when the RNC according to embodiment 1 determines the threshold for switching between the transmission modes of each terminal according to a first method.
Figure 14:
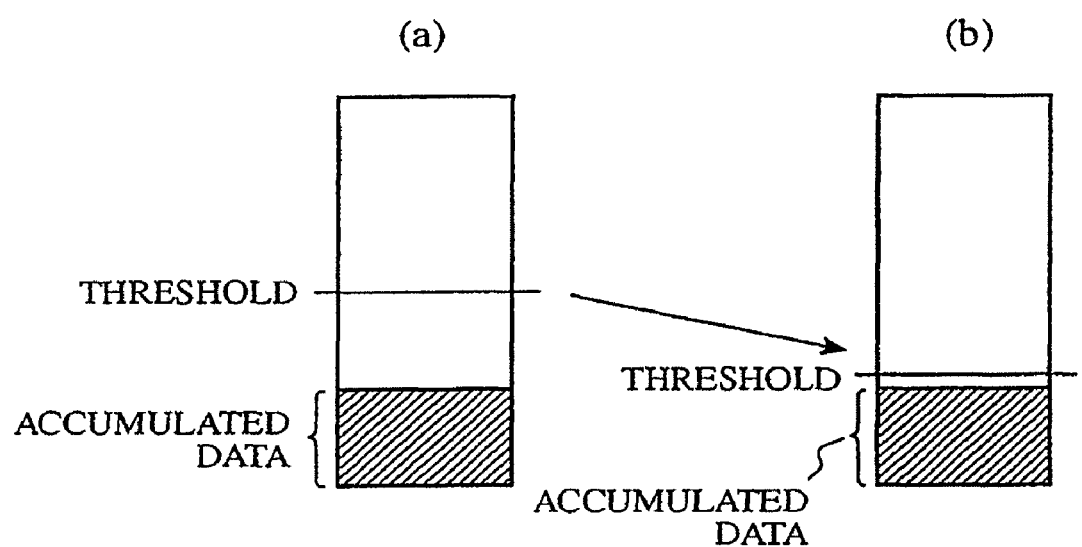
FIG. 14 is a diagram explaining a change in the threshold for switching between the transmission modes according to the division of the noise rise margin shown in FIG. 13.

FIG. 13 is a diagram showing an example of a division of the noise rise margin of each base station when the RNC according to embodiment 1 determines the threshold for switching between the transmission modes of each terminal according to the first method, and FIG. 14 is a diagram explaining a change in the threshold for switching between the transmission modes which is based on the division of the noise rise margin shown in FIG. 13. The basic concept underlying the first method will be explained with reference to these figures. First, assume that a plurality of mobile communication terminals 2 are accommodated in the cell of a base station before the threshold for switching between the transmission modes of each of the plurality of terminals is changed. Furthermore, assume that the noise rise margin of the base station is divided into the permissible margin for the noise rise resulting from the autonomous mode, the permissible margin for the noise rise resulting from the scheduling mode, and the permissible margin (another area shown in the figure and associated with the dedicated channel, and so on) for the noise rise resulting from transmission via the dedicated channel, and so on, as shown in FIG. 13(*a*).

In this case, the above-mentioned noise rise margin of the base station is the permissible margin in which a margin associated with interference which should be taken into consideration based on the operating states of other cells and QoS is incorporated into the above-mentioned jamming margin.

At this time, assume that the above-mentioned threshold of the transmission data buffer of each mobile communication terminal 2 has a relationship, as shown in FIG. 14(*a*), with the transmission data stored in the buffer.

Assume that a certain amount of data transmission is carried out via the dedicated channel. At this time, the RNC 3 performs management processing to secure a required permissible margin for the noise rise resulting from the data transmission via the dedicated channel.

Therefore, when the frequency of occurrence of data transmission via the dedicated channel between a terminal 2 and the base station increases, the RNC 3 instructs the base station to increase the permissible margin required to carry out transmission of data to the terminal via the dedicated channel.

Data transmission via the dedicated channel is carried out for each terminal 2. For this reason, when the frequency of occurrence of data transmission via the dedicated channel increases, the permissible margin associated with the dedicated channel is secured from the permissible margin assigned to each terminal 2 which is included in the noise rise margin of the base station.

As a result, as shown in FIG. 13(*b*), the permissible margin assigned to the noise rise resulting from the autonomous mode, which is included in the noise rise margin of the base station, is reduced by the increase in the permissible margin associated with the dedicated channel. At this time, when the number of terminals in the cell does not vary, the noise rise margin per terminal decreases.

In this case, when a relatively small threshold for switching between the transmission modes is set to the transmission data buffer of each terminal, as shown in FIG. 14(*a*), there is a possibility that transmission of data having an amount exceeding the permissible margin in the autonomy is performed.

In other words, in the case where the threshold as shown in FIG. 14(*a*) is maintained, a terminal 2 which is going to transmit a large amount of data to each base station will be unable to accept the noise rise caused by the data transmission.

Then, when the noise rise margin is divided as shown in FIG. 13(*b*), by reducing the thresholds of the transmission data buffers of all terminals 2 accommodated in the cell all at once using the broadcast information according to the first method, as shown in FIG. 14(*b*), any terminal 2 which is going to transmit data having a large amount is made to switch from the autonomous mode to the scheduling mode.

At this time, any terminal 2 which is going to perform transmission of data having a small amount is held in the autonomous mode if the amount of transmission data does not exceed the changed threshold value.

Since the balance between the number of terminals placed in the autonomous mode and the number of terminals placed in the scheduling may be lost if the threshold is lowered too much at a time, it is desirable to reduce the threshold step by step.

Figure 15:
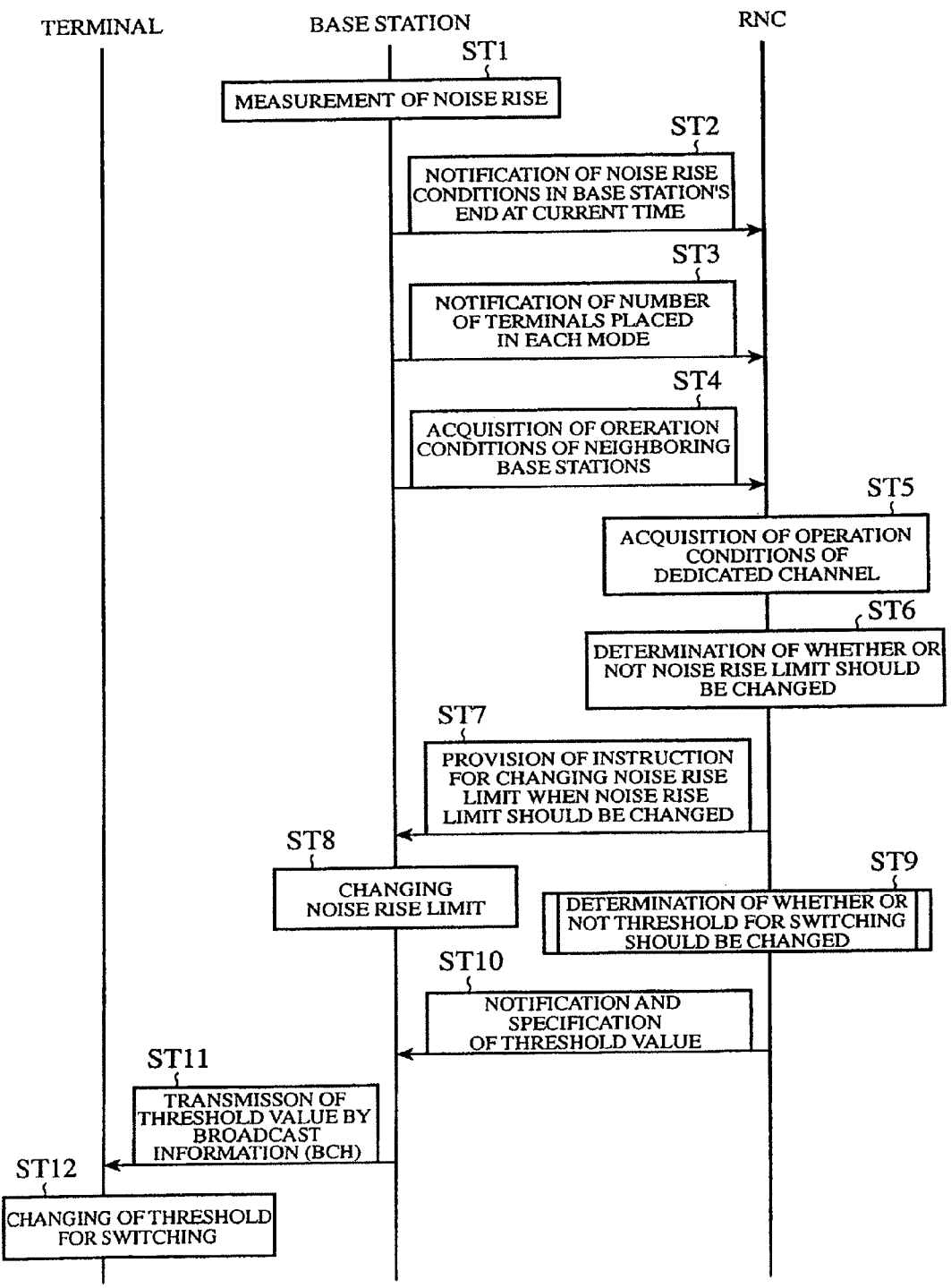
FIG. 15 is a diagram showing a changing sequence in a case of changing the threshold of the transmission data buffer using the first method in the mobile communication system according to embodiment 1.

FIG. 15 is a diagram showing a changing sequence for changing the threshold of a transmission data buffer according to the first method in the mobile communication system according to embodiment 1. Each base station measures the noise rise at an end thereof at the current time (in step ST1). To be more specific, as shown in FIG. 10, the noise rise (the amount of interference) at each base station's end at the current time is measured by the desired wave power measurement unit 16 and interference wave power measurement unit 17 of each base station.

After that, each base station notifies the noise rise measured in step ST1 to the RNC 3 (in step ST2). Each base station further notifies both the number of terminals in the own cell which are operating in the autonomous mode and the number of terminals in the own cell which are operating in the scheduling mode to the RNC 3 (in step ST3).

Then, the radio resources management unit 66 of the RNC 3 acquires information about the operation conditions of other base stations which exist around the target base station (referred to as neighboring base stations from here on) (the operation conditions including, for example, the number of terminals accommodated in the cell of each of the neighboring base stations) (in step ST4).

When a large number of terminals 2 are operating in the neighboring base stations, there is a possibility that a terminal 2 moves to an area where a handover is performed. In this case, the radio resources management unit 66 of the RNC 3 further incorporates a margin which is determined in consideration of a noise rise resulting from the handover to the jamming margin, as the permissible margin which is notified to the base station in question.

Then, the radio resources management unit 66 acquires information about the operation conditions of the dedicated channel in the base station in question (in step ST5). Usually, since the dedicated channel is used in order to carry out transmission of data from a neighboring base station to the terminal 2 in the soft handover, the RNC 3 grasps the operation conditions of the dedicated channel.

The radio resources management unit 66 determines whether the noise rise margin of the base station in question is enough or short compared with the noise rise at the current time which is acquired in steps ST1 to ST5 (in step ST6). According to the result of the determination, the radio resources management unit 66 shifts to a process of changing both a noise rise limit for the autonomous mode and a noise rise limit for the scheduling mode.

Here, a noise rise limit is referred to as a part of the noise rise margin which is assigned to each mode, the noise rise margin being specified and divided, as the above-mentioned permissible margin, for the base station by the RNC 3. In FIG. 13, for example, an area which is shaded as the margin in the scheduling mode shows the noise rise limit for the scheduling mode.

When determining that the noise rise margin of the base station is too large or too small with respect to the noise rise at the current time and the noise rise limits currently being assigned in the base station have to be changed, the radio resources management unit 66 instructs the base station to change the noise rise limit for the autonomous mode and/or for the scheduling mode (in step ST7).

On the other hand, when determining that the noise rise margin of the base station is neither too large nor too small with respect to the noise rise at the current time and the noise rise limits currently being assigned in the base station don't have to be changed, the radio resources management unit 66 does not provide any changing command for changing the above-mentioned noise rise limits.

When receiving the changing command for changing the noise rise limits from the RNC 3, the base station changes the noise rise limits according to the changing command (in step ST8). For example, when the frequency of data transmission using the dedicated channel increases, as explained with reference to FIG. 13, the RNC 3 instructs the base station to increase the noise rise limit associated with the dedicated channel which is included in the noise rise margin of the base station, and hence to reduce the noise rise limit for the autonomous mode by the increase in the noise rise limit associated with the dedicated channel.

Then, when receiving a notification that the threshold for switching between the transmission modes of each terminal 2 should be changed from the base station, the radio resources management unit 66 determines what value the above-mentioned threshold should be changed to so that there occurs a proper amount of interference in the communications between the base station and each terminal 2 by taking into consideration the traffic conditions at the current time, the noise rise in the base station in question and the permissible margin for the noise rise (in step ST9).

After that, the radio resources management unit 66 notifies information about the change in the above-mentioned threshold, the information including the threshold value which is determined, to the above-mentioned base station (in step ST10).

When receiving the information about the change in the above-mentioned threshold from the RNC 3, the base station sets the information containing the above-mentioned threshold value to broadcast information (BCH), and broadcasts it to each terminal 2 (in step ST11).

When receiving the broadcast information, each terminal 2 reads the threshold value for switching between the transmission modes from the broadcast information and changes the above-mentioned threshold, as in the case of the operation explained with reference to FIG. 11 (in step ST12).

The process of step ST9 shown in FIG. 15 of the mobile communication system according to embodiment 1 will be explained in detail with reference to a flow chart shown in FIG. 16.

First, the uplink packet transmission management unit 24 of the base station compares the amount of data of a transmission data buffer, which is notified from a terminal 2 staying in the own cell, and the above-mentioned threshold value set to the above-mentioned terminal 2 so as to determine whether to change the above-mentioned threshold value. When determining that the above-mentioned threshold value should be changed, the base station notifies the RNC 3 that the threshold value should be changed according to the above-mentioned sending operation.

In step ST1a, the radio resources management unit 66 of the RNC 3 which has received the notification that the threshold should be changed from the base station estimates the noise rise resulting from the data transmission via the dedicated channel based on the operation conditions of the dedicated channel in the base station in question.

Next, the radio resources management unit 66 estimates the permissible margin for the noise rise according to the current operating states of other base stations other than the above-mentioned base station (in step ST2a). For example, when there exist many terminals in the neighboring base stations, there is a possibility that a terminal 2 moves to an area where a handover is performed. In this case, the radio resources management unit 66 estimates the margin in consideration of a noise rise resulting from the handover.

When thus determining the margin in consideration of the operating states of the neighboring base stations (e.g., determining the margin in consideration of that there exist many terminals in the neighboring base stations, etc.), the radio resources management unit 66 incorporates the determined margin into the permissible margin for the noise rise, which is set to the base station.

That is, the radio resources management unit defines a margin which is obtained by subtracting the margin which is determined in consideration of the operating states of the neighboring base stations, etc. from the above-mentioned permissible margin as a new permissible margin which should be set to the base station.

Then, the radio resources management unit 66 acquires the noise rise in the scheduling mode in the cell of the above-mentioned base station and the number of terminals staying in the cell (in step ST3a). After that, the radio resources management unit 66 estimates the permissible margin for each of the noise rise resulting from the data transmission via the dedicated channel which is acquired in step ST1a, and the noise rise in the scheduling mode in the cell of the above-mentioned base station which is acquired in step ST3a.

In step ST4a, the radio resources management unit 66 subtracts both the margin associated with the dedicated channel, and the margin in the scheduling mode from the whole permissible margin of the above-mentioned base station in which the margin which is determined in consideration of the operating states of the neighboring base stations is allowed for in step ST2a, and then determines the permissible margin (i.e., the noise rise limit) for the noise rise in the autonomous mode in the above-mentioned base station.

Next, the radio resources management unit 66 determines whether or not the number of terminals which are operating in the autonomous mode in the cell of the above-mentioned base station is appropriate with respect to the noise rise limit for the autonomous mode in the above-mentioned base station, which is acquired in step ST4a (in step ST5a).

The base station is notified of the amount of transmission data of the transmission data buffer of each terminal 2 in the own cell from each terminal 2. The RNC 3 is notified of the above-mentioned amount of transmission data from the base station. The radio resources management unit 66 of the RNC 3 computes the average of the amounts of transmission data of all terminals 2 staying in the cell of the base station in advance by summing plural data amounts notified thereto from the base station for a predetermined period.

Furthermore, the radio resources management unit 66 statistically determines how much noise rise limit for the autonomous mode in the base station with respect to the above-mentioned average of the amounts of transmission data of all the terminals 2 causes what percentage of the total number of terminals to carry out transmission of data which cannot be demodulated to the base station beyond the noise rise limit.

For example, a case where the ratio of the number of terminals which carry out transmission of data which cannot be demodulated to the base station beyond the noise rise limit for the autonomous mode to the total number of terminals exceeds a specific percentage is defined as a state in which the number of terminals in the autonomous mode is too large, a case where the ratio is equal to or less than the specific percentage is defined as a state in which the number of terminals in the autonomous mode is too small, and any other cases are defined as a state in which the number of terminals in the autonomous mode is appropriate.

In step ST5a, the radio resources management unit 66 checks to see how much noise rise limit for the autonomous mode in the base station at the current time is provided with respect to the above-mentioned average, and then determines whether or not the number of terminals placed in the autonomous mode is appropriate based on the result of the checking.

When, in step ST5a, determining that the number of terminals placed in the autonomous mode is too large, the radio resources management unit 66 reduces the threshold value for switching the transmission modes which is set to each terminal 2 at the current time (in step ST6a). The noise rise margin which is assigned to the plurality of terminals 2 placed in the autonomous mode is divided among the plurality of terminals placed in the autonomous mode according to the number of the terminals so as to fall within the noise rise limit for the autonomous mode in the base station.

Therefore, since the noise rise limit for the autonomous mode in the base station is fixed, the noise rise margin which is assigned to each of the terminals 2 placed in the autonomous mode decreases as the number of the terminals placed in the autonomous mode increases.

For this reason, when the noise rise margin which is assigned to each terminal 2 decreases, a terminal 2 may perform data transmission at a data rate which is suited to the amount of transmission data thereof with the noise rise caused by the data transmission exceeding the permissible margin having a range in which data can be demodulated. Thus, such the state in which the number of terminals staying in the cell and placed in the autonomous mode exceeds the number of terminals to each of which the permissible margin having a range in which data can be demodulated is provided is defined as the state in which the number of terminals staying in the cell and placed in the autonomous mode is large.

When, in step ST6a, reducing the threshold value, the radio resources management unit 66 shifts to the process of step ST10 of FIG. 15 in which it notifies the changed threshold value, as the information about the change in the threshold, to the above-mentioned base station.

When, in step ST5a, determining with the number of the terminals placed in the autonomous mode is appropriate, the radio resources management unit 66 maintains the current threshold value for switching between the transmission modes (in step ST7a). This threshold value is notified, as the information about the change in the threshold, to the base station in step ST10 of FIG. 15.

When, in step ST5a, determining that the number of the terminals placed in the autonomous mode is too small, the radio resources management unit 66 raises the threshold value for switching between the transmission modes which is currently set to each terminal 2 (in step ST8a). The state in which the number of terminals placed in the autonomous mode is too small is the one in which a margin more than needed can be provided for the noise rise margin assigned to each terminal 2 even if each terminal 2 performs data transmission at a data rate which is suited to the amount of transmission data thereof.

In this case, if the number of terminals staying in the cell and placed in the autonomous mode is made to increase by increasing the threshold value, the noise rise margin assigned to each terminal 2 can be used effectively.

Thus, when, in step ST8a, increasing the threshold value, the radio resources management unit 66 shifts to the process of step ST10 of FIG. 15 in which it notifies the changed threshold value, as the information about the change in the threshold, to the above-mentioned base station.

When the change in the threshold value which is decreased or increased at a time in step ST6a or ST8a is too large, a larger number of terminals 2 than needed can be made to switch between the transmission modes.

Then, it is desirable to make the change in the threshold value which is lowered or raised at a time fall within a range of constant values in consideration of the number of the terminals staying in the cell and placed in the autonomous mode etc., and to change the above-mentioned threshold value step by step.

As mentioned above, according to the first method, the change in the threshold value for switching between the transmission modes can be notified to all terminals staying in the cell all at once. For this reason, the number of times that the signaling for notifying the above-mentioned change in the threshold value is carried out can be reduced.

The signaling using the above-mentioned broadcast information has a disadvantage that it is impossible to set a different threshold value to each terminal 2. To solve this problem, all terminals 2 staying in the cell can be divided into a plurality of groups based on, for example, QoS classes, and the above-mentioned threshold can be set to each group.

A concrete method of dividing all terminals staying in the cell into a plurality of groups will be explained.

In the W-CDMA system, four QoS classes (e.g., a conversational-mode class, a streaming class, an interactive class, and a background class) are defined. For example, assume that all terminals 2 staying in the cell are divided into three groups as explained below based on communication delay tolerances associated with these QoS classes.

The first group is the group to which a conversational-mode class and a streaming class belong, the group using a communication service which handles data, such as audio data and moving image data, which refuse any delay most strongly.

The second group is the group to which an interactive class belongs, the group using a communication service which permits a delay time to some extent. For example, a still image, a text file, etc. which are offered by WWW (World Wide Web) etc. are handled by the second group. When such data is transmitted to a terminal of the second group, a communication delay time is permitted to some extent, but it is not necessarily accepted fully, and a too large delay time may give the user displeasure.

The third group is the group to which a background class belongs, the group using a communication service which permits a delay time. For example, a terminal which is carrying out a data transfer using FTP (File Transfer Protocol) which requires scheduling about communications and permits a delay time belongs to the third group.

The division of all terminals 2 staying in the cell into the groups is performed by the QoS parameter mapping unit 64 of the RNC 3 which grasps the QoS classes in communications with the base station. The result of the division is also held by the QoS parameter mapping unit 64.

Next, the process of changing the threshold for terminals 2 which are classified into one of the groups as mentioned above will be explained.

When receiving a notification indicating that the threshold for a specific terminal should be changed from a base station, the radio resources management unit 66 of the RNC 3 determines to which group the terminal 2 for which the above-mentioned threshold should be changed belongs based on the result of the division currently being held by the QoS parameter mapping unit 64.

The radio resources management unit 66 determines an increase or decrease in the threshold value which is to be set to each group based on the result of the division. For example, the radio resources management unit controls the threshold for a terminal 2 belonging to the first group which refuses any delay time most strongly so that the threshold is maximized. The radio resources management unit also controls the threshold for a terminal 2 belonging to the third group which permits a delay time so that the threshold is minimized.

When the radio resources management unit determines an increase or decrease in the threshold value which is to be set to terminals of each group in this way, for example, a terminal belonging to the first group which refuses any delay time most strongly is made to switch to the autonomous mode in which a delay time occurs most scarcely.

When the number of terminals placed in the autonomous mode increases and the noise rise limit for the scheduling mode is running short in the first group, the radio resources management unit can control terminals in the first group having a large amount of transmission data so as to make them switch to the scheduling mode by decreasing the threshold value step by step.

The radio resources management unit can also set a smaller threshold to the second and third groups which permit a delay time, as compared with the threshold set to the first group so that terminals included in the second and third groups switch to the scheduling mode.

However, when the number of terminals belonging to the first group within the cell is small and the permissible margin of the base station is enough, the radio resources management unit can also raise the threshold which is to be set to the second and third groups in order to use the permissible margin more effectively.

In addition, when most of all the terminals 2 staying in the cell belong to the first group, all the terminals can be divided into subdivided groups based on an amount of delay showing how much delay time can be accepted by data which are handled by each terminal 2.

Next, the second method will be explained.

According to this method, each individual terminal can be switched to an optimal transmission mode by setting change information about a change in the threshold for switching between the transmission modes to a layer-3 message via a channel, such as the dedicated channel or common channel.

Figure 17:
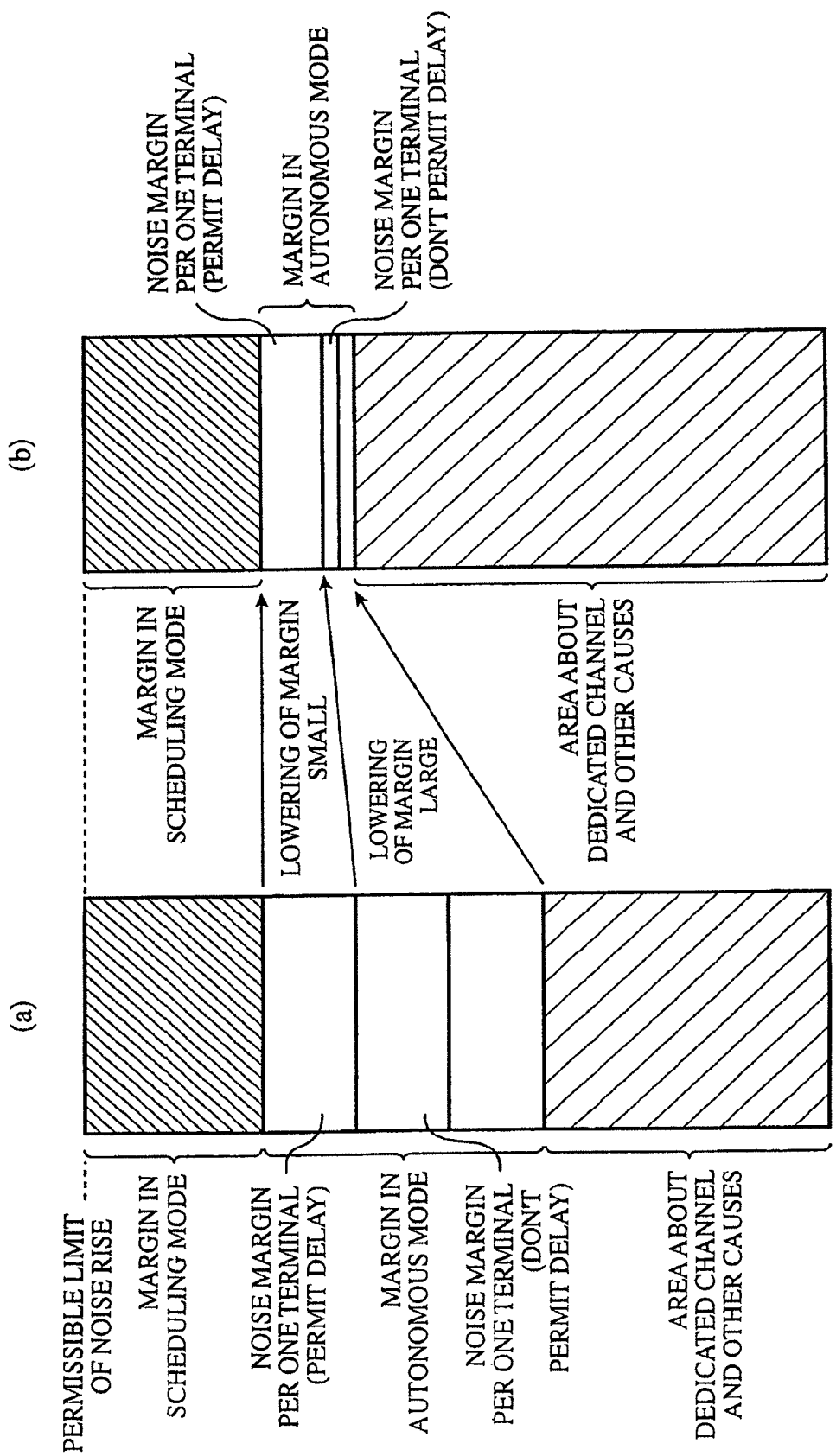
FIG. 17 is a diagram showing an example of a division of the noise rise margin of each base station when the RNC according to embodiment 1 determines the threshold for switching between the transmission modes of each terminal according to a second method.
Figure 18:
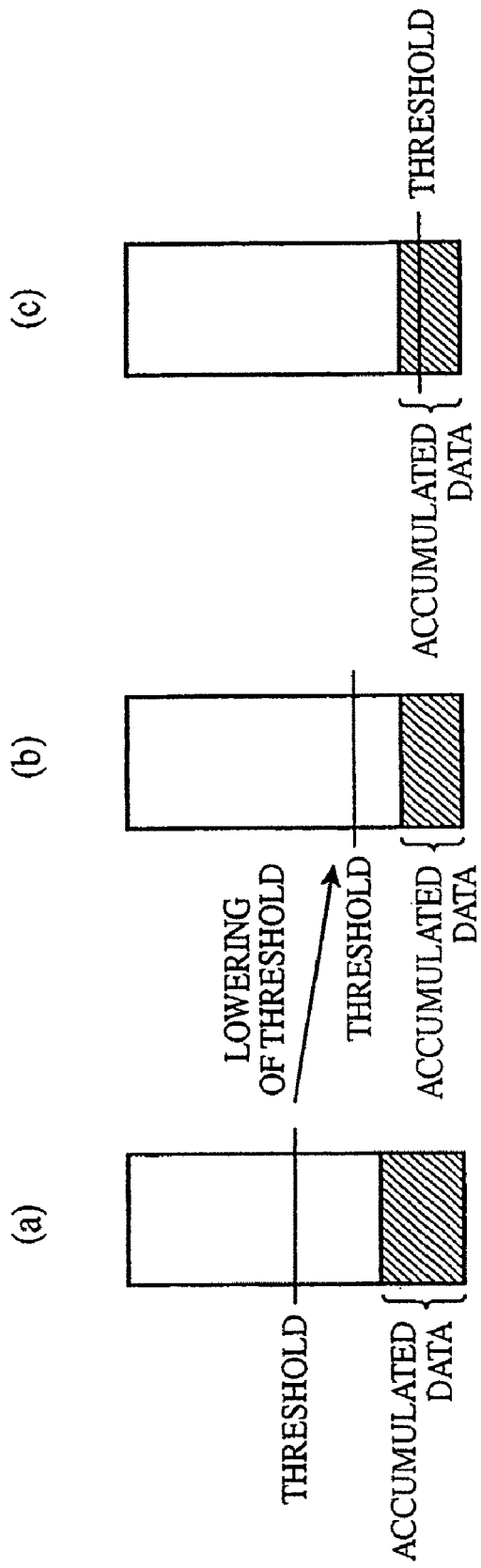
FIG. 18 is a diagram explaining a change in the threshold for switching between the transmission modes according to the division of the noise rise margin shown in FIG. 17.

FIG. 17 is a diagram showing an example of a division of the noise rise margin of a base station when the RNC according to embodiment 1 determines the threshold for switching between the transmission modes of each individual terminal according to the second method, and FIG. 18 is a diagram explaining a change in the threshold for switching between the transmission modes which is based on the division of the noise rise margin shown in FIG. 17. The basic concept underlying the second method will be explained with reference to these figures.

First, assume that a plurality of mobile communication terminals 2 are accommodated in the cell of a base station before the threshold for switching between the transmission modes of each individual terminal is changed. The noise rise margin of the base station is divided into the permissible margin for the noise rise resulting from the autonomous mode, the permissible margin for the noise rise resulting from the scheduling mode, and the permissible margin (another area shown in the figure and associated with the dedicated channel, and so on) for the noise rise resulting from transmission via the dedicated channel, and so on, as shown in FIG. 17(*a*).

In this case, the above-mentioned noise rise margin of the base station is the permissible margin in which a margin associated with interference which should be taken into consideration based on the operating states of other cells and QoS is incorporated into the above-mentioned jamming margin.

At this time, assume that the above-mentioned threshold of the transmission data buffer of each mobile communication terminal 2 has a relationship, as shown in FIG. 18(*a*), with the transmission data stored in the buffer.

Assume that a certain amount of data transmission is carried out via the dedicated channel. At this time, the RNC 3 performs management processing to secure a required permissible margin for the noise rise resulting from the data transmission via the dedicated channel.

Therefore, when the frequency of occurrence of data transmission via the dedicated channel between a terminal 2 and the base station increases, the RNC 3 instructs the base station to increase the permissible margin required to carry out transmission of data to the terminal via the dedicated channel.

Data transmission via the dedicated channel is carried out for each terminal 2. For this reason, when the frequency of occurrence of data transmission via the dedicated channel increases, the permissible margin associated with the dedicated channel is secured from the permissible margin assigned to each terminal 2 which is included in the noise rise margin of the base station.

As a result, as shown in FIG. 17(*b*), the permissible margin for the noise rise resulting from the autonomous mode, which is included in the noise rise margin of the base station, is reduced by the increase in the permissible margin associated with the dedicated channel.

In this case, when a threshold as shown in FIG. 18(a) for switching between the transmission modes is kept to be set to the transmission data buffer of each terminal, there is a possibility that transmission of data having an amount exceeding the permissible margin in the autonomy is carried out.

In other words, in the case where the threshold as shown in FIG. 18(a) is kept, a terminal 2 which is going to transmit a large amount of data to the base station will be unable to accept the noise rise caused by the data transmission.

For this reason, as shown in FIGS. 18(b) and 18(c), it is necessary to reduce the threshold value for switching between the communication modes. However, when reducing the threshold value for switching between the communication modes, requirements on the communication quality of each terminal 2 should be taken into consideration. For example, whether or not a delay time is permitted depends on the nature of data which is handled by each terminal 2.

In a QoS class division of communication services in the W-CDMA method, a real time nature is requested of a conversational-mode class which handles data such as audio data, and a streaming class which handles data such as moving image data in order to prevent the occurrence of a delay time from making the user have an unnatural feeling. Therefore, in these QoS classes, it is necessary to reduce the delay time if possible.

On the other hand, in an interactive class which handles data such as Web data, and a background class which handles data transfer according to FTP or the like, although the accuracy of transmission data is required, it is rare for a delay time to be recognized by the user. For this reason, such a data transmission is handled with the best effort, and even if there occurs a delay time, this delay time counts for nothing.

Then, by changing the threshold for each individual terminal 2 using the second method, the decrease in the threshold value of the transmission data buffer, as shown in FIG. 18(b), of a terminal 2 which handles data which does not permit any delay time is reduced so that the above-mentioned threshold is prevented from decreasing too much.

In contrast, the decrease in the threshold value of the transmission data buffer, as shown in FIG. 18(c), of a terminal 2 which handles data which can permit a delay time is increased so that the threshold is lowered as compared with the case shown in FIG. 18(b).

When the threshold is lowered in this way, a terminal 2 which handles data which does not permit any delay can be held in the autonomous mode having a communication characteristic of producing a delay time more difficulty than in the scheduling mode, and only a terminal 2 which handles data which can permit a delay time can be guided from the autonomous mode to the scheduling mode.

At this time, as shown in FIG. 17(b), for the permissible margin in the autonomous mode in the base station, the decrease in the permissible margin assigned to each terminal 2 which handles data which does not permit any delay time (i.e., the noise rise margin assigned to each terminal which does not permit any delay time) is reduced, while the decrease in the permissible margin assigned to each terminal 2 which handles data which can permit a delay time (i.e., the noise rise margin assigned to each terminal which can permit a delay time) is increased.

Since the balance between the number of terminals placed in the autonomous mode and the number of terminals placed in the scheduling may be lost if the threshold is lowered too much at a time, it is desirable to reduce the threshold step by step.

Figure 19:
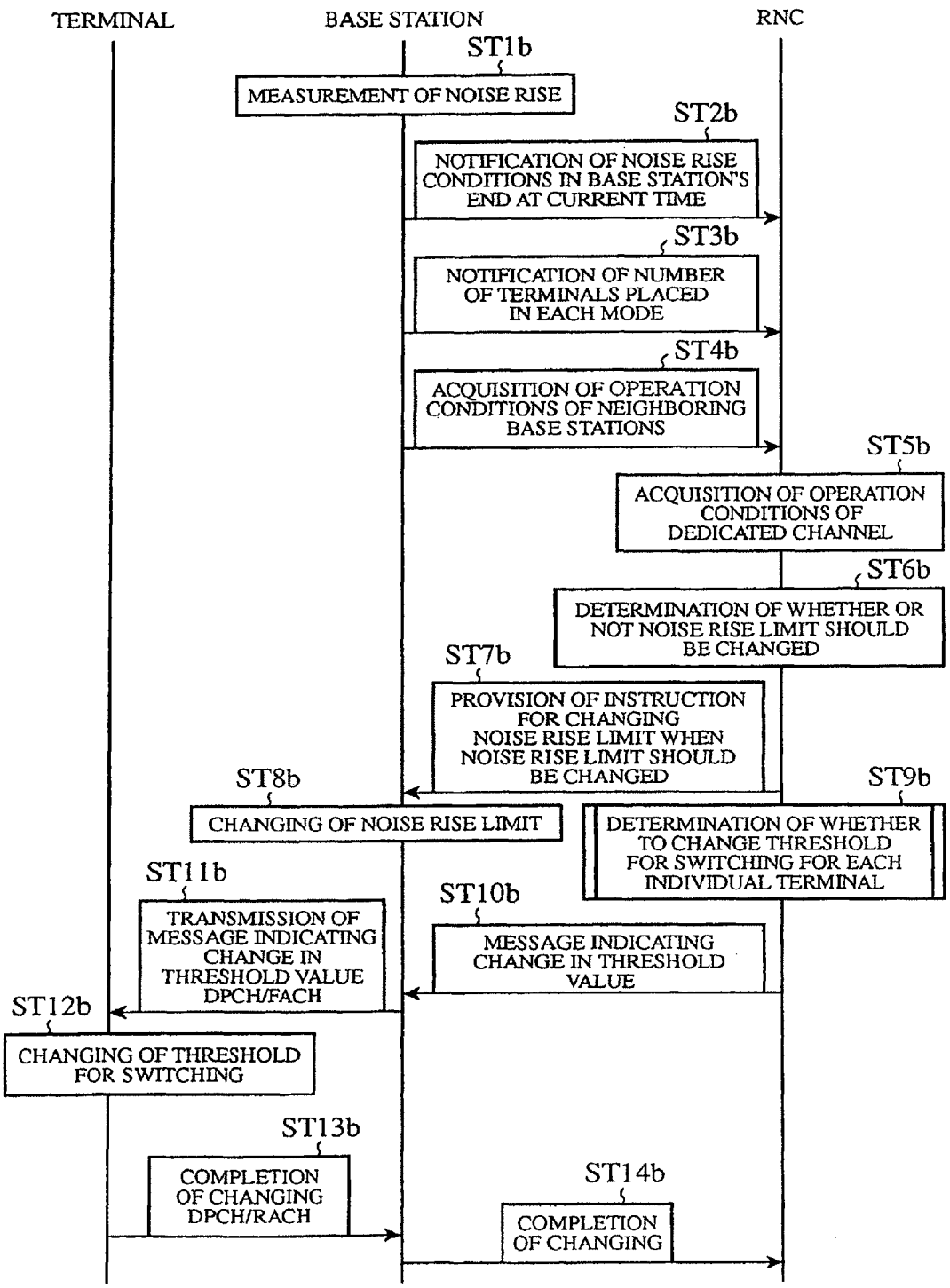
FIG. 19 is a diagram showing a changing sequence in a case of changing the threshold of the transmission data buffer using the second method in the mobile communication system according to embodiment 1.

FIG. 19 is a diagram showing a changing sequence for changing the threshold of a transmission data buffer according to the second method in the mobile communication system according embodiment 1. Each base station measures the noise rise at an end thereof at the current time (in step ST1b). To be more specific, as shown in FIG. 10, the noise rise (the amount of interference) at each base station's end at the current time is measured by the desired wave power measurement unit 16 and interference wave power measurement unit 17 of each base station.

After that, each base station notifies the noise rise measured in step ST1b to the RNC 3 (in step ST2b). Each base station further notifies both the number of terminals staying in the own cell which are operating in the autonomous mode and the number of terminals staying in the own cell which are operating in the scheduling mode to the RNC 3 (in step ST3b).

Then, the radio resources management unit 66 of the RNC 3 acquires information about the operation conditions of neighboring base stations (including, for example, the number of terminals accommodated in the cell of each of the neighboring base stations) (in step ST4b).

When a large number of terminals 2 are operating in the neighboring base stations, there is a possibility that a terminal 2 moves to an area where a handover is performed. In this case, the radio resources management unit 66 of the RNC 3 further incorporates a margin which is determined in consideration of a noise rise resulting from the handover to the jamming margin to generate the permissible margin which is to be notified to the base station in question.

Then, the radio resources management unit 66 acquires information about the operation conditions of the dedicated channel in the base station in question (in step ST5b). Usually, since the dedicated channel is used in order to carry out transmission of data from a neighboring base station to the terminal 2 in a soft handover, the RNC 3 grasps the operation conditions of the dedicated channel.

The radio resources management unit 66 determines whether the noise rise margin of the base station in question is enough or short compared with the noise rise at the current time which is acquired in steps ST1b to ST5b (in step ST6b). According to the result of the determination, the radio resources management unit 66 shifts to a process of changing both the noise rise limit for the autonomous mode and the noise rise limit for the scheduling mode.

When determining that the noise rise margin of the base station is too large or too small with respect to the noise rise at the current time and the noise rise limits currently being assigned in the base station have to be changed, the radio resources management unit 66 instructs the base station to change the noise rise limit for the autonomous mode and/or for the scheduling mode (in step ST7b).

On the other hand, when determining that the noise rise margin of the base station is neither too large nor too small with respect to the noise rise at the current time and the noise rise limits currently being assigned in the base station don't have to be changed, the radio resources management unit 66 does not provide any changing command for changing the above-mentioned noise rise limits.

When receiving the changing command for changing the noise rise limits from the RNC 3, the base station changes the noise rise limits according to the changing command (in step ST8b). For example, when the frequency of data transmission using the dedicated channel increases, as explained with reference to FIG. 17, the RNC 3 instructs the base station to increase the noise rise limit for the dedicated channel which is included in the noise rise margin of the base station, and hence to reduce the noise rise limit for the autonomous mode by the increase in the noise rise limit for the dedicated channel.

Then, when receiving a notification that the threshold for switching between the transmission modes of a target terminal 2 should be changed from the base station, the radio resources management unit 66 determines what value the above-mentioned threshold of the target terminal 2 should be changed to by taking into consideration the traffic conditions at the current time, the noise rise in the base station in question and the permissible margin for the noise rise (in step ST9b).

After that, the radio resources management unit 66 notifies, as a layer-3 message, information about the change in the above-mentioned threshold, the information including the threshold value which is determined, to the above-mentioned base station (in step ST10b).

When receiving the information about the change in the above-mentioned threshold from the RNC 3, the base station transmits the above-mentioned information to the target terminal 2 to which the changed threshold is to be set using the dedicated channel (DPCH) when communications with the terminals 2 via the dedicated channel (DPCH) are established, whereas when no communications with the terminals 2 via the dedicated channel are established, the base station transmits the above-mentioned information to the target terminals 2 using the common channel (FACH) (in step ST11b).

When receiving the information, the target terminal 2 reads the changed threshold value for switching between the transmission modes from the information assigned to the dedicated channel or common channel and changes the above-mentioned threshold thereof in the same way that it performs the operation explained with reference to FIG. 11 (in step ST12b).

After that, the uplink dedicated channel transmitting unit 60 of the target terminal 2 assigns, as a message, information indicating that the target terminal has changed the threshold value for switching between the transmission modes to the uplink DPCH or RACH, and transmits it to the base station (step ST13b). When receiving the message, the base station notifies the RNC 3 that the above-mentioned change has been completed (in step ST14b).

The process of step ST9b shown in FIG. 19 of the mobile communication system according to embodiment 1 will be explained in detail with reference to a flow chart shown in FIG. 20.

First, the uplink packet transmission management unit 24 of the base station compares the amount of data of a transmission data buffer, which is notified from the target terminal 2 staying in the own cell, with the above-mentioned threshold value set to the above-mentioned terminal 2 so as to determine whether to change the above-mentioned threshold value. When determining that the above-mentioned threshold value should be changed, the base station notifies the RNC 3 that the threshold value should be changed according to the above-mentioned sending operation.

In step ST1c, the radio resources management unit 66 of the RNC 3 which has received the notification that the threshold should be changed from the base station estimates a noise rise resulting from the data transmission via the dedicated channel based on the operation conditions of the dedicated channel in the base station in question.

Next, the radio resources management unit 66 estimates the permissible margin for the noise rise according to the current operating states of other base stations other than the above-mentioned base station (in step ST2c). For example, when there exist many terminals in the neighboring base stations, there is a possibility that a terminal 2 moves to an area where a handover is performed. In this case, the radio resources management unit 66 estimates the margin in consideration of a noise rise resulting from the handover.

When thus determining the margin in consideration of the operating states of the neighboring base stations (e.g., determining the margin in consideration of that there exist many terminals in the neighboring base stations, etc.), the radio resources management unit 66 incorporates the determined margin into the permissible margin for the noise rise, which is set to the base station.

That is, the radio resources management unit defines a margin which is obtained by subtracting the margin which is determined in consideration of the operating states of the neighboring base stations, etc. from the above-mentioned permissible margin as a new permissible margin which should be set to the base station.

Then, the radio resources management unit 66 acquires the noise rise in the scheduling mode in the cell of the above-mentioned base station and the number of terminals staying in the cell (in step ST3c). After that, the radio resources management unit 66 estimates the permissible margin for each of the noise rise resulting from the data transmission via the dedicated channel which is acquired in step ST1c, and the noise rise in the scheduling mode in the cell of the above-mentioned base station which is acquired in step ST3c.

In step ST4c, the radio resources management unit 66 subtracts both the margin associated with the dedicated channel, and the margin associated with the scheduling mode from the whole permissible margin of the above-mentioned base station in which the margin which is determined in consideration of the operating states of the neighboring base stations is allowed for in step ST2c, and then determines the permissible margin (i.e., the noise rise limit) for the noise rise in the autonomous mode in the above-mentioned base station.

At this time, when receiving requirements on the transmission data rate from each terminal 2, the radio resources management unit 66 adjusts the permissible margin (i.e., the permissible limit) associated with the scheduling mode in consideration of the requirements on the transmission data rate (in step ST5c).

When transmitting data to a base station in the scheduling mode, each terminal 2 notifies the transmission data rate which it desires to the base station in question. The uplink packet transmission management unit 24 of the base station manages a schedule of the data communications, as well as the transmission data rate which is requested by the terminal 2 in question.

The uplink packet transmission management unit 24 notifies the transmission data rate which is requested by the terminal 2 in question to the radio resources management unit 66 of the RNC 3.

The radio resources management unit 66 estimates the noise rise according to the transmission data rate which is requested by the terminal 2 operating in the scheduling mode within the own cell, and determines the permissible margin according to the estimated noise rise so as to adjust the permissible margin associated with the scheduling mode.

After that, the radio resources management unit 66 adjusts the permissible margin associated with the autonomous mode which is determined in step ST4c using the permissible margin associated with the scheduling mode which is adjusted as mentioned above.

Next, the radio resources management unit 66 determines whether or not the number of terminals which are operating in the autonomous mode within the cell of the above-mentioned base station is appropriate with respect to the noise rise limit for the autonomous mode in the above-mentioned base station, which is determined as mentioned above (in step ST6c).

The base station is notified of the amount of transmission data of the transmission data buffer of each terminal 2 staying in the own cell from each terminal 2. The RNC 3 is notified of the above-mentioned amount of transmission data from the base station. The radio resources management unit 66 of the RNC 3 computes the average of the amounts of transmission data of all terminals 2 staying in the cell of the base station in advance by summing plural data amounts notified thereto from the base station for a predetermined period.

Furthermore, the radio resources management unit 66 statistically determines how much noise rise limit for the autonomous mode in the base station with respect to the above-mentioned average of the amounts of transmission data of all the terminals 2 causes what percentage of the total number of terminals to carry out transmission of data which cannot be demodulated to the base station in question beyond the above-mentioned noise rise limit.

For example, a case where the ratio of the number of terminals which carry out transmission of data which cannot be demodulated to the base station beyond the noise rise limit for the autonomous mode to the total number of terminals exceeds a specific percentage is defined as a state in which the number of terminals in the autonomous mode is too large, a case where the ratio is equal to or less than the specific percentage is defined as a state in which the number of terminals in the autonomous mode is too small, and any other cases are defined as a state in which the number of terminals in the autonomous mode is appropriate.

In step ST6c, the radio resources management unit 66 checks to see how much noise rise limit for the autonomous mode in the base station at the current time is provided with respect to the above-mentioned average, and then determines whether or not the number of terminals placed in the autonomous mode is appropriate based on the result of the checking.

When the radio resources management unit 66 determines that there are too many terminals placed in the autonomous mode, the QoS parameter mapping unit 64 of the RNC 3 searches for a terminal 2 which is placed in the autonomous mode and permits a delay time (in step ST7c).

As mentioned above, the state in which the number of terminals staying in the cell and placed in the autonomous mode exceeds the number of terminals to each of which the permissible margin having a range in which data can be demodulated is provided is defined as the state in which the number of terminals staying in the cell and placed in the autonomous mode is large.

The QoS parameter mapping unit 64 determines whether or not each of these terminals 2 which is operating in the autonomous mode is handling data which permits a delay time based on the QoS class to which each of the terminals 2 belongs. For example, the QoS parameter mapping unit determines whether or not a delay time is permitted based on the above-mentioned four QoS classes. In the W-CDMA system, since the amount of delay (i.e., a transfer delay) is defined in units of ms, the QoS parameter mapping unit can determine how much delay time can be permitted based on the amount of delay.

Then, the radio resources management unit 66 sets either the current threshold value for switching or a threshold value, which is lowered by a smaller value than that determined in the case of setting a threshold to a terminal which permits a delay time, to each terminal 2 which has been determined as being a terminal which does not permit any delay time by the QoS parameter mapping unit 64 in step ST7c (in step ST10c).

The radio resources management unit 66 enlarges the amount of reduction in the threshold value for switching which is to be set to a terminal having a larger amount of delay (i.e., a looser limitation imposed on delay time), as a QoS parameter, among terminals 2 belonging to a QoS class which does not permit any delay time. For example, a coefficient k which depends on the degree of congestion in the cell of each terminal 2 placed in the autonomous mode is provided for the amount of reduction in the threshold value for switching.

When there is a terminal 2 in which a delay time of 20 ms is set as a QoS parameter and a terminal 2 in which a delay time of 80 ms is set as a QoS parameter, if the coefficient k=1, the amount of reduction in the threshold value for switching of each terminal is given as follows:

The amount of reduction in the threshold value for the terminal 2 having a delay time of 20 ms is given by the following equation: $k \cdot 20/(20+80)=\frac{1}{5}=20\%$.

The amount of reduction in the threshold value for the terminal 2 having a delay time of 80 ms is given by the following equation: $k \cdot 80/(20+80)=\frac{4}{5}=80\%$.

When the shortage of the permissible margin in the scheduling mode of the base station which has been caused in order to secure the permissible margin in the autonomous mode is relieved by lowering the threshold values for switching of some terminals 2 placed in the autonomous mode, the radio resources management unit 66 sets the above-mentioned coefficient k to 0 so as to maintain the current threshold values.

The radio resources management unit 66 further reduces the threshold value to be set to each terminal 2 which has been determined as being a terminal which permits a delay time by the QoS parameter mapping unit 64 in step ST7c by a larger amount of reduction than that set in the case of step ST10c (in step ST11c). Thus, the radio resources management unit 66 sets a lowered threshold value for switching to each terminal which permits a delay time so that some of an excess number of terminals placed in the autonomous mode switch to the scheduling mode.

When, in step ST6c, determining with the number of terminals placed in the autonomous mode is appropriate, the radio resources management unit 66 maintains the current threshold value set to each terminal (in step ST8c).

On the other hand, when, in step ST6c, determining with there are too few terminals placed in the autonomous mode, the radio resources management unit 66 raises the current threshold value for switching set to each terminal 2 (in step ST9c).

The state in which the number of terminals placed in the autonomous mode is too small is the one in which a margin more than needed can be provided with respect to the noise rise margin assigned to each terminal 2 even if each terminal 2 performs data transmission at a data rate which is suited to the amount of transmission data thereof.

In this case, if the number of terminals staying in the cell and placed in the autonomous mode is made to increase by increasing the threshold value, the noise rise margin assigned to each terminal 2 can be used effectively.

Thus, the radio resources management unit 66 determines the amount of change in the threshold value for switching based on the transmission data rate, the number of terminals placed in the autonomous mode, the noise rise limit for the scheduling mode, and the amount of delay that should be permitted.

When determining the threshold value to be set to each terminal in either of steps ST8c to ST11c, the radio resources management unit 66 shifts to the process of step ST10b of FIG. 19, generates a layer-3 message including the changed threshold value, and transmits it to the above-mentioned base station.

The base station which has received the message indicating the change in the threshold value from the RNC 3, in step ST11b of FIG. 19, transmits the above-mentioned information to each target terminal 2 which needs to change its threshold value using the dedicated channel (DPCH) if communications with each target terminal 2 via the dedicated channel (DPCH) are established, or transmits the above-mentioned information to each target terminal 2 which needs to change its threshold value using the common channel (EACH) otherwise.

After that, each target mobile communication terminal 2 changes the threshold value for switching of the transmission data buffer thereof by performing the processes of steps ST12b to ST14b of FIG. 19.

The QoS parameter mapping unit 64, in step ST9c, can determine whether or not a delay time is permitted based on the QoS parameters, and the radio resources management unit 66 can change the amount of increase in the threshold value for switching especially for each terminal 2 which does not permit any delay time so that it is larger than that for each terminal which permits a delay time based on the result of the determination. By doing in this way, the RNC can make each terminal switch to the most appropriate transmission mode.

In each of steps ST9c, ST10c, and ST11e, when the amount of increase or decrease in the threshold value which is set at a time is too large, there is a possibility that a larger number of terminals 2 than needed change their transmission modes. Therefore, it is desirable to make the amount of increase or decrease in the threshold value which is set at a time fall within a range of constant values in consideration of the number of terminals staying in the cell and placed in the autonomous mode, and so on, and to change the above-mentioned threshold value step by step.

As mentioned above, according to the second method, since the RNC sets the threshold value to each terminal 2 staying in the cell of each base station individually, each terminal 2 is allowed to switch to a communication mode which is suited to required communication conditions. Particularly, the mobile communication system can guarantee QoS set for data communications between terminals 2 by making each terminal switch between the autonomous mode and the scheduling mode according to whether data handled by each terminal 2 permits a delay time.

In accordance with the first and second methods, the radio resources management unit 66 of the RNC 3 determines the threshold for switching between the communication modes for each terminal, as previously explained. The present invention is not limited to this example.

For example, the base station can acquire QoS information etc. from the RNC 3, and the uplink-packet-communications management unit 24 of the base station can determine the threshold for switching between the communication modes for each terminal.

The base station can further change the above-mentioned threshold value determined by the RNC 3 according to traffic conditions at the current time etc., and can notify the changed threshold value to each terminal 2. That is, the present invention includes a variant in which the base station and the RNC 3 determine the above-mentioned threshold value in cooperation with each other.

In this variant, the base station can be so constructed as to change the threshold value notified thereto from the RNC 3 using the uplink-packet-communications management unit 24.

Next, the third method will be explained.

According to this third method, each terminal can be switched to the most appropriate transmission mode by transmitting information about a change in the threshold value for switching between the transmission modes to each terminal using a physical-layer signaling (i.e., an L1 signaling). Furthermore, since the third method uses a higher-speed physical layer signaling than that used by the second method, the third method can change the threshold value for switching according to variations in the traffic of packets.

A physical-layer signaling (referred to as an L1 signaling from here on) is to assign information about the above-mentioned threshold to bit information about a physical layer disposed between each mobile communication terminal 2 and the base station, the bit information being used to set up communication conditions of the physical layer.

For example, a new channel and its slot format are introduced, and a physical-layer signaling is performed. The slot format specifies how to assign bits to one slot of transmission packet data.

In other words, the slot format defines a bit for setting of information about a change in the threshold value for switching in the transmission packet data in order to change the threshold value for switching using the physical-layer signaling.

As an example, UL-SICCH or the like is defined as the new channel for the physical-layer signaling, and a bit to which a binary command for specifying an increase or decrease in the threshold value for switching is set is defined as the slot format.

As an alternative, a method using puncturing can be used. According to this method, a portion of data which is assigned to the dedicated channel (DPCH) which is being used now is deleted, and information specifying the threshold value for switching is inserted into the portion. This method can be implemented by providing a powerful error correction function for the original data so that a certain amount of errors can be removed from the original data.

According to this method, since the bit error rate of the original data increases, a sufficiently-large number of bits cannot be assigned to the threshold value for switching.

Figure 21:
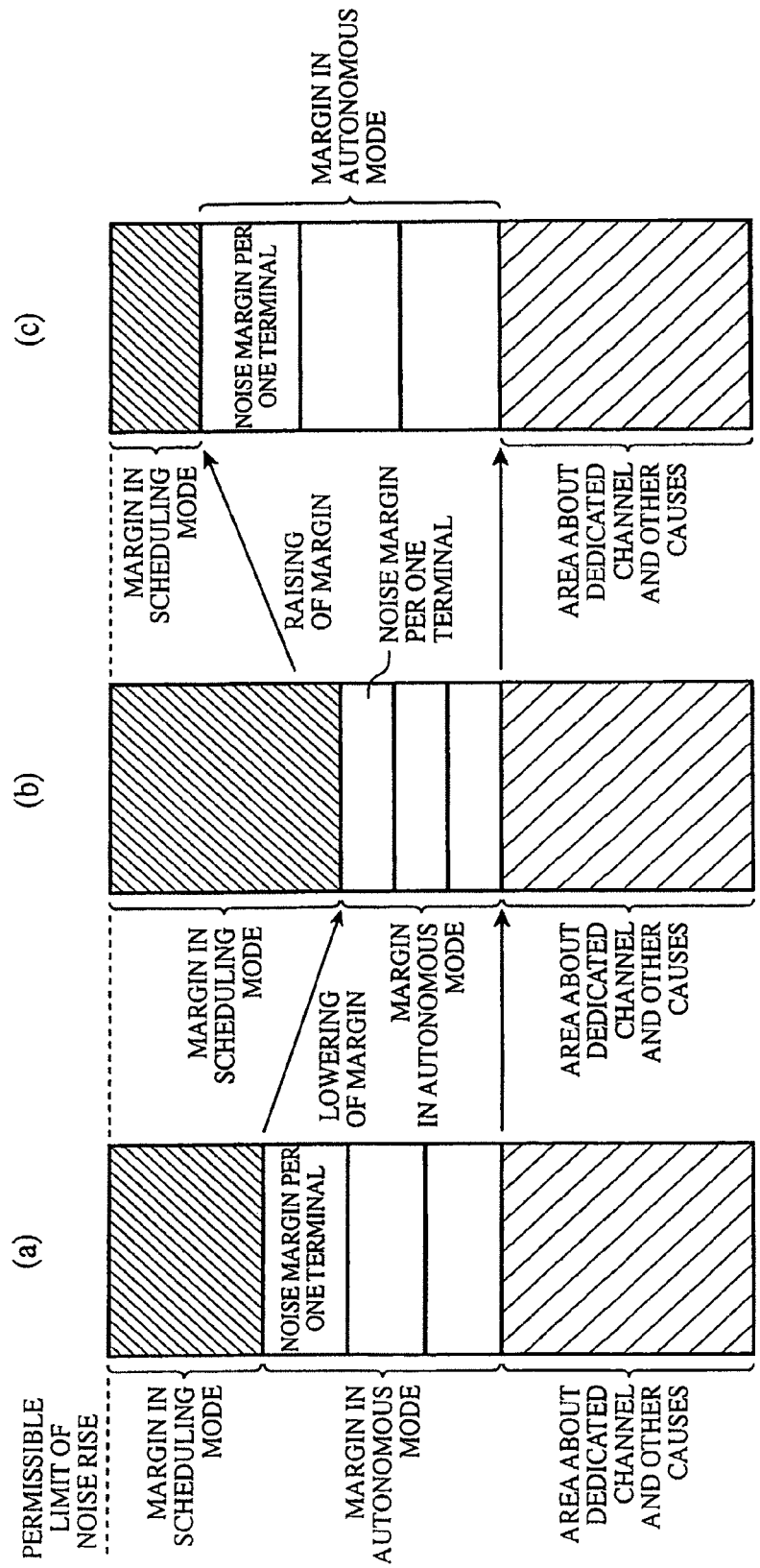
FIG. 21 is a diagram showing an example of a division of the noise rise margin of a base station according to embodiment 1 when the base station determines the threshold for switching between the transmission modes of each terminal according to a third method.

FIG. 21 is a diagram showing an example of a division of the noise rise margin of a base station according to embodiment 1 when the base station determines the threshold for switching between the transmission modes of each terminal according to the third method. The basic concept underlying the third method will be explained with reference to these figures.

Assume that a plurality of mobile communication terminals 2 are accommodated in the cell of a base station before the threshold for switching between the transmission modes of each of the plurality of terminals is changed. As shown in FIG. 21(a), the noise rise margin of the base station is divided into the permissible margin for the noise rise resulting from the autonomous mode, the permissible margin for the noise rise resulting from the scheduling mode, and the permissible margin (another area shown in the figure and associated with the dedicated channel, and so on) for the noise rise resulting from transmission via the dedicated channel, and so on.

In this case, the above-mentioned noise rise margin of the base station is the permissible margin in which a margin associated with interference which should be taken into consideration based on the operating states of other cells and QoS is incorporated into the above-mentioned jamming margin.

In general, packet communications can be easily carried out intermittently. In other words, in many cases the communication load becomes large when a large amount of data is uploaded, but the communication load decreases at the instant when the data transmission stops.

When a large number of terminals 2 are staying in the cell and are handling completely-different communication services, variations with time in the traffic can be absorbed statistically to some extent. However, when a large number of terminals 2 staying in the cell are handling the same communication service, variations with time in the traffic can create a state of overload, or can make the traffic be too light.

For example, when the frequency of packet communications by terminals 2 placed in the scheduling mode increases (i.e., when packet communications by terminals 2 placed in the scheduling mode become active), as shown in FIG. 21(*b*), the margin in the scheduling mode which is included in the permissible margin of the base station must be increased, and the margin in the autonomous mode is therefore reduced by the increase in the margin in the scheduling mode.

On the contrary, when the frequency of packet communications by terminals placed in the scheduling mode decreases (i.e., when packet communications by terminals 2 placed in the scheduling mode become inactive), as shown in FIG. 21(*c*), it is desirable to decrease the margin in the scheduling mode among the permissible margin of the base station, and to increase the margin in the autonomous mode by the decrease in the margin in the scheduling mode.

As mentioned above, when decreasing the margin in the autonomous mode, what is necessary is just to make some terminals 2 switch from the autonomous mode to the scheduling mode. On the contrary, when increasing the margin in the autonomous mode, what is necessary is just to make some terminals switch from the scheduling mode to the autonomous mode.

It is necessary to change the threshold value for switching as quickly as possible in order to carry out the above-mentioned switching between the transmission modes while following the traffic in each of the transmission modes which varies at a high speed. To this end, the third method uses the physical layer signaling having a higher speed than layer-3 messages.

Figure 22:
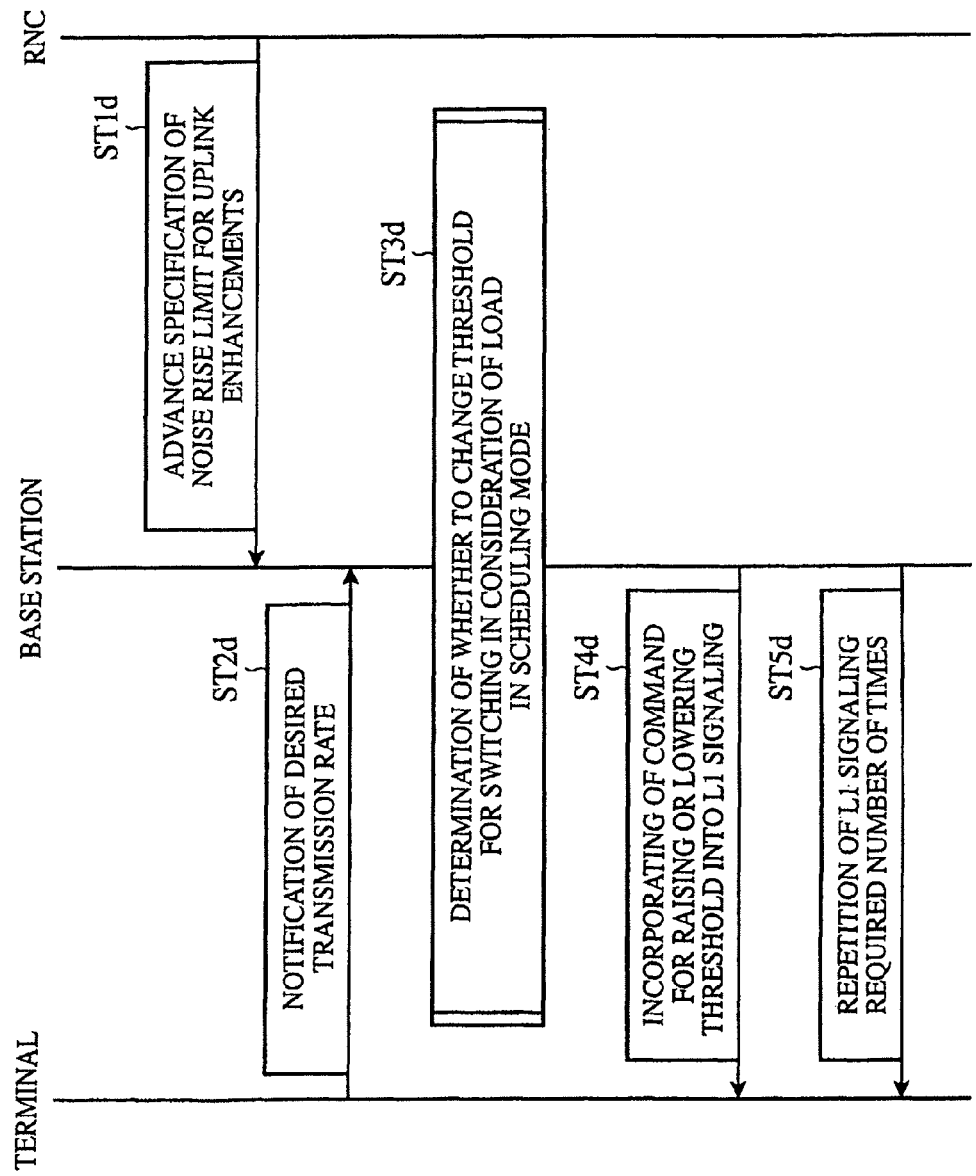
FIG. 22 is a diagram showing a changing sequence in a case of changing the threshold of the transmission data buffer using the third method in the mobile communication system according to embodiment 1.

FIG. 22 is a diagram showing a change sequence in a case of changing the threshold of a transmission data buffer using the third method in the mobile communication system according to embodiment 1. The uplink packet transmission management unit 24 of a target base station is informed of a noise rise limit for uplink enhancements by the RNC 3 in advance (in step ST1*d*).

To be more specific, the radio resources management unit 66 of the RNC 3 determines the permissible margin of a fixed range for the target base station in consideration of the QoS parameters managed by the QoS parameter mapping unit 64, the operating states of other cells other than that of the target base station, and the traffic conditions of the cell of the target base station, and notifies the determined permissible margin to the target base station.

The permissible margin notified to the target base station can be divided into a margin in the scheduling mode and a margin in the autonomous mode, which are controllable margins as shown in FIG. 5, and margins for noise rises resulting from the own cell interference, the other-cell interference, etc. which are uncontrollable margins as shown in FIG. 5.

The RNC 3 determines the above-mentioned whole permissible margin so that it falls within a fixed range, and sets it to the base station. On the other hand, the uplink packet transmission management unit 24 of the base station determines the rate of division of the whole permissible margin into the permissible margin in each of the transmission modes.

Then, the uplink packet transmission management unit 24 of the base station receives a request for a transmission data rate in data transmission in the scheduling mode from a terminal 2 staying in the own cell (in step ST2*d*).

The uplink packet transmission management unit 24 determines the permissible data rate in the autonomous mode, and also functions as a scheduler for managing data transmission in the scheduling mode. The transmission data rate from the above-mentioned terminal 2 is registered, as a data transmission schedule in the scheduling mode, into the uplink packet transmission management unit 24.

After that, the uplink packet transmission management unit 24 determines whether or not the load conditions of the traffic in the scheduling mode is appropriate for the permissible margin assigned by the RNC 3, and determines the threshold value for switching so that the target terminal can switch between the transmission modes according to this determination result (in step ST3*d*). This processing will be mentioned later in detail with reference to FIG. 23.

When, in step ST3*d*, determining the threshold value for switching, the uplink packet transmission management unit 24 notifies the changed threshold value to the target terminal 2, which is instructed to change the threshold, using the L1 signaling according to the sending operation mentioned above with reference to FIG. 10 (in step ST4*d*).

There is a possibility that when the threshold changing command using the L1 signaling is a binary command for only increasing or decreasing the threshold value, as mentioned above, the above-mentioned changing command is not correctly transmitted to the target terminal 2 because of transmission errors etc.

For this reason, the base station continuously sends the L1-layer command a plurality of number of times so that the changing command for changing the threshold for switching can be surely transmitted to the target terminal 2 (in step ST5*d*).

As mentioned above, according to the third method, processing carried out through the RNC 3 in the process of changing the threshold value for switching is reduced to a minimum. For this reason, communications between the base station and the RNC 3 can be omitted, and the changing of the threshold value for switching of each terminal 2 can be performed promptly.

The process in step ST3*d* of FIG. 22 of the mobile communication system according to embodiment 1 will be explained in detail with reference to the flow chart shown in FIG. 23.

First, the uplink packet transmission management unit 24 of the base station checks conditions under which data transmission in the scheduling mode is scheduled within the own cell (in step ST1*e*).

Then, the uplink packet transmission management unit 24 determines whether or not the load on the traffic in the scheduling mode is appropriate with respect to the permissible margin assigned by the RNC 3 based on the scheduling conditions checked in step ST1*e* (in 59 step ST2*e*).

To be more specific, the uplink packet transmission management unit 24 determines whether or not the load on the traffic in the scheduling mode is appropriate from both the number of terminals each of which has notified the base station that it is going to carry out data transmission in the scheduling mode and the amount of data which should be transmitted in the data communications.

For example, when a large number of terminals placed in the scheduling mode are staying within the own cell and there is a large amount of data which should be transmitted in data communications, and therefore the communication conditions (e.g., requirements on delay) specified by QoS about data transmission in the scheduling mode are not satisfied, the uplink packet transmission management unit 24 determines that there occurs a state in which the load on the traffic in the scheduling mode is too large.

On the contrary, when a small number of terminals placed in the scheduling mode are staying within the own cell and there is a small amount of data which should be transmitted, and the permissible margin in the scheduling mode is little used although the communication conditions (e.g., requirements on delay) specified by QoS about data transmission in the scheduling mode are fully satisfied, the uplink packet transmission management unit 24 determines that there occurs a state in which the load on the traffic in the scheduling mode is too small.

Only radio resources assigned to the uplink packet transmission management unit 24 are used in the scheduling mode, and an unlimited number of terminals 2 can be made to enter the scheduling mode if the assignment is repeated.

However, since data transmission is performed only in the order according to the schedule when a large number of terminals 2 are made to enter the scheduling mode, a delay time occurs inevitably in data transmission from each of them to the base station.

The above-mentioned determining method is the one of determining whether or not the load on the traffic in the scheduling mode is appropriate according to how much delay time can be permitted for data which each terminal 2 in the scheduling mode handles.

As another determining method other than the above-mentioned determining method, there can be provided a process of focusing attention on the autonomous mode. To be more specific, the uplink packet transmission management unit 24 assumes a case where each terminal 2 staying within the own cell and placed in the autonomous mode carries out data transmission at a maximum of a permissible data rate range notified thereto in advance, so as to estimate the noise rise.

The uplink packet transmission management unit then determines a state in which the permissible margin in the scheduling mode at the current time must be reduced after setting the permissible margin in the autonomous mode according to this noise rise, as the state in which the load on the traffic in the scheduling mode is too large.

On the other hand, the uplink packet transmission management unit determines a state in which the permissible margin in the scheduling mode at the current time can be increased even after setting the permissible margin in the autonomous mode according to the above-mentioned noise rise, as the state in which the load on the traffic in the scheduling mode is too small.

In accordance with both the above-mentioned determining methods, it is determined that a state other than the above-mentioned state in which the load on the traffic in the scheduling mode is too large and the above-mentioned state in which the load on the traffic in the scheduling mode is too small is the state in which the load on the traffic is appropriate.

Figure 23:
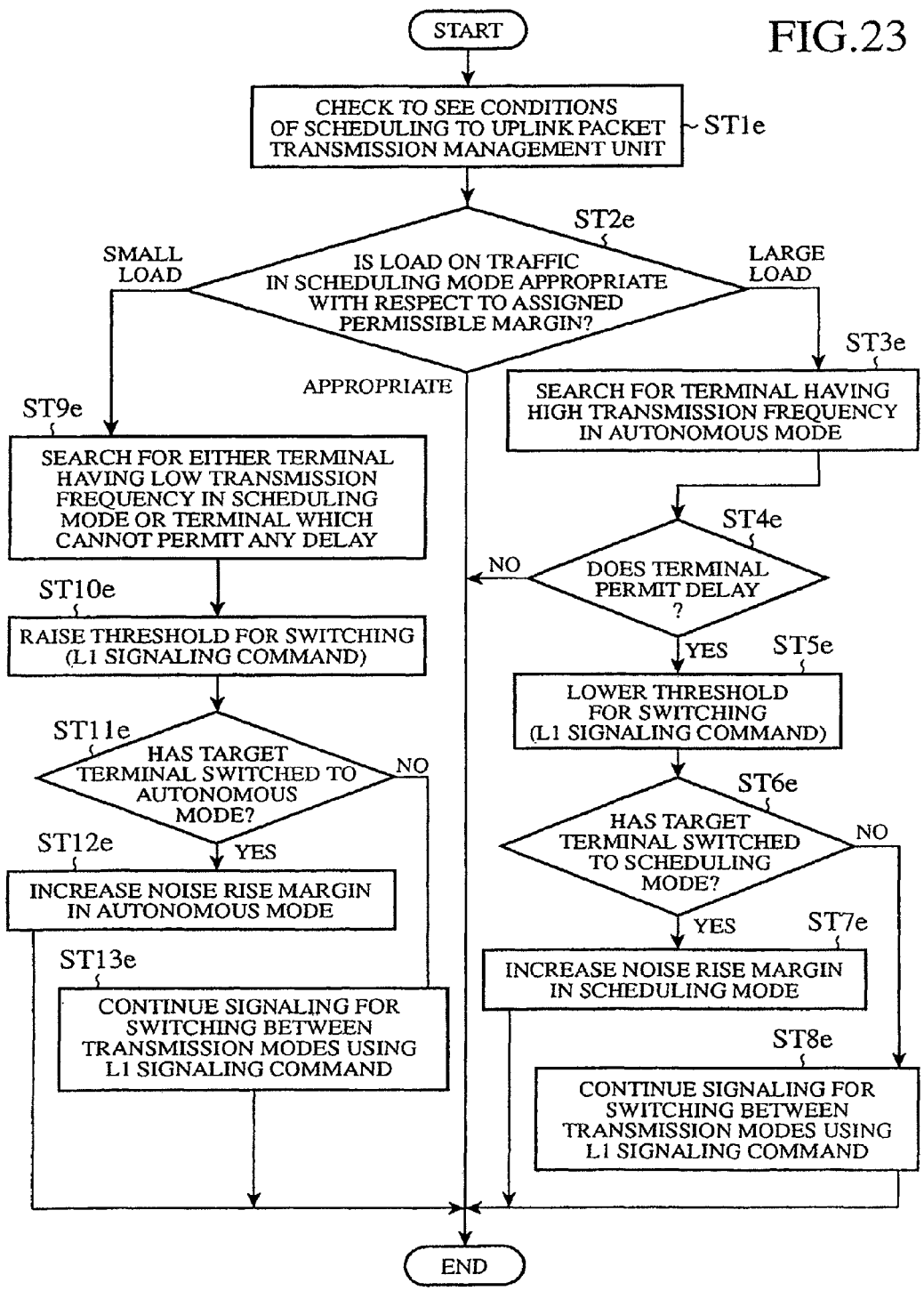
FIG. 23 is a flow chart for explaining a process of step ST3$d$ in FIG. 22 in detail.

When, in step ST2e, determining that the load on the traffic is appropriate, the uplink packet transmission management unit 24 ends the processing shown in FIG. 23, and does not notify any information to each terminal 2.

On the other hand, when, in step ST2e, determining that the load on the traffic is large, the uplink packet transmission management unit 24 searches for a terminal 2 staying within the own cell and having a high frequency of data transmission in the autonomous mode (in step ST3e). For example, the uplink packet transmission management unit determines a terminal 2 which has provided notification of a permissible data rate in the autonomous mode a number of times which exceeds a predetermined number of times to be the one having a high frequency of data transmission in the autonomous mode.

The uplink packet transmission management unit 24 then determines whether the terminal 2 which is determined to be the one having a high frequency of data transmission in the autonomous mode in step ST3e permits a delay time (in step ST4e). The uplink packet transmission management unit carries out this determination based on the amount of delay specified by QoS about data which the terminal 2 in question handles. At this time, when determining that the terminal 2 in question does not permit any delay, the uplink packet transmission management unit 24 ends the processing shown in FIG. 23, and does not notify any information to the terminal 2.

On the other hand, when determining that the terminal 2 permits a delay time, the uplink packet transmission management unit 24 lowers the threshold value for switching of the terminal 2 in question, and then shifts to the process of step ST4d of FIG. 22 (in step ST5e).

When thus receiving a notification of the changed threshold value for switching through the L1 signaling, the terminal 2 switches between the transmission modes according to the threshold value and then answers the base station that it has switched between the transmission modes.

The uplink packet transmission management unit 24 of the base station determines whether the terminal 2 in question has switched to the scheduling mode by checking a response to the transmission mode changing command from the above-mentioned terminal 2 (in step ST6e).

At this time, when determining that the terminal 2 has switched to the scheduling mode, the uplink packet transmission management unit 24 estimates a new noise rise for the scheduling mode, and increases the noise rise margin (i.e., the noise rise limit) in the scheduling mode within the limit of the permissible margin set up by the RNC 3 (in step ST7e).

On the other hand, when, in step ST6e, determining that there is no response indicating that the terminal 2 has switched between the transmission modes, and therefore the terminal 2 has not switched to the scheduling mode yet, the uplink packet transmission management unit 24 shifts to the process of step ST5d of FIG. 22, and continuously transmits the L1 signaling command in which the changed threshold value for switching is set up to the target terminal 2 (in step ST8e). After that, when receiving a response indicating that the terminal 2 has switched between the transmission modes, the uplink packet transmission management unit returns to the processing starting from step ST6e.

When, in step ST2e, determining that the load on the traffic in the scheduling mode is small, the uplink packet transmission management unit 24 searches through all terminals 2 accommodated in the own cell for either a terminal 2 having a low transmission frequency in the scheduling mode or a terminal 2 handling data which cannot permit any delay time (in step ST9e).

When, in step ST9e, finding out either a terminal 2 having a low transmission frequency in the scheduling mode or a terminal 2 handling data which cannot permit any delay time, the uplink packet transmission management unit 24 raises the threshold value for switching of the terminal 2 in question, and shifts to the process of step ST4d of FIG. 22 (in step ST10e).

As mentioned above, when receiving a notification of the changed threshold value for switching through the L1 signaling, the terminal 2 switches between the transmission modes according to the threshold value and then answers the base station that it has switched between the transmission modes.

The uplink packet transmission management unit 24 of the base station determines whether the terminal 2 in question has switched to the autonomous mode by checking a response to the transmission mode changing command from the above-mentioned terminal 2 (in step ST11e).

At this time, when determining that the terminal 2 has switched to the autonomous mode, the uplink packet transmission management unit 24 estimates a new noise rise for the autonomous mode, and increases the noise rise margin (i.e., the noise rise limit) in the autonomous mode within the limit of the permissible margin set up by the RNC 3 (in step ST12e).

On the other hand, when, in step ST11e, determining that there is no response indicating that the terminal 2 has switched between the transmission modes, and therefore the terminal 2 has not switched to the autonomous mode yet, the uplink packet transmission management unit 24 shifts to the process of step ST5d of FIG. 22, and continuously transmits the L1 signaling command in which the changed threshold value for switching is set up to the target terminal 2 (in step ST13e). After that, when receiving a response indicating that the terminal 2 has switched between the transmission modes, the uplink packet transmission management unit returns to the processing starting from step ST11e.

As mentioned above, in accordance with the third method, since the base station can notify information about a change in the threshold for switching to each terminal 2 using a physical layer signaling having a higher speed than that in the case of a layer-3 message, the threshold for switching can be changed according to variations in the traffic in packet communications between the base station and each terminal 2. Furthermore, according to the third method, the whole noise rise margin can be divided appropriately into the permissible margins for the noise rises in the transmission modes according to the variations in the traffic.

In accordance with the above-mentioned third method, the uplink packet transmission management unit 24 of the base station determines the threshold for switching between the communication modes for each terminal, as previously explained. The present invention is not limited to this example.

For example, the radio resources management unit 66 of the RNC 3 can be so constructed as to determine the threshold for switching between the communication modes based on the QoS information grasped thereby and the traffic conditions at the current time acquired from the base station.

In this case, the base station is notified of information specifying the threshold for switching between the communication modes by the RNC 3, and then notifies it to the target terminal 2 according to the third method.

In the above-mentioned embodiment, the base station, including the RNC 3, is so structured as to determine the threshold value for switching of each terminal 2, and each terminal 2 switches between the transmission modes according to the threshold value specified by the base station. However, the present invention is not limited to this structure.

For example, the base station, including the RNC 3, can be so structured as to determine a transmission mode to which each terminal 2 should switch based on the threshold value for switching, and each terminal 2 can switch between the transmission modes according to a command indicating the determined transmission mode from the base station.

Hereafter, examples in which the above-mentioned first through third methods are applied to this variant, respectively, will be explained.

Figure 24:
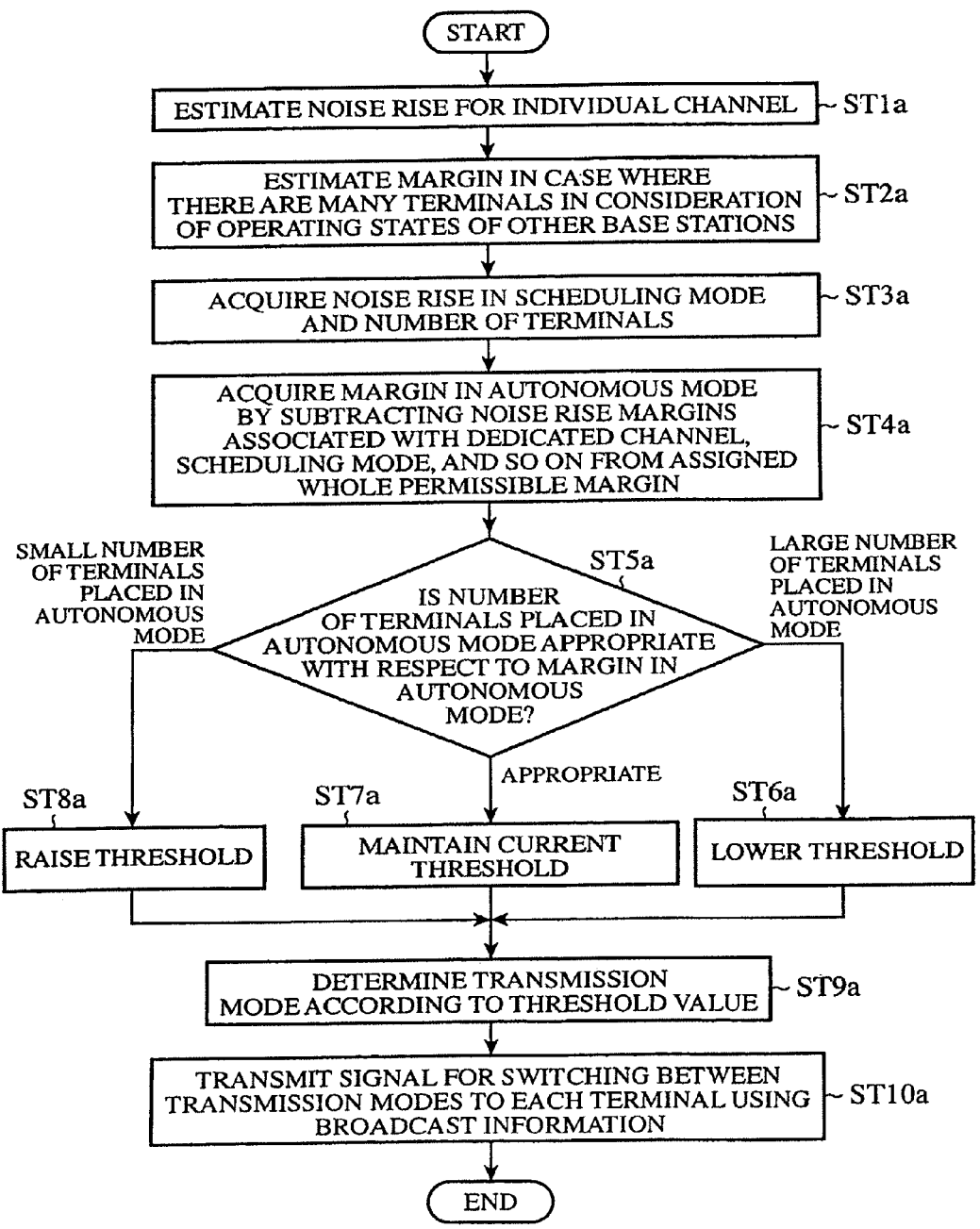
FIG. 24 is a flow chart showing the operation of the mobile communication system in a case where the first method is applied to a structure in which the mobile communication terminal switches between the transmission modes according to a command from a base station.

First, an operation in a case where the first method is applied to the variant in which the base station determines a transmission mode to which each terminal should switch, and each terminal 2 switches between the transmission modes according to a command indicating the determined transmission mode from the base station will be explained in detail with reference to a flow chart shown in FIG. 24.

Figure 16:
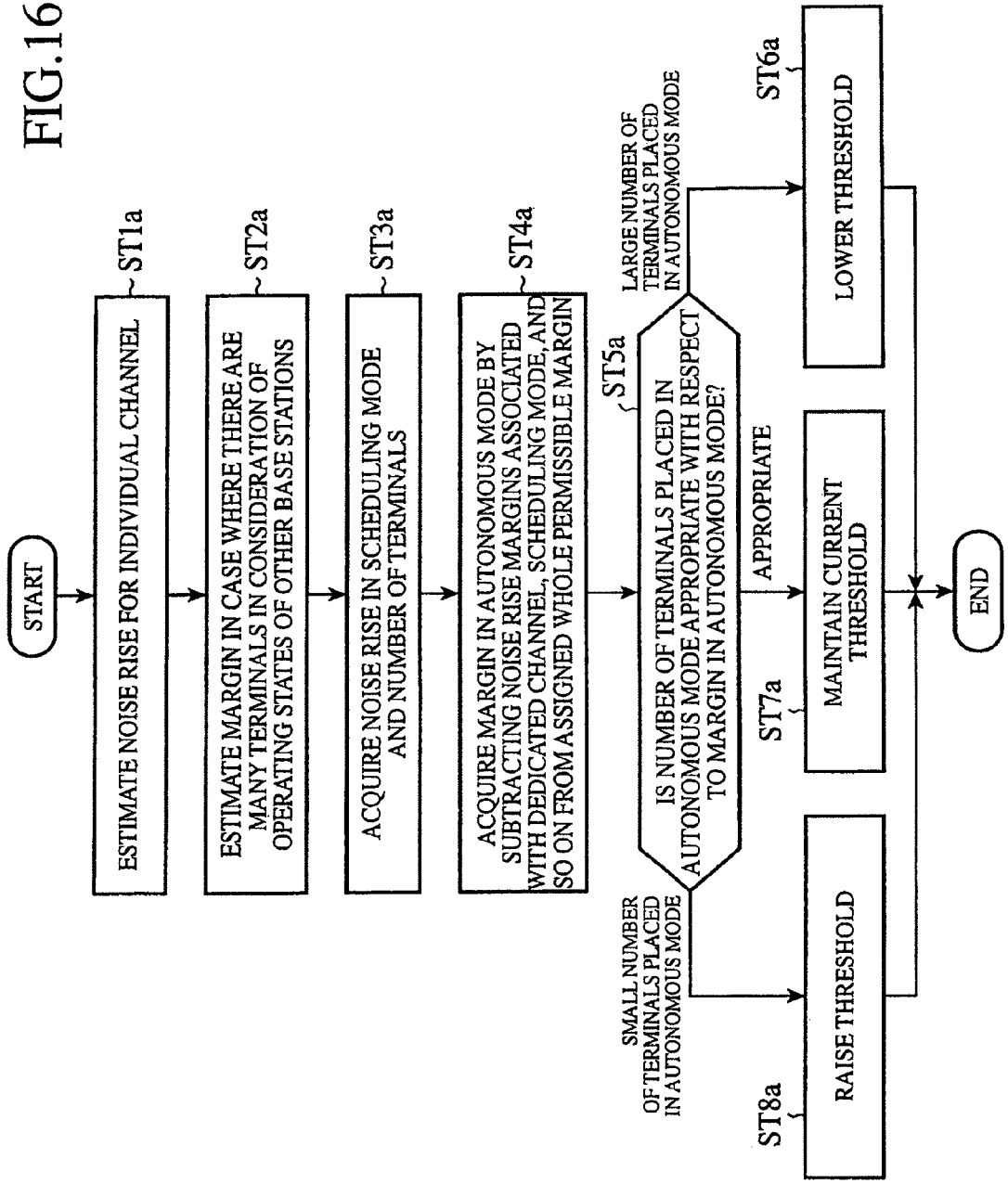
FIG. 16 is a flow chart for explaining a process of step ST9 in FIG. 15 in detail.

Since processes of steps ST1a to ST8a are the same as those of FIG. 16, the explanation of them will be omitted hereafter. When, in either of steps ST6a to ST8a, determining the threshold value for switching, the resources management unit 66 of the RNC 3 notifies this threshold value to the base station.

The uplink packet transmission management unit 24 of the base station compares the above-mentioned threshold value notified thereto from the RNC 3 with the amount of transmission data notified thereto in advance from each terminal 2 staying in the own cell, so as to determine the transmission mode to be set to each terminal 2 (in step ST9a).

For example, when the amount of transmission data notified thereto in advance from each terminal exceeds the above-mentioned threshold value, the uplink packet transmission management unit determines that each terminal should switch to the scheduling mode, whereas it determines that each terminal should switch to the autonomous mode otherwise.

When, in step ST9a, determining the transmission mode to which each terminal should switch, the uplink packet transmission management unit 24 instructs the broadcast information transmission unit 28 to perform a signaling using broadcast information to inform each terminal 2 of the determined transmission mode (in step ST10a).

To be more specific, in the process of step ST11 shown in FIG. 15, the base station transmits the information specifying the transmission mode determined thereby to each terminal, instead of information including the changed threshold value for switching.

Thus, the base station can know that each terminal 2 has switched to which transmission mode by determining not only the threshold value for switching but the transmission mode to which each terminal should switch.

For this reason, the response signaling for notifying the transmission mode to which each terminal 2 has switched to the base station, which is needed when each terminal 2 has switched to the transmission mode according to the threshold value specified by the base station, can be omitted.

Figure 25:
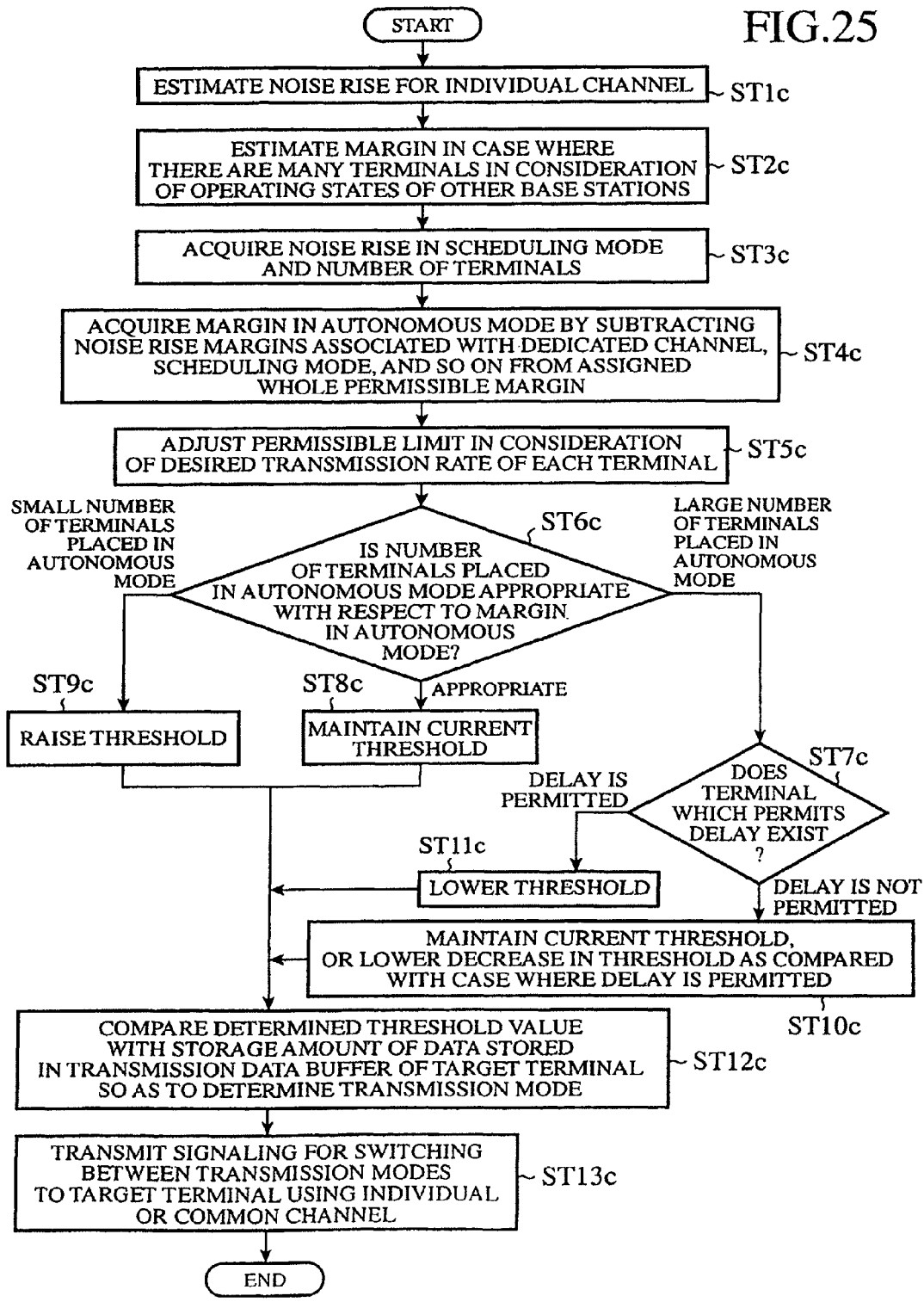
FIG. 25 is a flow chart showing the operation of the mobile communication system in a case where the second method is applied to the structure in which the mobile communication terminal switches between the transmission modes according to a command from a base station.

Next, an operation in a case where the second method is applied to the variant in which the base station determines a transmission mode to which each terminal should switch, and each terminal 2 switches between the transmission modes according to a command indicating the determined transmission mode from the base station will be explained in detail with reference to a flow chart shown in FIG. 25.

Figure 20:
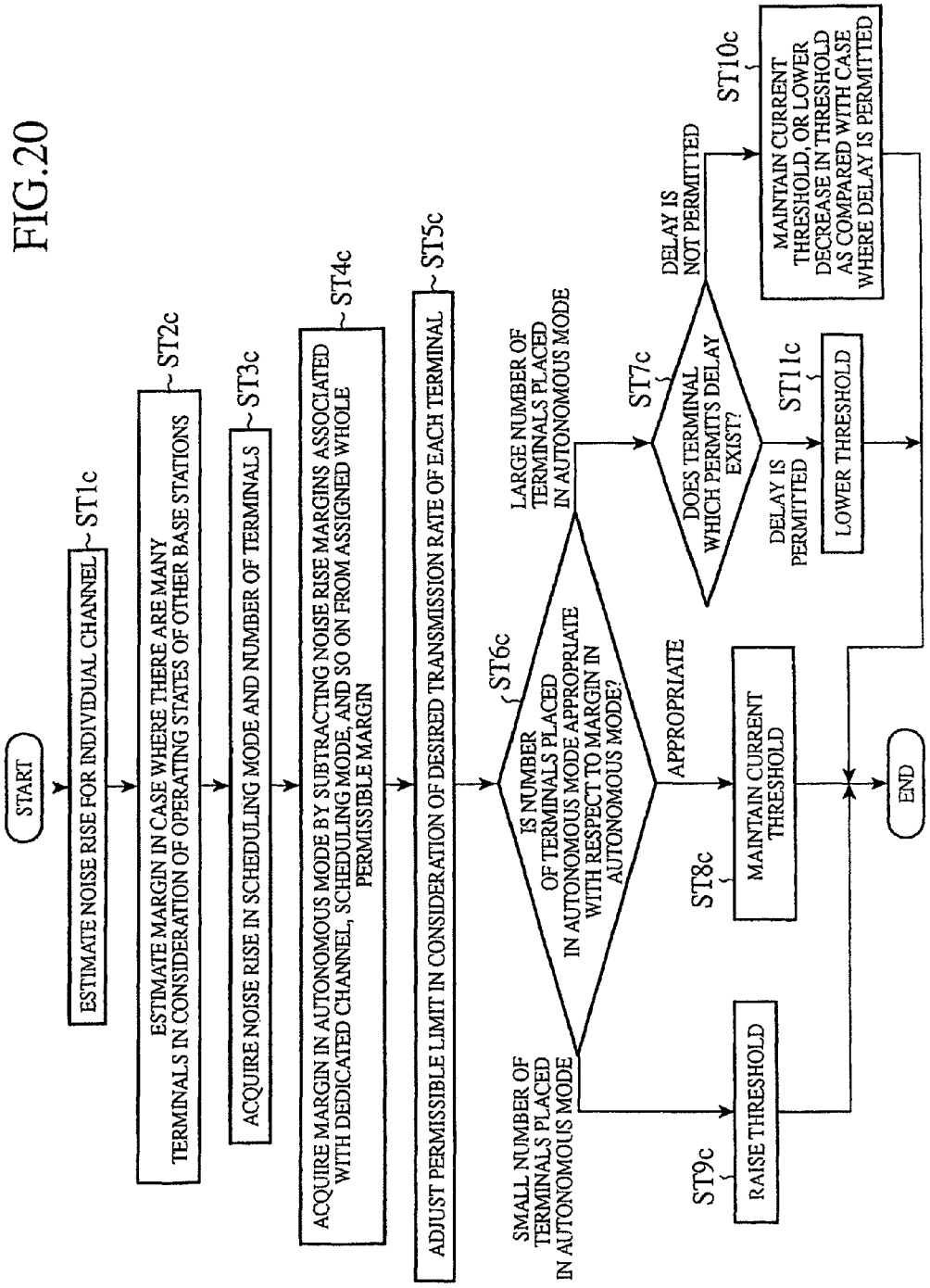
FIG. 20 is a flow chart for explaining a process of step ST9$b$ in FIG. 19 in detail.

Since processes of steps ST1c to ST11c are the same as those of FIG. 20, the explanation of them will be omitted hereafter. When, in either of steps ST8c, ST9c, ST10c, and ST11c, determining the threshold value for switching, the radio resources management unit 66 of the RNC 3 notifies this determined threshold value to the base station.

The uplink packet transmission management unit 24 of the base station compares the above-mentioned threshold value notified thereto from the RNC 3 with the amount of transmission data notified thereto in advance from each terminal 2 which is determined to be the one which should switch between the transmission modes, so as to determine the transmission mode to be set to each terminal 2 in question (in step ST12c).

When, in step ST12c, determining the transmission mode to which each terminal in question should switch, the uplink packet transmission management unit 24 instructs either the downlink dedicated channel transmission unit 29 or the downstream common channel transmission unit 34 to perform a signaling using the dedicated channel or the common channel to inform each terminal 2 in question that each terminal 2 in question should switch to the determined transmission mode (in step ST13a).

To be more specific, in the process of step ST11b shown in FIG. 19, the base station transmits the information specifying the transmission mode determined thereby to each terminal in question, instead of information including the changed threshold value for switching. In this case, the processes of steps ST13b and ST14b shown in FIG. 19 are omitted.

Thus, the base station can know that each terminal 2 in question has switched to which transmission mode by determining not only the threshold value for switching but the transmission mode to which each terminal should switch.

For this reason, the response signaling for notifying the transmission mode to which each terminal 2 has switched to the base station, which is needed when each terminal 2 has switched to the transmission mode according to the threshold value specified by the base station, can be omitted.

In the above explanation, the radio resources management unit 66 of the RNC 3 determines the threshold for switching between the communication modes for each terminal. The present invention is not limited to this example.

For example, the base station can acquire QoS information etc. from the RNC 3, and the uplink-packet-communications management unit 24 of the base station can determine the threshold for switching between the communication modes for each terminal.

By doing in this way, processing carried out through the RNC 3 in the process of determining the threshold value for switching between the communication modes can be reduced to a minimum, and the increase in the number of times which a signaling between the base station and the RNC 3 is carried out can be reduced.

The base station can further change the above-mentioned threshold value which is determined by the RNC 3 according to the traffic conditions at the current time etc., and can compare the changed threshold value with the amount of transmission data of each terminal 2 notified thereto in advance, so as to determine the transmission mode to which each terminal should to switch.

That is, the present invention includes a variant in which the base station and the RNC 3 determine the above-mentioned threshold value in cooperation with each other. In this variant, the base station can be so constructed as to change the threshold value notified thereto from the RNC 3 using the uplink-packet-communications management unit 24.

Next, an operation in a case where the third method is applied to the variant in which the base station determines the transmission mode to which each terminal should switch, and each terminal 2 switches to the determined transmission mode according to a command indicating the determined transmission mode from the base station will be explained in detail with reference to a flow chart shown in FIG. 26.

Since processes of steps ST1e to ST4e are the same as those of FIG. 23, the explanation of them will be omitted hereafter. When, in step ST4e, determining that the searched terminal 2 is a terminal which permits a delay time, the uplink packet transmission management unit 24 lowers the threshold value for switching of the terminal 2 in question (in step ST5e-1).

Next, the uplink packet transmission management unit 24 compares the threshold value determined in step ST5e-1 with the amount of transmission data notified thereto in advance from the terminal 2 searched in step ST4e, so as to determine the transmission mode which the terminal 2 in question should go into (in step ST5e-2).

Then, the uplink packet transmission management unit 24 shifts to the process of step ST4d of FIG. 22 after setting information specifying the transmission mode which should be set to the terminal 2 in question to an L1 signaling command (in step ST5e-3).

Since subsequent processes of steps ST6e to ST8e are the same as those of FIG. 23, the explanation of them will be omitted hereafter.

When, in step ST9e, finding out either a terminal 2 having a low transmission frequency in the scheduling mode or a terminal 2 handling data which cannot permit any delay time, the uplink packet transmission management unit 24 raises the threshold value for switching of the terminal 2 in question (in step ST10e-1).

Next, the uplink packet transmission management unit 24 compares the threshold value determined in step ST10e-1 with the amount of transmission data notified thereto in advance from the terminal 2 searched in step ST9e, so as to determine the transmission mode which should be set to the terminal 2 in question (step ST10e-2).

Then, the uplink packet transmission management unit 24 shifts to the process of step ST4d of FIG. 22 after setting the information specifying the transmission mode which should be set to the terminal 2 in question to an L1 signaling command mentioned above (in step ST10e-3).

Since subsequent processes of steps ST11e to ST13e are the same as those of FIG. 23, the explanation of them will be omitted hereafter.

In accordance with the above-mentioned third method, the uplink packet transmission management unit 24 of the base station determines the threshold for switching between the communication modes for each terminal, as previously explained. The present invention is not limited to this example.

For example, the radio resources management unit 66 of the RNC 3 can be so constructed as to determine the threshold for switching between the communication modes based on the QoS information grasped thereby and the traffic conditions at the current time acquired from the base station.

In this case, the base station is notified of information specifying the threshold for switching between the communication modes by the RNC 3, and then notifies it to the target terminal 2 according to the third method.

Furthermore, in the above-mentioned explanation, the uplink packet transmission management unit 24 of the base station determines the communication mode for each terminal, as previously explained. The present invention is not limited to this example.

For example, the radio resources management unit 66 of the RNC 3 can be so constructed as to acquire the QoS information grasped thereby, the amount of transmission data which the terminal 2 in question is going to transmit, etc. by way of the base station, and to determine the transmission mode which should be set to the terminal 2 in question.

In this case, in the processes of steps ST10 and ST11 shown in FIG. 15, and steps ST10b and ST11b shown in FIG. 19, the information specifying the transmission mode determined by the base station is transmitted to the terminal in question, instead of the information including the changed threshold value for switching.

After the transmission mode determined by the radio resources management unit 66 is notified from RNC 3 to the base station, the base station notifies it to the terminal 2 in question using either of the above-mentioned methods.

As mentioned above, according to this embodiment 1, each terminal 2 can be placed in an appropriate transmission mode according to the operation conditions of the base station, and the permissible noise rise margin which is set to the base station can be appropriately divided into the permissible margins in the transmission modes.

When setting the threshold for switching for each terminal 2, the mobile communication system enables determination of to which transmission mode each terminal should switch in consideration of the QoS of data which each terminal 2 handles, and also enables efficient use of radio resources reflecting needs of data transmission of each terminal.

According to the above-mentioned embodiment, the mobile communication system enables the base station to acquire transmission buffer information used for determining whether to make each terminal 2 switch between the transmission modes by allowing each terminal 2 to carry out a signaling to the base station, as previously explained.

If the frequency of the signaling of the transmission buffer information to the base station by each terminal 2 cannot be changed according to the maximum permissible delay of data which each terminal 2 handles, the requirements on delay cannot be satisfied even if the transmission mode is changed.

For example, when the frequency of the signaling of the transmission buffer information from each terminal 2 that arrives at the base station is low, the base station cannot grasp the current state of the transmission data buffer of each terminal 2 in time.

In this case, there is a possibility that the process of making each target terminal 2 switch to either the scheduling mode or the autonomous mode is overdue, and, as a result, the requirements on delay in data communications by each terminal 2 in question are not satisfied.

Therefore, each mobile communication terminal 2 can change the frequency of the signaling of transmission buffer information to the base station according to the requirements on delay which are set for data communications handled thereby.

For example, in a case where each terminal 2 performs the above-mentioned signaling to the base station at predetermined intervals, terminals 2 which carry out data communications which must satisfy severe requirements on delay are made to perform the above-mentioned signaling at short intervals, whereas terminals 2 which carry out data communications which only have to satisfy loose requirements on delay are made to perform the above-mentioned signaling at long intervals. The setup of the signaling intervals is performed for each terminal according to the amount of permissible delay in data communications which each terminal is going to carry out.

Next, an explanation of the process of setting the above-mentioned signaling intervals will be made. Counter information called SFN (System Frame Number) which is used as a reference of the transmission timing is set to P-CCPCH (BCH). The uplink packet transmission management unit 24 of the base station determines the signaling intervals at which the signaling of the transmission buffer information by each terminal 2 is performed based on the QoS parameters and so on acquired from the RNC 3.

As methods of setting the signaling intervals to each terminal 2, there are a first method of using broadcast information (setting the signaling intervals to each group of terminals 2 at a time), a second method of using the dedicated or common channel (individually setting the signaling intervals to each terminal 2), and a third method of using a physical-layer signaling, as in the case of performing the above-mentioned signaling for changing the threshold for switching.

When receiving information about the above-mentioned signaling intervals from the base station, each mobile communication terminal 2 demodulates a signal set to each data channel using the back spreading demodulating unit 46, as explained with reference to FIG. 11. The protocol processing unit 56 acquires the information about the above-mentioned signaling intervals from the signal which is demodulated by the back spreading demodulating unit 46.

The protocol processing unit 56 then sets the signaling intervals acquired from the information about the above-mentioned signaling intervals to the buffer state transmission unit 55 as transmission intervals for UL-SICCH at which each terminal notifies the state of the transmission data buffer 58 to the base station. The mobile communication terminal 2 further synchronizes a timing at which it is to transmit data to the base station with a timing at which the base station is to receive the data using an SFN value set to P-CCPCH (BCH).

A method of dividing terminals into groups can be used as the method of setting the above-mentioned signaling intervals efficiently. To be more specific, terminals 2 which, for example, belong to QoS classes, such as a conversational-mode class and a streaming class, are divided into groups according to maximum delay amounts which can be permitted in the QoS classes in question, and the above-mentioned signaling intervals are determined for each group.

On the other hand, signaling intervals longer than those set for terminals 2 which, for example, belong to the above-mentioned QoS classes, such as the conversational-mode class and the streaming class, are set for terminals 2 belonging to QoS classes other than the above-mentioned QoS classes. This method has an advantage of being able to manage the amount of interference in each communication mode according to the QoS class to which terminals 2 included in each group belong.

Next, an application example of performing the signaling of the above-mentioned transmission buffer information when the state of each mobile communication terminal 2 satisfies predetermined conditions, instead of performing the signaling periodically as mentioned above, will be explained.

As the predetermined conditions, whether or not a certain amount of transmission data is stored in the transmission data buffer 58 for uplink packet communications of each terminal 2 can be considered, and, when a certain amount of transmission data is stored in the transmission data buffer of each terminal 2, each terminal 2 performs the signaling of the above-mentioned transmission buffer information to the base station.

In this case, the signaling of the above-mentioned transmission buffer information is not performed until a certain amount of transmission data is stored in the transmission data buffer 58. However, there are some cases where each terminal should perform the above-mentioned signaling without waiting until a certain amount of transmission data is stored in the transmission data buffer 58 thereof, depending upon the type of data which each terminal 2 handles.

For example, although a response signal output from an application which a terminal 2 executes via the Internet or the like has a small amount of data, the existence of the response signal should be notified to the base station as soon as possible.

To this end, a timer for specifying the above-mentioned signaling intervals is set up for the terminal 2 so that, in a case of handling data which must satisfy severe requirements on delay, and the terminal 2 performs the above-mentioned signaling when the timer reaches a fixed time, without waiting until a certain amount of transmission data is stored in the transmission data buffer thereof.

The above-mentioned timer can be set up by performing a signaling specifically using the structure of the base station, or can be set up by the terminal 2 itself.

First, an operation in the case of carrying out the signaling specifically using the structure of the base station to set up the above-mentioned timer will be explained with reference to FIGS. 10 and 11. The uplink packet transmission management unit 51 of the terminal 2 functions as the above-mentioned timer.

The RNC 3 generates timer information for specifying the signaling intervals dependent upon the QoS parameters using the QoS parameters about data communications by a terminal 2 which is a target in which a timer is to be set up.

The base station then acquires the above-mentioned timer information from the RNC 3, and transmits the timer information, as information associated with the dedicated channel, to the above-mentioned terminal 2 via the downlink dedicated channel transmission unit 29.

In the above-mentioned terminal 2, the downlink dedicated channel receiving unit 63 receives the above-mentioned information associated with the dedicated channel, and transmits the information to the protocol processing unit 56. The protocol processing unit 56 reads the timer information from the above-mentioned information associated with the dedicated channel, and sends it to the uplink packet transmission management unit 51.

The uplink packet transmission management unit 51 sets up a timer according to the above-mentioned timer information, and, upon time-out, instructs the buffer state transmission unit 55 to execute a signaling of the above-mentioned transmission buffer information.

Next, a process of autonomously managing the timer of each terminal 2 will be explained.

First, the uplink packet transmission management unit 51 determines a timer value based on the QoS information grasped thereby and whether transmission of data has been carried out. When this timer expires, the uplink packet transmission management unit 51 instructs the buffer state transmission unit 55 to carry out a signaling of the above-mentioned transmission buffer information. As a method of specifying a timer which enables efficient performance of the above-mentioned signaling, there can be provided a method of setting up a timer in proportion to the amount of permissible delay in the conversational-mode class or the streaming class by using, for example, the RNC 3 or the uplink packet transmission management unit 51.

In addition, for the interactive class or the background class, the RNC 3 or the uplink packet transmission management unit 51 sets the timers of terminals 2 which have carried out communications for a shorter time than that set to terminals 2 which carry out communications for the first time, and lengthens the set times of the timers of terminals step by step as intervals at which communications are carried out become long.

By doing in this way, the RNC or the uplink packet transmission management unit 51 can flexibly set the number of times that the signaling of the transmission data buffer information for the base station is carried out according to demands on data communications. For example, the number of times that the above-mentioned signaling is carried out can be efficiently controlled by lengthening the intervals at which the signaling is carried out for terminals 2 which are performing data communications with a low volume of traffic.

The above-mentioned method of carrying out a signaling periodically and the above-mentioned method of using a timer can be used in combination. For example, terminals 2 which carries out data communications in which the amount of delay is severely set carries out a signaling of the transmission data buffer information to the base station periodically, and terminals 2 which carries out data communications in which the amount of delay is loosely set carries out the above-mentioned signaling at intervals specified by a timer.

To be more specific, terminals 2 which handle data communications belonging to the conversational-mode class or the streaming class set the above-mentioned signaling intervals according to the maximum permissible delay amount in the QoS class. On the other hand, terminals 2 which handle data communications belonging to the interactive class or the background class carry out the signaling according to a timer which is set based on the QoS information grasped thereby and whether transmission of data has been carried out.

By doing in this way, while the amount of interference of data communications by terminals 2 is managed by the base station, the number of times that the signaling of the transmission data buffer information is carried out by each terminal 2 can be controlled so as not to increase more than desired. As a result, the signaling can be efficiently performed in the whole mobile communication system.

INDUSTRIAL APPLICABILITY

As mentioned above, the communication mode controlling method according to the present invention can be used for a mobile communication terminal, such as a mobile phone which supports uplink packet communications, a base station and an RNC.

The invention claimed is:

1. A method comprising:
    receiving a buffer status from a terminal, the buffer status indicating an amount of data available for transmission;
    measuring, at a base station, signals to determine an amount of received power;
    receiving, at the base station, from a radio network controller an indication of a maximum received power;
    controlling scheduling for the terminal in accordance with at least one of the indicated maximum received power or the buffer status; and
    transmitting an indication of uplink radio resources to the terminal.

2. The method of claim 1, wherein the determined amount of received power relates to interference power.

3. The method of claim 1, wherein the indicated maximum received power corresponds to a power that should not be exceeded as a result of scheduling.

4. The method of claim 1, wherein the buffer status is received at the base station.

5. The method of claim 4, wherein the base station is a Node-B implemented using wideband-code division multiple access (W-CDMA).

6. The method of claim 1, further comprising:
    notifying the amount of received power to the radio network controller.

7. The method of claim 1, further comprising:
    controlling scheduling in accordance with a transmission power margin of the terminal.

8. The method of claim 1, further comprising:
    receiving data from the terminal.

9. The method of claim 8, further comprising:
    transmitting an ACK/NACK signal to the terminal in response to the received data.

10. The method of claim 1, wherein the amount of data available for transmission is an amount of data stored in a terminal buffer.

11. The method of claim 1, wherein controlling scheduling controls scheduling in accordance with the indicated maximum received power.

12. The method of claim 1, wherein controlling scheduling controls scheduling in accordance with the buffer status.

13. The method of claim 1, wherein controlling scheduling controls scheduling in accordance with the indicated maximum received power and the buffer status.

14. A method comprising:
   receiving a buffer status from a terminal, the buffer status indicating an amount of data available for transmission;
   measuring, at a base station, signals to determine an amount of received power;
   receiving, at the base station, from a radio network controller an indication of a maximum received power; and
   causing control of terminal scheduling in accordance with the indicated maximum received power or the buffer status.

15. The method of claim 14, where the causing control of terminal scheduling comprises:
   transmitting an indication of uplink radio resources to the terminal.

16. A communications network configured to:
   receive a buffer status from a terminal, the buffer status indicating an amount of data available for transmission;
   determine, at a base station, an amount of received power;
   receive, at the base station, from a radio network controller an indication of a maximum received power;
   control scheduling for the terminal in accordance with at least one of the indicated maximum received power or the buffer status; and
   transmit an indication of uplink radio resources to the terminal.

17. The communications network of claim 16, wherein the determined amount of received power relates to interference power.

18. The communications network of claim 16, wherein the indicated maximum received power corresponds to a power that should not be exceeded as a result of scheduling.

19. The communications network of claim 16, wherein the buffer status is received at the base station.

20. The communications network of claim 19, wherein the base station is a Node-B implemented using wideband-code division multiple access (W-CDMA).

21. The communications network of claim 16, further configured to:
   notify the amount of received power to the radio network controller.

22. The communications network of claim 16, further configured to:
   control scheduling in accordance with a transmission power margin of the terminal.

23. The communications network of claim 16, further configured to:
   receive data from the terminal.

24. The communications network of claim 23, further configured to:
   transmit an ACK/NACK signal to the terminal in response to the received data.

25. The communications network of claim 16, wherein the amount of data available for transmission is an amount of data stored in a terminal buffer.

26. The communications network of claim 16, wherein scheduling is controlled in accordance with the indicated maximum received power.

27. The communications network of claim 16, wherein scheduling is controlled in accordance with the buffer status.

28. The communications network of claim 16, wherein scheduling is controlled in accordance with the indicated maximum received power and the buffer status.

29. A communications network configured to:
   receive a buffer status from a terminal, the buffer status indicating an amount of data available for transmission;
   measure, at a base station, signals to determine an amount of received power;
   receive, at the base station, from a radio network controller an indication of a maximum received power; and
   cause control of terminal scheduling in accordance with the indicated maximum received power or the buffer status.

30. The communications network of claim 29, further configured to:
   transmit an indication of uplink radio resources to the terminal.

* * * * *

UNITED STATES PATENT AND TRADEMARK OFFICE
CERTIFICATE OF CORRECTION

PATENT NO. : 8,311,572 B2
APPLICATION NO. : 13/287870
DATED : November 13, 2012
INVENTOR(S) : Hideji Wakabayashi Page 1 of 1

It is certified that error appears in the above-identified patent and that said Letters Patent is hereby corrected as shown below:

<u>In the Specification</u>:

Col. 1, line 33, "JP, 2002-369261, A" should read --JP 2002-369261 A--.

Col. 6, line 49, "AckINack" should read --Ack/Nack--.

Col. 9, lines 28-29, "to which the terminals operation" should read --to which the terminals operate--.

Col. 10, lines 6-7, "sends out it" should read --sends it out--.

Col. 11, line 64 and col. 12, line 2, "band width" should read --bandwidth--.

Col. 16, line 60, "EACH" should read --FACH--.

Col. 19, line 16, "In" should read --in--.

Col. 21, line 67, "from occurring III communications" should read --from occurring in communications--.

Col. 37, line 10, "(EACH)" should read --(FACH)--.

Signed and Sealed this
Fifth Day of February, 2013

Teresa Stanek Rea
*Acting Director of the United States Patent and Trademark Office*